(12) United States Patent
Yokoyama

(10) Patent No.: US 8,027,585 B2
(45) Date of Patent: Sep. 27, 2011

(54) OPTICAL COMMUNICATION METHOD, OPTICAL COMMUNICATION DEVICE, AND OPTICAL COMMUNICATION SYSTEM

(75) Inventor: Yoshitaka Yokoyama, Tokyo (JP)

(73) Assignee: NEC Corporation, Tokyo (JP)

( * ) Notice: Subject to any disclaimer, the term of this patent is extended or adjusted under 35 U.S.C. 154(b) by 993 days.

(21) Appl. No.: 11/909,228

(22) PCT Filed: Mar. 31, 2006

(86) PCT No.: PCT/JP2006/306945
§ 371 (c)(1),
(2), (4) Date: Nov. 7, 2007

(87) PCT Pub. No.: WO2006/106973
PCT Pub. Date: Oct. 12, 2006

(65) Prior Publication Data
US 2009/0080881 A1    Mar. 26, 2009

(30) Foreign Application Priority Data

Mar. 31, 2005  (JP) .................................. 2005-104391
May 13, 2005  (JP) .................................. 2005-140998

(51) Int. Cl.
*H04J 14/00* (2006.01)

(52) U.S. Cl. ................ 398/50; 398/16; 398/33; 398/34; 398/177; 398/48; 398/56; 398/158; 398/155; 398/159; 398/30; 370/351; 370/535; 370/503; 370/389; 385/24; 385/26; 385/27; 385/28

(58) Field of Classification Search .................... 398/16, 398/79, 33, 177, 147, 158, 159, 161, 81, 398/74, 75, 45, 46, 47, 48, 49, 50, 51, 52, 398/53, 54, 55, 56, 58, 155, 154, 25, 26, 398/27, 28, 29, 135, 136, 137, 138, 139, 398/156, 19, 30, 31, 32, 34, 38, 59; 370/351, 370/352, 535, 389, 392, 476, 474, 466, 503, 516, 518, 223, 225, 536; 385/24, 16, 17, 18, 31, 42, 20, 47, 48

See application file for complete search history.

(56) References Cited

U.S. PATENT DOCUMENTS 6,031,847 A * 2/2000 Collins et al. ................ 370/508
(Continued)

FOREIGN PATENT DOCUMENTS

JP    9-218314 A    8/1997
(Continued)

OTHER PUBLICATIONS

O.H.. Adamczyk et al.,, Coarse and Fine Bit Synchronization for WDM Interconnections Using Two Subcarrier-Multiplexed Control Pilot Tones, IEEE Photonics Technology Letters, vol. 11, No. 8, Aug. 1999, pp. 1057-1059.

(Continued)

*Primary Examiner* — Hanh Phan
(74) *Attorney, Agent, or Firm* — Sughrue Mion, PLLC

(57) ABSTRACT

The present invention relates to controlling wavelength switching in a plurality of nodes that are provided to increase the distance of signal transmission in inverse MUX transmission in which a high-speed line is divided into a plurality of low-speed lines for transmission. A maximum skew occurring between adjacent nodes is measured, and switching of wavelength channels is performed in one or a plurality of nodes on the basis of the measured maximum skew to keep the skew of the entire inverse MUX transmission system at or below a prescribed value. The optical communication device is provided with an NNI functional block to which high-speed lines on the transmission channel side are connected, and a UNI functional block to which low-speed lines on the client side are connected.

35 Claims, 32 Drawing Sheets

U.S. PATENT DOCUMENTS

2002/0114034 A1 * 8/2002 Way .............................. 359/124

FOREIGN PATENT DOCUMENTS

| JP | 11-88260 A | 3/1999 |
|---|---|---|
| JP | 2002-27514 A | 1/2002 |
| JP | 2002-135223 A | 5/2002 |
| JP | 2003-61171 A | 2/2003 |
| JP | 2003-169355 A | 6/2003 |
| JP | 2003-218747 A | 7/2003 |
| JP | 2004-274238 A | 9/2004 |

OTHER PUBLICATIONS

Drogemuller, K. et al., Current progress of advanced high speed parallel optical links for computer clusters and switching systems, Electronic Components and Technology Conference 2000 Proceedings, May 21, 2000, pp. 1227-1235.

* cited by examiner

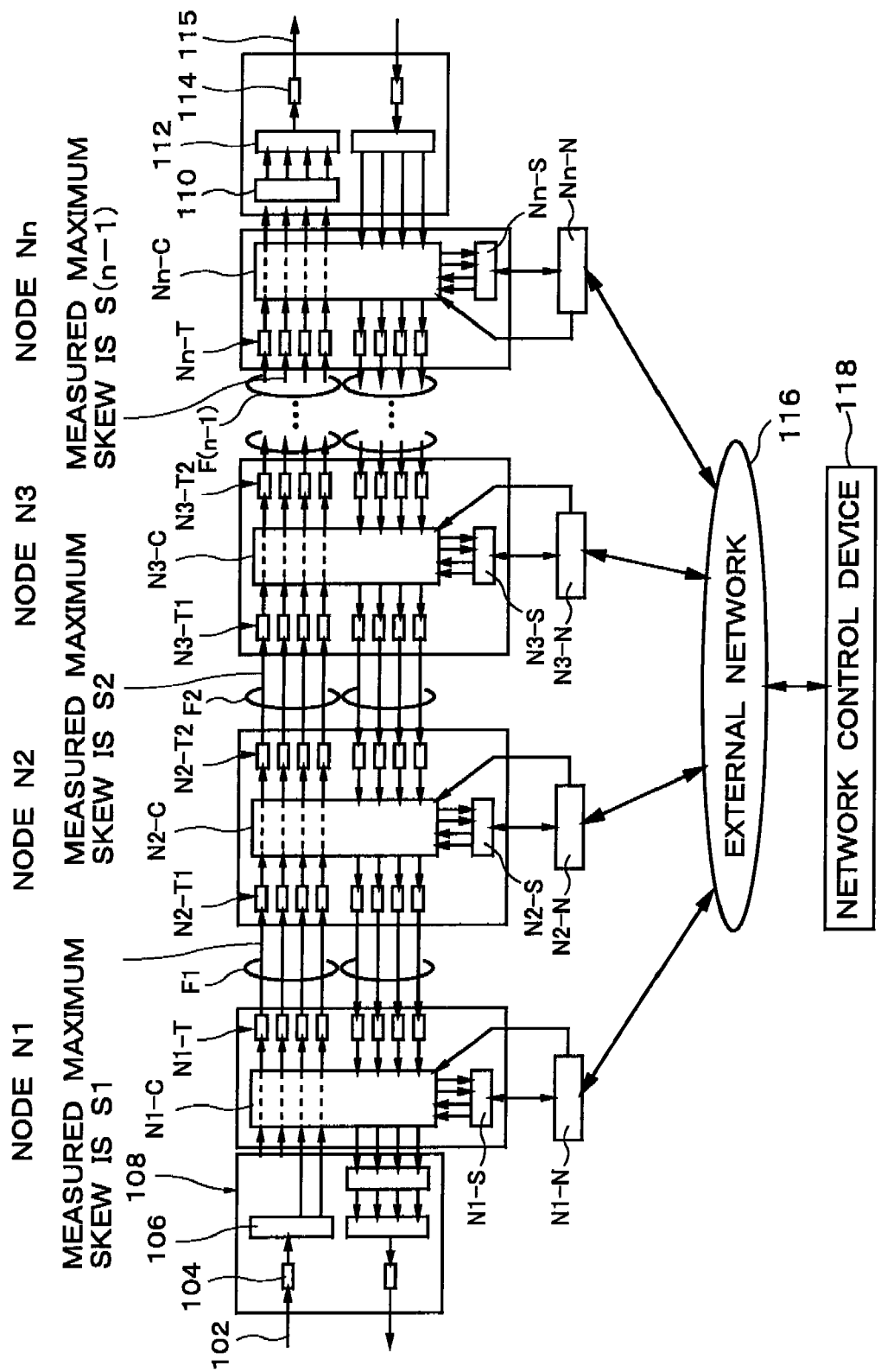

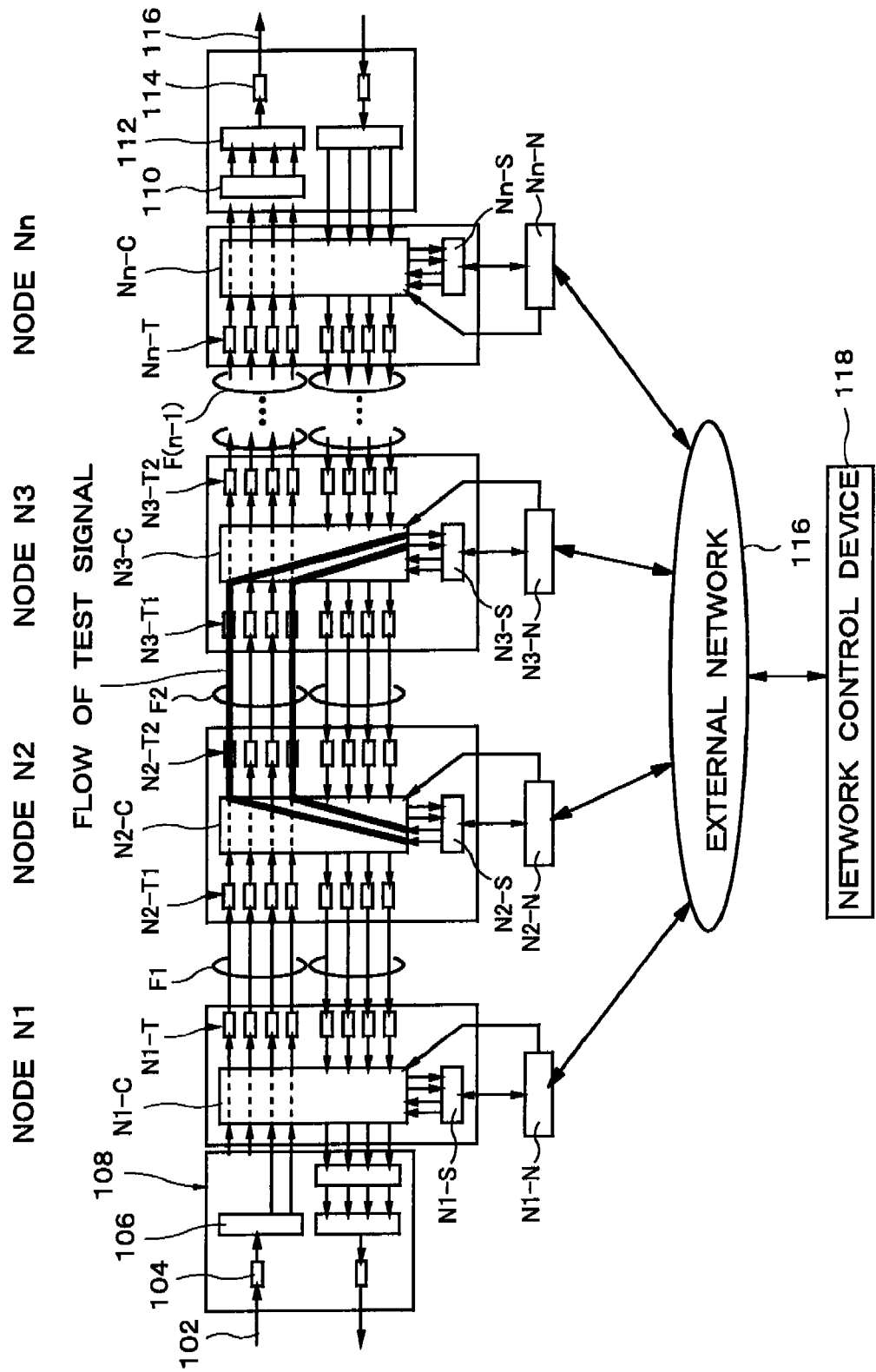

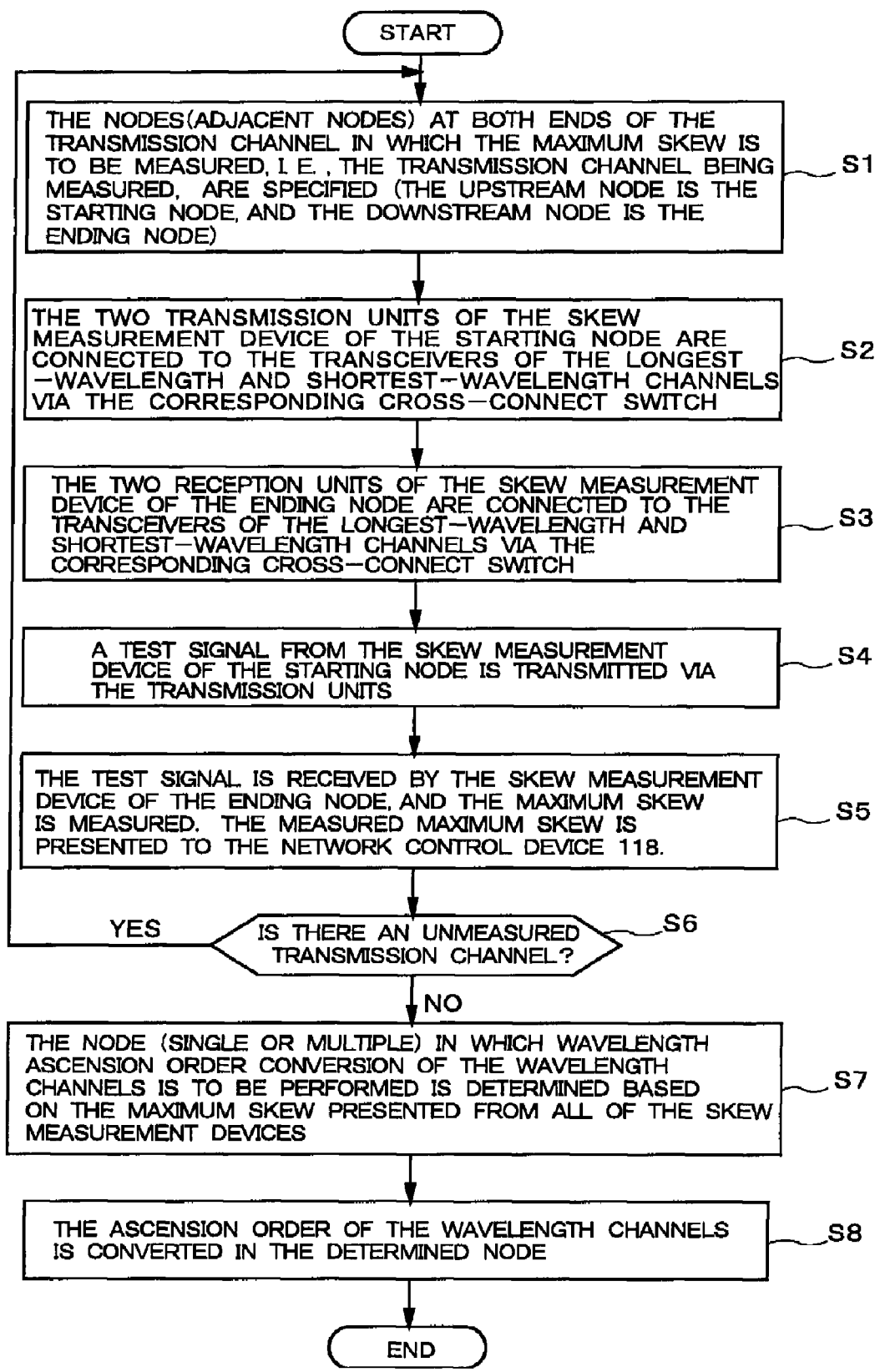

OPTICAL COMMUNICATION METHOD, OPTICAL COMMUNICATION DEVICE, AND OPTICAL COMMUNICATION SYSTEM

TECHNICAL FIELD

The present invention relates to an optical communication method for performing inverse MUX transmission using wavelength division multiplexing (WDM), to an optical communication device that has a cross connecting function, and to an optical communication system that is composed of the optical communication device.

BACKGROUND ART

Port counts (the number of ports used for connection by nodes provided to a transmission channel) is increasing as the scale of network devices used for optical communication increases, and per-port transmission speeds are also increasing. The inverse MUX transmission scheme is known as a transmission method that uses such high-speed lines to perform optical communication over long distances with high adaptability. Inverse MUX transmission is also referred to as "inverse multiplexing transmission."

In an inverse MUX scheme, a high-speed line having a high transmission speed is separated (divided) into a plurality of low-speed lines, and the separate low-speed lines are then multiplexed into a high-speed line. This scheme has advantages in that degradation of the optical signal that occurs in a high-speed line due to the use of low-speed lines can be suppressed when transmission in the high-speed line is made difficult by light loss and other optical fiber loss.

In FIG. 33, a high-speed optical signal transmitted from a device (not shown) in a prior stage is presented to a transmission node (terminal node) 10 and converted to an electrical signal in a high-speed optical transceiver 12. A plurality of low-speed electrical signals separated in a separation circuit 14 is converted to optical signals by low-speed optical transceivers 18 that constitute a WDM transmission device 16, and the optical signals are transmitted via optical fibers or other optical transmission channels 20. The optical signals transmitted from the transmission node 10 are again converted to electrical signals by low-speed optical transceivers 24 that constitute a WDM transmission device 22 in a reception node (terminal node) 25, the skew (arrival time difference or delay difference) that occurs during transmission is compensated for in a de-skew circuit 26, and the electrical signals are multiplexed in a multiplexing circuit 28. The signal is then converted to an optical signal by a high-speed optical transceiver 30 and transmitted to a high-speed optical transmission channel 31.

However, in the conventional technique described in Patent Document 1, regardless of the scheme employed for separating the high-speed signal, the skew (amount) that occurs between the plurality of low-speed optical fibers increases in proportion to the transmission distance due to the effects of wavelength dispersion in the optical fibers that are the transmission channels when a single high-speed line is divided into a plurality of low-speed lines for transmission. Consequently, a large capacity of buffer memory is required in the terminal node (reception node) that reproduces the high-speed signal. Alternatively, when the high-speed signal is separated into relatively small frames and transmitted, the allowable skew for small frames decreases in size, and the transmission distance therefore cannot be increased.

In order to overcome these problems, a plurality of relay nodes, e.g., two relay nodes ND1 and ND2, may be added between the WDM transmission devices 16 and 22 in FIG. 33, for example, as shown in FIG. 34. Such a configuration enables reproduction and relaying of electrical signals in the optical transceivers 40, 42, 44, 46 that constitute the WDM transmission devices 32, 34, 36, 38, respectively, and it is therefore possible to prevent the problem of degradation of the optical signal waveforms. However, since there is no function for skew compensation between the nodes, the skew increases according to the transmission distance, and it is sometimes impossible to compensate for the skew in the reception node 25 for terminating the high-speed frames.

Since skew compensation is made possible by physical compensation of dispersion values using dispersion-compensated fiber or the like, the problems described above can be overcome. However, a high-performance transmission system must be designed in this method, and the additional problem of high cost therefore occurs.

Optical communication devices have been developed in the past that have cross-connection capability and can accommodate client lines (see Patent Document 1, for example). FIG. 35 is a block diagram showing the conventional optical communication device disclosed in Patent Document 2. As shown in FIG. 35, this conventional optical communication device is provided with a switch card in which a time division switch and a spatial switch are combined. Specifically, in this conventional optical transmission device, a switch card 101 is provided, and a spatial switch 102 and two time division switches 103 connected to the spatial switch 102 are provided to the switch card 101. The line speed of the spatial switch 102 is 10 gigabits per second (hereinafter indicated as 10 Gb/s).

The spatial switch 102 is connected to two line cards 105 on the transmission channel side via an NNI (Network Node Interface) 104. The line cards 105 transmit high-speed traffic. Each line card 105 is provided with a plurality of 10 Gb/s lines 106 that is standardized as high-speed lines, and the 10 Gb/s lines 106 have one-to-one connections to the NNI 104.

The time division switches 103 are connected to a line card 108 on the line-out side via a UNI (User Network Interface) 107. The line card 108 transmits low-speed traffic. A plurality of 2.5 Gb/s lines 109 and 600 megabit per second (hereinafter indicated as 600 Mb/s) lines 110 is provided to the line card 108, and the lines are connected to the UNI 107.

The line speed of the low-speed traffic inputted from the line card 108 to the time division switches 103 via the UNI 107 is boosted to the line speed handled by the spatial switch 102, i.e., 10 Gb/s, by the multiplexing function provided to the time division switches 103. The line speed of the high-speed traffic transmitted through the 10 Gb/s lines 106 that are connected to the line card 105 is also equal to the line speed handled by the spatial switch 102. The line cards 105 in which the high-speed lines are mounted, and the spatial switch 102 in the switch card 101 are thereby directly connected via the NNI. As a result, the traffic of the high-speed lines and the signal in which the plurality of UNI traffic units is multiplexed can be switched in unified fashion by the spatial switch, and an optical communication device is created that has a simple overall structure.

However, the optical communication device disclosed in Patent Document 2 has such problems as the following. A first problem is that since the functions for increasing the flexibility of the device are integrated in the switch card portion, the load of the switch card increases, and the power consumption, size, and cost of the switch card increase. Relatively small size and low cost can be obtained when the spatial switch that is mounted in the switch card is limited to a specific line capacity. However, the optical communication device disclosed in Patent Document 1 uses a time division switch in order to efficiently multiplex and accommodate a plurality of client-side lines having different types and speeds. The switch card portion therefore requires a functional circuit for high-load frame processing, which results in increased power consumption. This makes it difficult to increase the density and expandability of the switch card.

As a second problem, when a mismatch exists between the speed of the NNI and the signal speed that can be processed by the spatial switch, another circuit is required to compensate for the mismatch, and the structure of the switch card therefore becomes more complex. In Patent Document 1, the speed of the spatial switch is the common speed of 10 Gb/s as the line speed of the high-speed lines connected to the NNI, but switches that are capable of operating at a line speed of 10 Gb/s are limited to small-scale electric switches or optical switches. The limitation on the line speed that can be handled by an electrical spatial switch is also documented in patent document 1. The line speed of 10 Gb/s is not only a problem of device technology for an electrical switch, but also of electrical transmission technology. There is a large amount of waveform distortion due to high transmission loss of high-frequency components at 10 Gb/s, and the transmission distance is limited to within a few centimeters unless a high degree of compensation is applied, and it is difficult to directly connect the switch to an optical transceiver or the like.

When an optical switch is used in order to process a 10 Gb/s signal, electrical/optical conversion is required prior to introduction to an optical switch, and prior to introduction of a signal inputted via the NNI to an optical switch after the signal inputted via the UNI is multiplexed. Conversely, optical/electrical conversion is necessary when a signal is conducted from an optical switch to the UNI and the NNI. As a result, the need arises to provide the switch card with an electrical/optical conversion device and an optical/electrical conversion device, which even further increases the complexity and size of the switch card.

When a line-side optical signal is introduced to an optical switch without creating an electrical termination, the cost, size, and complexity of the optical transmission function increase due to the provision of an optical transmission device for compensating for wavelength dispersion and light loss in the area of the optical switch. Unless there is a wavelength conversion device, there is no connectivity between channels in a DWDM (Dense Wavelength Division Multiplexing) signal, and the number of connectible ports is limited. Flexibility therefore decreases.

Patent Document 3 therefore discloses a technique in which the signal of a high-speed line is converted to frames by a reception circuit, and then divided into a plurality of blocks and introduced to a spatial switch, rather than being introduced to the spatial switch as an unmodified unit. FIG. 36 is a block diagram showing the spatial switch and the area around the spatial switch of the conventional optical communication device disclosed in Patent Document 3. In this conventional optical communication device as shown in FIG. 36, a spatial switch 201 is provided, four VC-4 separation units 202 are connected to the reception side of the transmission channels of the spatial switch 201, and four VC-4 multiplexers 203 are connected to the transmission side. An STM-16 reception interface 204 is connected to each VC-4 separation unit 202, and an STM-16 transmission interface 205 is connected to each VC-4 multiplexer 203. A single VC-4 separation unit 206 and a single VC-4 multiplexer 207 are connected to the subscriber side (client side) of the spatial switch 201, an STM-4 reception interface 208 is connected to the VC-4 separation unit 206, and an STM transmission interface 209 is connected to the VC-4 multiplexer 207.

In the optical communication device thus configured as disclosed in Patent Document 3, the signals inputted from the transmission channels to the STM-16 reception interfaces 204 are converted to frames by the STM-16 reception interfaces 204, and then divided into 150 Mb/s VC-4 blocks in the VC-4 separation units 202 and inputted to the optical switch 201. The signals outputted to the transmission channel side from the optical switch 201 are multiplexed in the VC-4 multiplexers 203 and are outputted via the STM-16 transmission interfaces 205. The signals inputted from the subscriber side are divided into frames by the STM-4 reception interfaces 208, divided into 150 Mb/s blocks by the VC-4 separation units 206, and inputted to the optical switch 201. The signals outputted from the optical switch 201 to the subscriber side are multiplexed in the VC-4 multiplexers 207, and outputted via the STM-4 transmission interface 209.

In this optical communication device, the signals of the high-speed line are introduced to the spatial switch after being divided into 150 Mb/s blocks rather than being introduced to the spatial switch as an unmodified unit. A primary cross connect is thereby performed between the high-speed line and the low-speed line by 150 Mb/s blocks. The signal is furthermore inputted to a time division switch (not shown), and a cross connect in smaller units is performed in order to further divide and handle the 150 Mb/s blocks on the low-speed line side. The entire circuit structure is thus simplified in Patent Document 3 by separating the switch into the levels of spatial switch and time division switch. The signal is introduced to the spatial switch after the high-speed line is separated at a speed at which electrical processing is easily performed.

Patent Document 1: Japanese Laid-open Patent Application No. 2002-135223

Patent Document 2: Japanese Laid-open Patent Application No. 2003-169355

Patent Document 3: Japanese Laid-open Patent Application No. 2003-061171

DISCLOSURE OF THE INVENTION

Problems the Invention is Intended to Solve

However, Patent Document 1 makes absolutely no mention of a measure for compensating for skew that occurs when an inverse MUX optical transmission channel extends over a long distance, and such problems as those described below are inherent in the construction of an economical optical transmission system even when the technique disclosed in Japanese Laid-open Patent Application No. 2002-135223 (Patent Document 1) is used.

Specifically, since the skew that occurs between the nodes of the transmission system cannot be assessed, it is practically impossible to switch wavelength channels inside the nodes in order to switch wavelength channels.

In long-distance transmission using an inverse MUX scheme by the WDM transmission device, overcoming the problems described above is extremely important not only from the perspective of reducing the transmission load created by the use of a low-speed transmission technique, but also from the perspective of being able to respond to the increase in transmission speed per unit port.

In the optical communication device disclosed in Patent Document 3, the structure can be considered simple when only the switch portion is considered, but frame processing and multiplex separation for connecting lines to the switch are necessary in the UNI and the NNI that are the interfaces for connecting with the switch. As a result, where a single IC for performing frame processing and multiplex separation was originally adequate, at least two of such ICs must be provided to the process from the UNI to the switch, and from the switch to the NNI. The power consumption of the frame processing portion increases and impedes increasing the density, particularly for such devices as accommodate numerous high-speed lines having speeds of 10 Gb/s.

In Patent Document 3, frame processing must be performed in the periphery of the switch, and the protocol to which the switch is adapted is therefore limited. Protocol dependency therefore occurs, transparent cross connection becomes impossible, and the flexibility of the device decreases.

An object of the present invention is to provide an optical communication method whereby the skew that occurs between adjacent nodes provided with low-speed transmission channels can be automatically measured by a simple method, nodes for which wavelength channel switching is to be performed can be automatically determined, the skew can be compensated for in a WDM low-speed transmission channel by automating the determination of nodes in which wavelength channels are switched, and the low-speed transmission channels can be elongated without increasing the operation cost in WDM transmission using an inverse MUX scheme.

Another object of the present invention is to provide an optical communication device that is capable of cross connection, wherein the optical communication device has low cost, small size, high transmission performance, and high flexibility and expandability.

Means for Solving the Problems

The optical communication method of the present invention is an optical communication method in which a plurality of nodes each having a cross-connect switch and a WDM (wavelength division multiplexing) transmission function is provided to an inverse MUX transmission channel, a plurality of wavelength channels is present between adjacent nodes, and a skew that occurs in the inverse MUX transmission channel is kept below a prescribed value, wherein the optical communication method comprises a step (a) for measuring the skew between wavelength channels provided between adjacent nodes, and a step (c) for setting the cross-connect switch of the node determined in step (b) for wavelength channel switching.

In a preferred configuration of the present invention, measurement of the skew between wavelength channels provided between adjacent nodes in step (a) is performed by a skew measurement device provided to each node, the cross-connect switch of a first node of the adjacent nodes is set so that two test signals generated from a corresponding first skew measurement device are transmitted in two wavelength channels, the cross-connect switch of a second node of the adjacent nodes is set so that the two test signals transmitted from the first node via the two wavelength channels are inputted to a corresponding second skew measurement device, and the skew between the wavelength channels of the adjacent nodes is measured in the second skew measurement device.

The present invention may also be configured so that measurement of the skew between adjacent nodes in step (a) is performed by a skew measurement device provided to each node, the cross-connect switch of a first node of the adjacent nodes is set so that a single test signal generated from a corresponding first skew measurement device is branched and transmitted in two wavelength channels, the cross-connect switch of a second node of the adjacent nodes is set so that the two test signals transmitted from the first node via the two wavelength channels are inputted to a corresponding second skew measurement device, and the skew between the wavelength channels of the adjacent nodes is measured in the second skew measurement device.

Setting of the cross-connect switch of the node for performing wavelength switching in step (c) may include a step for transmission testing between terminal nodes, and the transmission testing may have a step for performing skew measurement under direction of the skew measurement device provided to each node through multicasting of the cross-connect switch of each node for two wavelength channels among the wavelength channels in which inverse MUX transmission is performed.

Furthermore, in the present invention, the step for determining a relay node for performing wavelength switching in step (b) may include a step for specifying an optimum node for line termination when skew conditions specified in advance cannot be satisfied even by wavelength switching.

Furthermore, the present invention may have a step in which the skew measured in step (a) is transmitted to a network control device via an external network.

The optical communication device of the present invention is provided to an inverse MUX transmission channel, and comprises a plurality of nodes that each has a cross-connect switch and a WDM (wavelength division multiplexing) transmission function, and a skew measurement device provided to each of the plurality of nodes; and the optical communication device is characterized in that a test signal for skew measurement is generated from one skew measurement device provided to adjacent nodes, the cross-connect switch is set so that a test signal is transmitted in a wavelength channel between the adjacent nodes, the test signal is received by the other skew measurement device provided to the adjacent nodes, and the skew between the adjacent nodes is measured.

In the optical communication device, the skew measurement device may comprise a transmission unit having a test signal generation unit; a test signal detection unit for receiving the test signal and detecting the test signal; and a skew measurement unit for measuring a skew from the detected test signal.

The cross-connect switch may be an electrical spatial switch.

The optical communication system of the present invention is characterized in comprising a plurality of nodes, transmission-channel-side optical lines for transmitting optical signals between the nodes, client-side optical lines connected to at least one of the nodes, and an optical communication device to which the transmission-channel-side optical lines and the client-side optical lines are connected that performs cross connection of both types of the optical lines, wherein the optical communication device has a first functional block to which the transmission-channel-side optical lines are connected, and a second functional block to which the client-side optical lines are connected; the first functional block has a first optical transceiver module connected to the transmission-channel-side optical lines that performs conversion between optical signals and electrical signals, and an electrical spatial switch that is connected to the first optical transceiver module and the second functional block; and the first optical transceiver module and the spatial switch operate at a multi rate of 5 Gb/s or less; wherein in the transmission-channel-side optical lines, an optical signal is separated into a plurality of separated signals and allocated to a plurality of wavelength channels for transmission, the sequence of wavelengths of the wavelength channels allocated to the separated signals of the inputted optical signal is switched and outputted in reverse in at least one of the nodes, and switching of the wavelength channels is performed in one or a plurality of nodes so that the amount of skew between the allocated wavelength channels is equal to or less than a prescribed amount in the plurality of nodes that includes a node that terminates a line.

The optical communication system of the present invention is characterized in comprising a plurality of nodes, transmission-channel-side optical lines for transmitting optical signals between the nodes, client-side optical lines connected to at least one of the nodes, and an optical communication device to which the transmission-channel-side optical lines and the client-side optical lines are connected that performs cross connection of both types of the optical lines, wherein the optical communication device has a first functional block to which the transmission-channel-side optical lines are connected, and a second functional block to which the client-side optical lines are connected; the first functional block has a first optical transceiver module connected to the transmission-channel-side optical lines that performs conversion between optical signals and electrical signals, and an electrical spatial switch that is connected to the first optical transceiver module and the second functional block; and the first optical transceiver module and the spatial switch operate at a multi rate of 5 Gb/s or less; wherein an optical signal is separated into a plurality of separated signals and allocated to a plurality of wavelength channels for transmission in the transmission-channel-side optical lines, the sequence of wavelengths of the wavelength channels allocated to the separated signals of the inputted optical signal is switched and outputted in reverse in at least one of the nodes, and switching of the wavelength channels is performed in one node so that the amount of skew between the allocated wavelength channels is equal to or less than a prescribed amount in a node that terminates a line.

In the optical communication device used in these optical communication systems, the first optical transceiver module and the spatial switch operate at a multi rate of 5 Gb/s, thereby enabling optical fiber transmission over a distance of 100 km or more by a simple system in which a semiconductor laser is directly modulated. The cost and size of the optical communication device can thereby be reduced, and the transmission capability can be enhanced. The flexibility and expandability of the optical communication device can be enhanced by dividing the optical communication device into a first functional block to which transmission-channel-side optical lines are connected, and a second functional block to which client-side optical lines are connected.

The first optical transceiver module is preferably pluggable. The flexibility and expandability of the optical communication device are thereby further enhanced.

In a preferred configuration, the second functional block has a second optical transceiver module for performing conversion between optical signals and electrical signals that is connected to the client-side optical lines; and a protocol chip for performing frame processing of an electrical signal outputted from the second optical transceiver module and outputting the electrical signal as a serial signal at 5 Gb/s or less to the spatial switch. By providing a protocol chip to the second functional block, the structure of the first functional block is simplified, reduced size and cost of the optical communication device can be anticipated, and expandability can be enhanced.

The optical communication system of the present invention is characterized in having a plurality of nodes, transmission-channel-side optical lines for transmitting an optical signal between the nodes, and client-side optical lines connected to at least one of the nodes, wherein the node to which the client-side optical line is connected is composed of the optical communication device.

In a preferred configuration, an optical signal is separated into a plurality of separated signals and allocated to a plurality of wavelength channels for transmission in the transmission-channel-side optical lines, and the sequence of wavelengths of the wavelength channels allocated to the separated signals of the inputted optical signal is switched and outputted in reverse in at least one of the nodes. Wavelength dispersion that occurs in the optical lines can thereby be counteracted among the plurality of optical lines, and the amount of skew can be reduced.

The optical communication method of the present invention is an optical communication method for transmitting an optical signal via an optical line between a plurality of nodes; and the optical communication method is characterized in that an optical signal inputted from the optical line connected to one side of the optical communication device is converted to an electrical signal by an optical transceiver module that operates at a multi rate of 5 Gb/s or less, the transmission destination of the electrical signal is switched by a spatial switch that operates at a multi rate of 5 Gb/s or less, the electrical signal is converted to an optical signal by an optical transceiver module that operates at a multi rate of 5 Gb/s or less, and the optical signal is outputted to the optical line connected to the other side of the optical communication device in an optical communication device that constitutes the nodes; the optical signal is separated into a plurality of separated signals and allocated to a plurality of wavelength channels for transmission in the transmission-channel-side optical lines, and the sequence of wavelengths of the wavelength channels allocated to the separated signals of the inputted optical signal is switched and outputted in reverse in at least one of the nodes; and switching of the wavelength channels is performed in one or a plurality of nodes so that the amount of skew between the allocated wavelength channels is equal to or less than a prescribed amount in a plurality of nodes that includes a node that terminates a line.

The optical communication method of the present invention is an optical communication method for transmitting an optical signal via an optical line between a plurality of nodes; and the optical communication method characterized in that an optical signal inputted from the optical line connected to one side of the optical communication device is converted to an electrical signal by an optical transceiver module that operates at a multi rate of 5 Gb/s or less, the transmission destination of the electrical signal is switched by a spatial switch that operates at a multi rate of 5 Gb/s or less, the electrical signal is converted to an optical signal by an optical transceiver module that operates at a multi rate of 5 Gb/s or less, and the optical signal is outputted to the optical line connected to the other side of the optical communication device in an optical communication device that constitutes the nodes; the optical signal is separated into a plurality of separated signals and allocated to a plurality of wavelength channels for transmission in the transmission-channel-side optical lines, and the sequence of wavelengths of the wavelength channels allocated to the separated signals of the inputted optical signal is switched and outputted in reverse in at least one of the nodes; and switching of the wavelength channels is performed in one node so that the amount of skew between the allocated wavelength channels is equal to or less than a prescribed amount in a node that terminates a line.

EFFECTS OF THE INVENTION

The optical communication method of the present invention makes it possible to use a simple method to automatically measure the skew that occurs between adjacent nodes that are provided to a low-speed transmission channel in WDM transmission using an inverse MUX scheme, and also to automatically determine the nodes for which wavelength channel switching is to be performed. Since skew can be compensated for in a WDM low-speed transmission channel by automating the determination of nodes for which wavelength channel switching is to be performed, a low-speed transmission channel can be lengthened without increasing the operation cost.

According to the optical communication system of the present invention, the first optical transceiver module and the spatial switch operate at a multi rate of 5 Gb/s or less. A cross-connectable optical communication device can thereby be obtained that has low cost, small size, and high transmission capability, flexibility, and expandability.

BRIEF DESCRIPTION OF THE DRAWINGS

FIG. 1 is a block diagram showing an embodiment of inverse MUX transmission according to the present invention;

FIG. 3 is a diagram in which the flow of the test signal in the embodiment shown in FIG. 1 is indicated by bold lines;

FIG. 4 is a flowchart showing the steps for skew measurement and skew compensation on the basis of the measured result according to an embodiment of the present invention;

KEY

Figure 2A:
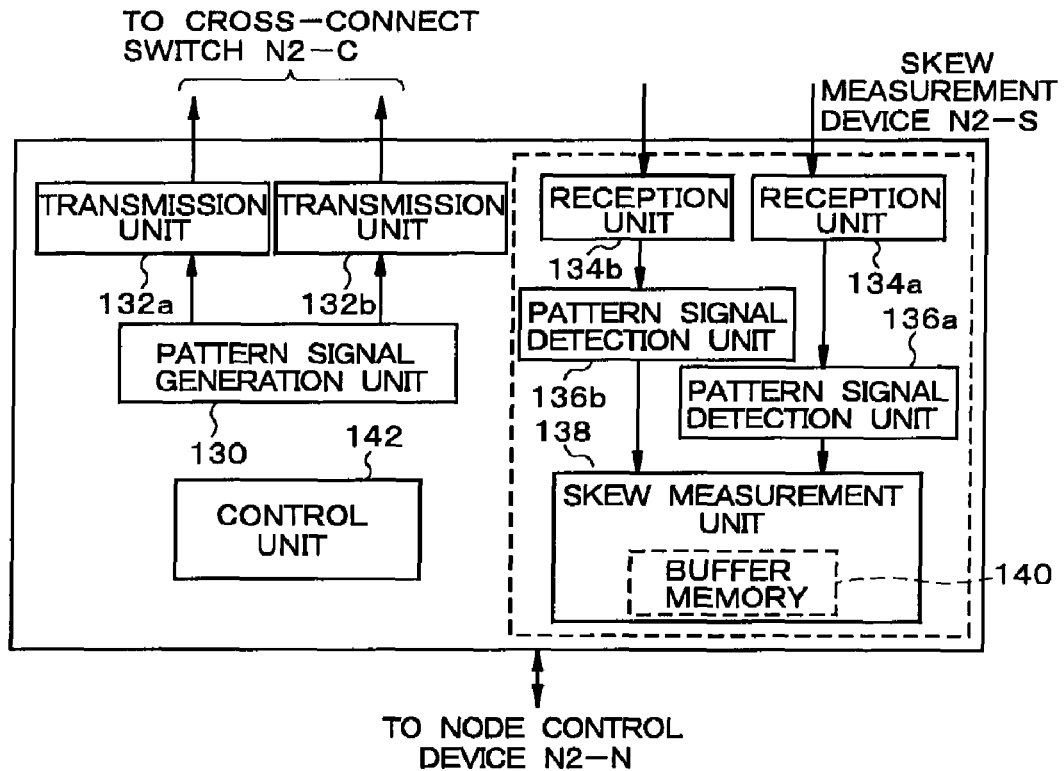
FIG. 2 is a diagram showing the skew measurement device shown in the block diagram of FIG. 1.

1: optical communication device
2: NNI functional block
3: UNI functional block
3a: UNI functional block (20 Gb/s)
4: connection part
5: high-speed line
6: low-speed connections
7: backplane port 8: spatial switch
9: CDR chip
10: DWDM optical transceiver module
11: wavelength separation filter
12: wavelength multiplexing filter
13: optical transceiver
14: protocol chip
15: selector
16: working backplane port
17: reserve backplane port
21: fiber-optic cable
21a: branched cable
24: protocol chip
25: chassis
26: power supply block
27: optical parallel transceiver
28: mid plane
31: optical amplification unit
32: preamplifier
33: booster amplifier
34: optical amplification unit
35: variable attenuator
36: forward error correction chip
37: wavelength monitoring unit
38: tap coupler
39: spectral monitoring device
40: wavelength monitoring unit
41: (1×4) optical switch
51: optical communication system
52: optical fiber
53: 10 Gb/s line
55a, 55b: large-scale expansion switching units
61: optical communication system
62: large-capacity line
A, B, C: nodes
F1 through F4: transmission channels
N1 through NM: nodes
X1 through X4: lanes
$\lambda 0$ through $\lambda 7$: wavelength channels
102: high-speed optical line
104: high-speed transceiver
106: line separation circuit
110: de-skew circuit
112: line multiplexing circuit
114: high-speed transceiver
115: high-speed optical line
N1-C through Nn-C: cross-connect switches
N1-S through Nn-S: skew measurement devices
N1-N through Nn-N: node control devices
116: external network
118: network control device
130: pattern signal generator
132a, 132b: transmission units (interfaces)
134a, 134b: reception units (interfaces)
136a, 136b: pattern signal detection units
138: skew measurement unit
140: buffer memory

BEST MODE FOR CARRYING OUT THE INVENTION

An embodiment of the optical communication method of the present invention will next be described in detail with reference to the accompanying drawings.

FIG. 1 is a block diagram showing a schematic view of an entire optical transmission system in which the optical communication method of the present invention is applied. The transmission system shown in FIG. 1 has n (wherein n is a positive integer) nodes N1 through Nn, and high-speed lines are accommodated by the nodes N1 and Nn at both ends. For example, the terminal node N1 is the client side, and the other terminal node Nn is the line side.

A "right-directed transmission system" and a "left-directed transmission system" are shown in the diagram of the transmission system in FIG. 1, and since the structure, function, and operation of the right- and left-directed transmission systems are the same, only the right-directed transmission system will be described.

A high-speed line 102 is housed in the terminal node N1, and a high-speed optical signal transmitted in the high-speed line 102 is converted to an electrical signal by a high-speed optical transceiver 104 and separated into four low-speed electrical signals by a separation circuit 106. The number of separated low-speed signals herein is merely an example, and the present invention is not limited by this number. The four low-speed electrical signals are inputted to a cross-connect switches (electrical spatial switches) N1-C via four corresponding low-speed lines 108. In order to simplify the description, it is assumed that the input side and the output side of the cross-connect switch are connected as indicated by the dashed lines prior to the "wavelength channel switching" of the present invention.

The output of the cross-connect switch N1-C is wavelength-multiplexed by a wavelength multiplexing filter (not shown) after being converted to an optical signal by four corresponding transceivers N1-T, and is transmitted to the intermediate node N2 of the subsequent stage via a single optical transmission channel (optical fiber). The optical signal thus transmitted is wavelength-multiplexed in a wavelength separation filter (not shown) of the intermediate node N2, and inputted to four corresponding transceivers N2-T1.

The optical signal is converted to an electrical signal in the transceivers N2-T1, and the converted electrical signal is converted to an optical signal by the transceiver N2-T2 via the cross-connect switch N2-C. The converted optical signal is wavelength-separated by a wavelength multiplexing filter (not shown) in the same manner as described above and inputted to the transceiver N3-T1 of the subsequent intermediate node N3 via a single optical transmission channel (optical fiber) F2. The intermediate node N3 has the same structure and function as the intermediate node N2, and will not be described. The transceivers of the stages before and after node N3 are indicated as N3-T1 and N3-T2, and the cross-connect switch is indicated as N3-C.

The signal processing performed in the right-end node Nn is the substantial opposite of the processing performed in the left-end node N1. Specifically, the optical signal transmitted by the optical transmission channel is converted to an electrical signal by transceiver Nn-T and inputted to a de-skew circuit 110 via cross-connect switch Nn-C, and skew compensation is performed in the de-skew circuit 110. A high-speed line is then regenerated in a multiplexing circuit 112, and the signal is converted to an optical signal in an optical transceiver 114 for a high-speed circuit and outputted to a high-speed optical line 115.

For convenience in the description, the highest (top of the diagram) of the plurality of low-speed transmission channels used in inverse MUX transmission in FIG. 1 will be designated as the longest-wavelength channel, and the lowest low-speed transmission channel will be designated as the shortest-wavelength channel. The wavelengths used in signal transmission through the intermediate transmission channels decrease in order from top to bottom.

When the high-speed optical signal is converted to an electrical signal, the electrical signal is separated by the separation circuit, and each electrical signal is allocated to a WDM (wavelength division multiplexing transmission) wavelength and transmitted in an optical fiber, a skew occurs between the wavelength channels due to the effects of wavelength dispersion (a phenomenon in which optical signals in different wavelengths are propagated at different speeds). Skew compensation is performed in the de-skew circuit 110 shown in FIG. 1, but this compensation has problems in that the skew varies according to the length of the optical transmission channel in which the separated signal is transmitted, and the skew becomes impossible to compensate for by the standard specification of the de-skew circuit 110 particularly when the WDM optical transmission channel is long.

In order to overcome this problem, an inverse MUX transmission scheme that uses large frames must be used, and a large amount of buffer memory must be provided in the terminal node Nn, thereby making the structure complex. The problem can be overcome by using the cross-connect switch of an appropriate node to perform wavelength channel switching, but the conventional technique is incapable of automatically determining the appropriate node. As described above, the present invention overcomes this problem.

To overcome the problem described above, skew measurement devices N1-S through Nn-S are provided to the nodes N1 through Nn, respectively, in the present embodiment. The skew measurement devices N1-S through Nn-S are connected to node control devices N1-N through Nn-N, respectively. In the case shown in FIG. 1, the node control devices N1-N through Nn-N are connected to a network control device 118 via an external network 116.

The skew measurement devices N1-S through Nn-S each have the same structure, and have two lines for presenting a test signal to the corresponding cross-connect switch, and two lines for receiving a test signal from the cross-connect switch. Specifically, two ports for transmitting and receiving test signals are provided to each skew measurement device and each corresponding cross-connect switch.

The skew measurement devices (N1-S through Nn-S) shown in block format in FIG. 1 will next be described with reference to FIG. 2. Since the skew measurement devices N1-S through Nn-S each have the same structure, the skew measurement devices N2-S and N3-S will be described as representative examples. It should be noted herein that the two pattern signals from the pattern signal generator 130 of the skew measurement device N2-S shown in FIG. 2A are delivered to the cross-connect switch N2-C via transmission units 132a and 132b, respectively, and inputted to reception units 134a and 134b of the skew measurement device N3-S shown in FIG. 2B via an optical transmission channel F2 (FIG. 1). In other words, the reception unit 150 of FIG. 2A and the transmission unit 152 of FIG. 2B are used to measure the skew of the right-to-left transmission channel shown in FIG. 1.

The bold lines in FIG. 3 indicate the flow of a pattern signal in skew measurement "between nodes N2 and N3" described below, which is participated in by skew measurement device N2-S and skew measurement device N3S.

Figure 2B:
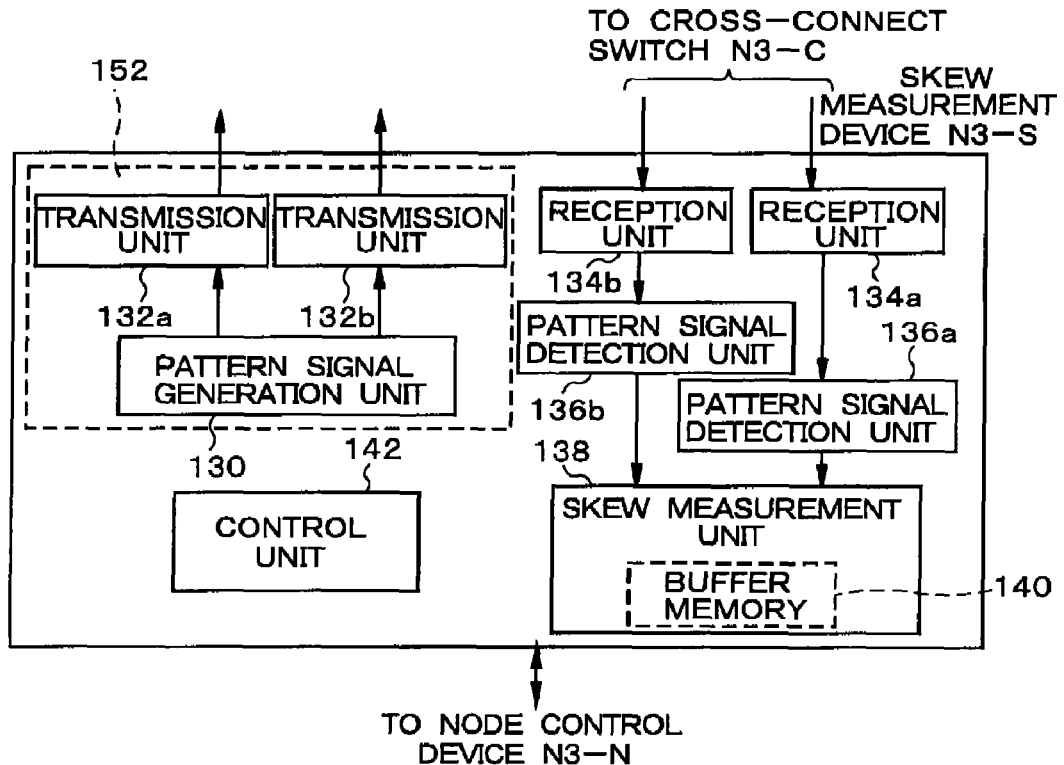

As shown in FIGS. 1 and 2, two pattern signals (alignment signals) are outputted from the pattern signal generator 130 shown in FIG. 2A. The two pattern signals are transmitted to cross-connect switch N2-C via the transmission units (interfaces) 132a and 132b, and are inputted to skew measurement device N3-S shown in FIG. 2B through the optical transmission channel F2 and the cross-connect switch N3-C between nodes N2 and N3. In other words, the two pattern signals from skew measurement device N2-S are detected in pattern signal detection units 136a and 136b via the reception units 134a and 134b shown in FIG. 2B, respectively, and are stored in buffer memory 140 of the skew measurement unit 138 of the subsequent stage.

The skew measurement unit 138 compares the two pattern signals stored in the buffer memory 140 to measure the maximum skew that occurs between the longest-wavelength channel and the shortest-wavelength channel. The maximum skew thus measured is transferred to the network control device 118 via the external network 116 in accordance with the control performed by a control unit 142. The control unit 142 controls the operation of the skew measurement unit, as well as the overall operation of the pattern generator, the pattern detection unit, and other skew measurement units. The same applies for the control unit 142 shown in FIG. 2A.

As described above, the reception unit 150 of skew measurement device N2-S in FIG. 2A, and the transmission unit 152 of skew measurement device N3-S in FIG. 2B measure the skew in the left-directed transmission channel that extends right to left in FIG. 1, and measure skew in the same manner as the skew is measured in the right-directed transmission channel as presently described. The reception unit 150 and the transmission unit 152 therefore will not be described. However, the same reference symbols as those used for the reception components of FIG. 2B and the transmission components of FIG. 2A will be used for constituent elements of the reception component 150 in FIG. 2A, and constituent elements of the transmission unit components 52 of FIG. 2B.

The network control device 118 receives the maximum skew measured by skew measurement device N3-S via the external network 116, as described above. Before the maximum skew is received, the network control device 118 instructs the selection of the ports of the node control devices N2-N and N3-N so that the test signal shown in FIG. 3 flows to the node control devices N2-N and N3-N.

The network control device 118 also issues an instruction to the node control devices (N1-N, Nn-N, and others) other than the node control device that is connected to nodes N2 and N3 so that the maximum skew between the two adjacent nodes for all the nodes N1 through Nn shown in FIG. 1 is measured, and the network control device 118 receives the results.

The measurement of the maximum skew between adjacent nodes by the network control device 118 (FIG. 1) and the control units 140, 142 (FIG. 2) will be described with reference to the flowchart shown in FIG. 4.

In the first step S1, the network control device 118 specifies the transmission channel, i.e., the adjacent nodes, for which the maximum skew is to be measured. The nodes are specified by the node control device (N1-N, etc.) in the case of FIG. 1). For convenience in the description, the upstream node in the transmission channel is designated as the starting node, and the downstream node in the transmission channel is designated as the ending node. The node control device then connects the two transmission units of the skew measurement device of the starting node to the transceivers of the longest-wavelength channel and the shortest-wavelength channel via the corresponding cross-connect switch (step S2). The node control device also connects the two reception units of the skew measurement device of the ending node to the transceivers of the longest-wavelength channel and the shortest-wavelength channel via the corresponding cross-connect switch (step S3). The control unit 142 that receives the instruction from the network control device 118 via the node control device then transmits two test signals from the skew measurement device of the starting node to the two transmission units (step S4).

In step S5, the two test signals are received by the skew measurement device of the ending node, and the maximum skew is measured in the skew measurement device. The measured skew is transmitted to the network control device 118 via the corresponding node control device and the external network 116. In step S6, a check is performed as to whether there are any unmeasured transmission channels (specifically, lack of measurement in the transmission channels between all adjacent nodes), and when an unmeasured transmission channel is present, the process returns to step S1, and the abovementioned operations are repeated. When there are no unmeasured transmission channels, the process proceeds to step S7.

In step S7, the network control device 118 determines which node (single node or multiple nodes) in which to change the wavelength ascension order of the wavelength channels on the basis of the maximum skew transmitted from the skew measurement device. In step S8, the wavelength ascension order of the wavelength channels is changed in the determined node. The wavelength ascension order conversion performed herein is a switching of the order of the low-speed transmission channels (wavelength channels) that is the wavelength sequence.

In the case shown in FIG. 1, the skew measurement devices (N1-S, etc.) are connected to the node control devices (N1-N, etc.), but the skew measurement devices may also be directly connected to the external network 116.

In FIG. 1, the maximum skew measured between adjacent nodes is indicated by the reference symbol Sn (wherein n=1, 2, 3, . . . (n−1)). The maximum skew Sn is proportional to the distance of the transmission channels between adjacent nodes when the transmission channels (fibers) are all composed of the same time of fiber. A negative value can also occur according to the type of transmission channel. For the nodes in this arrangement, a parameter Pn is introduced for nodes in which wavelength ascension order conversion is performed for the wavelength channels, wherein Pn=−1 for nodes in which wavelength ascension order conversion is performed for the wavelength channels, and Pn=1 for nodes in which wavelength ascension order conversion is not performed for the wavelength channels. When the abovementioned maximum skew Sn and the parameter Pn are used, the skew (i.e., the total skew of the WDM transmission system) Rn (n>2) that remains after signal transmission from node N1 to node Nn is indicated by Equation 1 below.

$$R_n = \sum_{k=1}^{n} \left( S_{k-1} \left( \prod_{j=1}^{k-1} P_j \right) \right)$$ [Equation 1]

Since the skew between adjacent nodes is known, Rn can be used to determine a node in which to perform wavelength ascension order conversion. More specifically, the residual skew Rn of the transmission system shown in FIG. 1 must be kept equal to or below a prescribed value out of consideration for the de-skew compensation capability of the de-skew circuit 110. When this "prescribed value," i.e., prescribed value, is set to Smax, the network control device 118 must switch the wavelength channels (wavelength ascension order conversion) in a certain node when the residual skew Rn exceeds the prescribed value Smax. If Rn is less than Smax as a result of performing wavelength channel switching in any of the plurality of nodes, wavelength channel switching may be performed in any of the plurality of nodes.

Alternatively, the node in which to perform wavelength channel switching may be determined in the following manner. Specifically, the residual skew $R_3$ at N3 is compared with the prescribed value Smax in a case in which the parameter $P_1$ of the transmission channels of the first adjacent nodes N1 and N2 is set to −1 or 1 (i.e., switching or no switching of wavelength channels), and the parameter $P_2$ of the transmission channels of the subsequent adjacent nodes N2 and N3 is set to 1. The parameter $P_2$ is set equal to 1 (i.e., no switching of wavelength channels is performed) when $R_3 \leq$ Smax, and the parameter $P_2$ is set equal to −1 (i.e., switching of wavelength channels is performed) when $R_3 >$ Smax. The residual skew $R_4$ is calculated using the set $P_1$ and $P_2$, and $P_3$ is then determined. This operation is continued until the final node Nn, and a final determination is made as to which nodes require wavelength channel switching.

Figure 5:
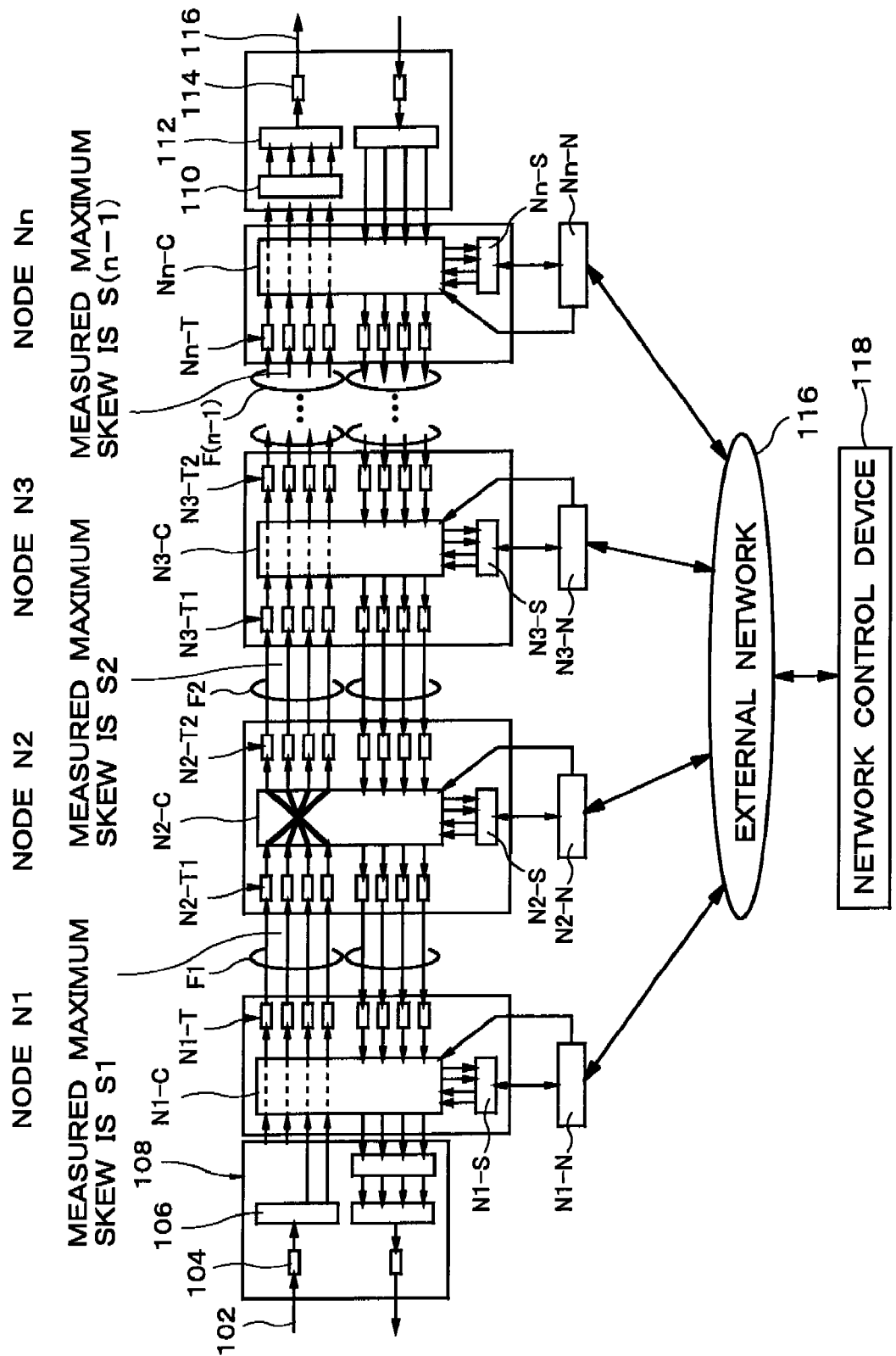
FIG. 5 is a block diagram showing the manner in which the execution of skew compensation in the cross-connect switch of a certain node is verified in an embodiment of the present invention.

FIG. 5 is a diagram showing the manner in which wavelength ascension order switching of wavelength channels is performed in node N2. Specifically, in cross-connect switch N2-C, the longest-wavelength channel is connected to the shortest-wavelength channel, the shortest-wavelength channel is connected to the longest-wavelength channel, the wavelength channel that is second from the top is connected to the wavelength channel third from the top, and the wavelength channel that is third from the top is connected to the wavelength channel second from the top.

Measuring the skew that occurs between adjacent nodes in this manner makes it possible to keep the skew that occurs in transmission channels in the WDN (optical wavelength division multiplexed transmission) shown in FIG. 1 at a prescribed value without acquiring the amount of wavelength dispersion, the wavelength gap of a wavelength channel, and other transmission channel parameters in advance.

Setting of the inverse MUX transmission path is completed by determining the nodes in which wavelength ascension order conversion will be performed, and setting the cross-connect switches of the nodes thus determined. However, a test for confirming the path setting is preferably performed in order to determine whether the optimum setting has actually been performed.

Figure 6:
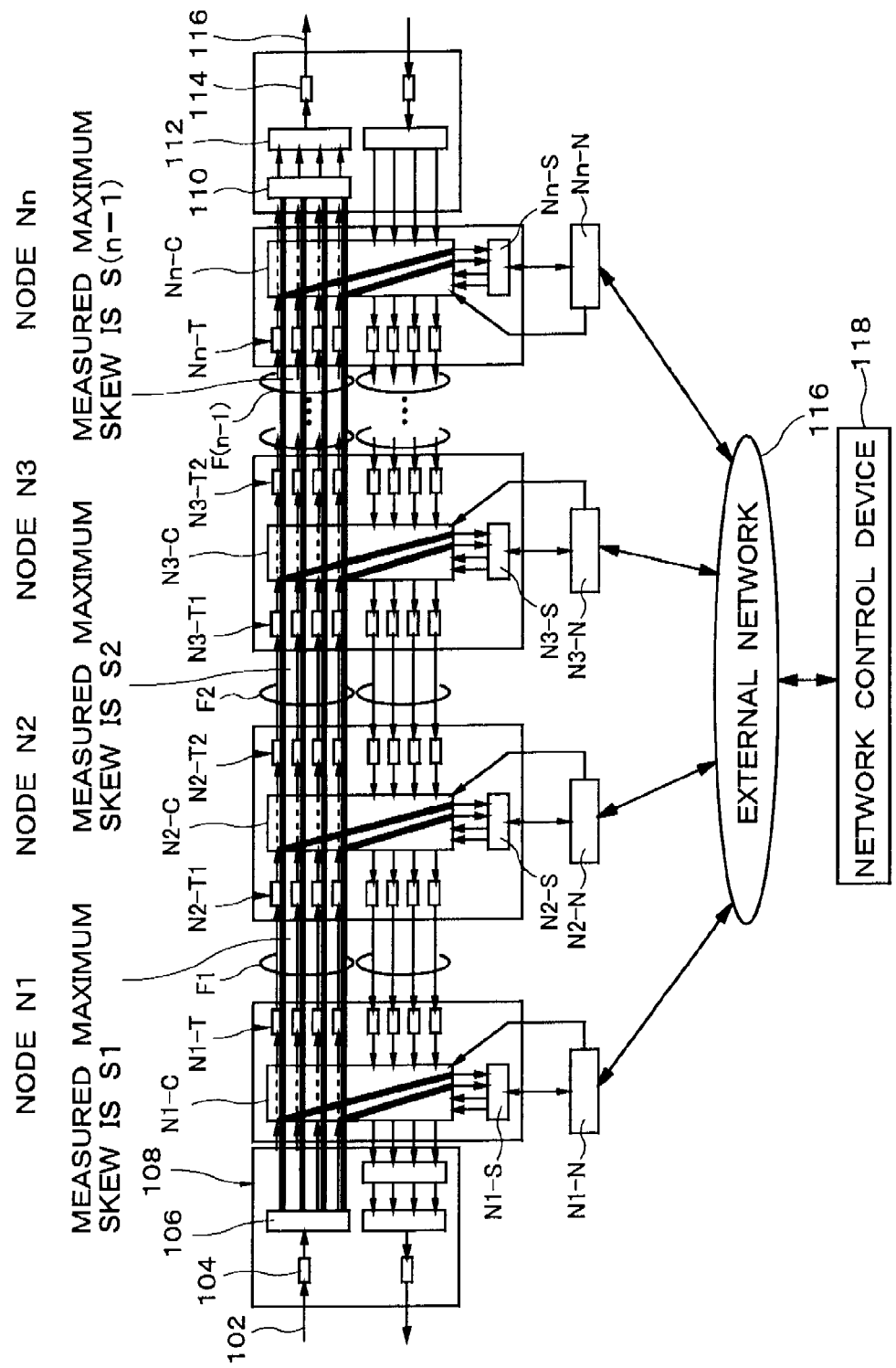
FIG. 6 is a block diagram showing the manner in which verification is made after skew compensation as to whether skew compensation was performed as desired in an embodiment of the present invention.

To implement this confirmation test, the multicast functions of the cross-connect switches of the relay nodes and the terminal nodes are used to branch the signals of the longest-wavelength and shortest-wavelength channels and connect the signals to the skew measurement devices, whereby the cumulative value of the maximum skew in each node can be measured, as shown in FIG. 6. Accordingly, a highly stable line setting can be performed by a managed assessment of whether the skew is in accordance with the setting in each node while in a state of actual signal transmission. In other words, this device can be implemented at all times without affecting the line state even when the line is actually in use. The skew of the transmission channels can therefore be monitored at a low sustained cost.

Only right-directed signal transmission was described in this example. Time-delayed switching and other schemes are needed when monitoring the left-directed skew. The present embodiment can be applied not only to skew monitoring, but also to signal quality monitoring. In this case, since two inputs are not required in the skew measurement device, the line quality can be monitored in both the right direction and the left direction at the same time. A measure for time-delayed switching the switches may also be devised when a plurality of wavelength channels is monitored.

A measure for resetting the skew in a relay node is needed in such cases as when the specified skew conditions cannot be satisfied in the step described above for determining the node in which wavelength ascension order conversion is performed. In this case, a function is preferably provided for automatically specifying a node to be terminated. A functional component for terminating the line and resetting the skew is preferably connected via the cross-connect switch of a node for line termination of the specified node. Relay nodes in which the line termination described above was performed may then be newly designated as reception nodes and transmission nodes, and wavelength-switched nodes may be determined in each line path thereof as hitherto described.

In the description given above, the maximum skew measured in each node was transmitted to the network control device 118 via the external network 116, and skew compensation of the transmission system was controlled in the network control device 118. However, the skew compensation of the present invention described above can also be performed by providing the function of the network control device 118 to a specific node control device without the use of the external network 116 and the network control device 118. This configuration is shown in FIG. 7.

Figure 8:
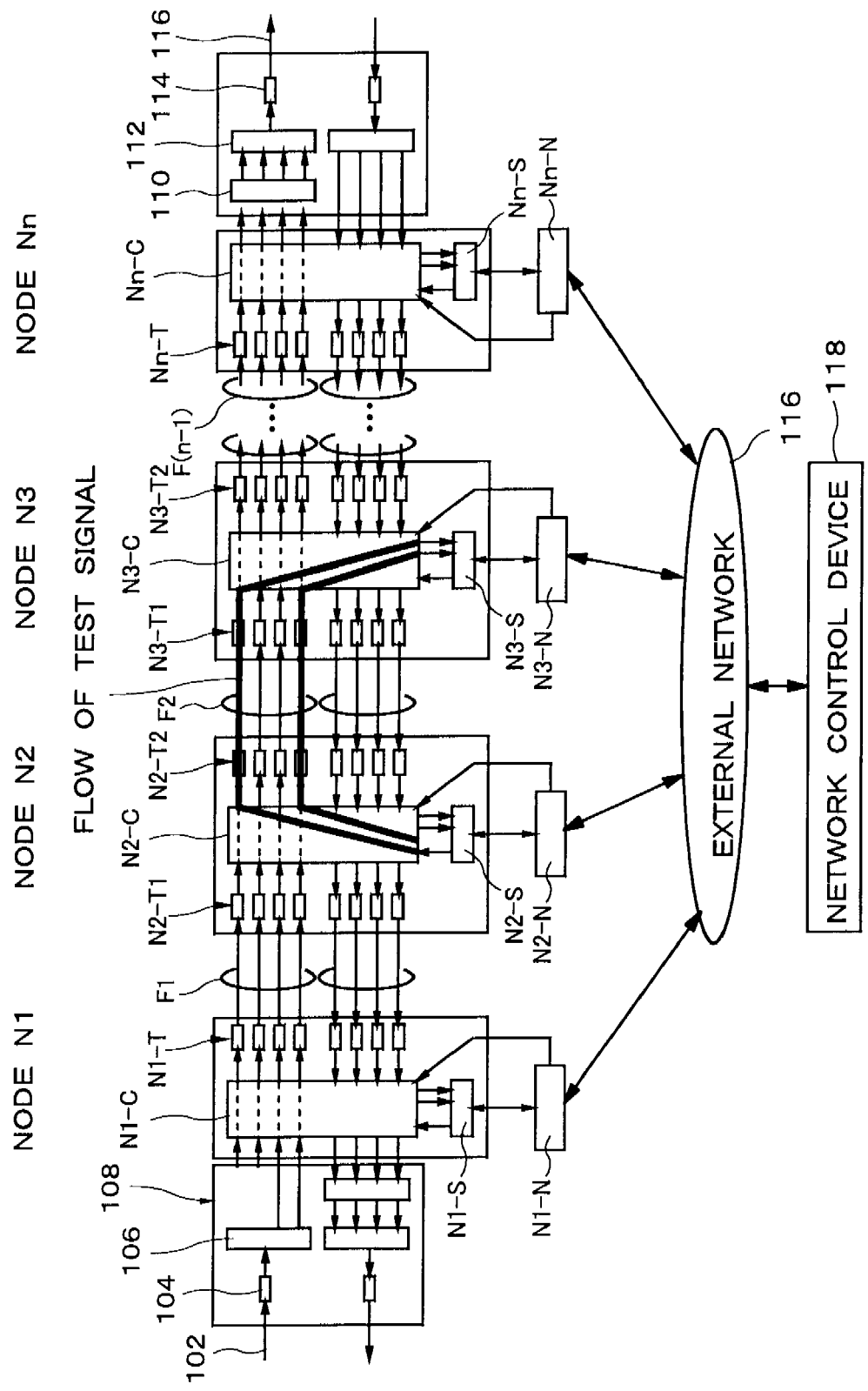
FIG. 8 is a block diagram showing another modified example of the embodiment of the present invention.

A modified example of the present embodiment will be described with reference to FIG. 8. As shown in FIG. 2, it was assumed in the prior example that two transmission units were provided to skew measurement device, but one of the two transmission units may also be omitted. In the modified example, it is sufficient for the pattern signal generator 130 (FIG. 2) to generate a single pattern signal. When such a configuration is adopted, the multicast function of the cross-connect switch is utilized to branch a single pattern signal into two pattern signals that are transmitted to the two transmission units of the skew measurement device of the adjacent node.

Figure 7:
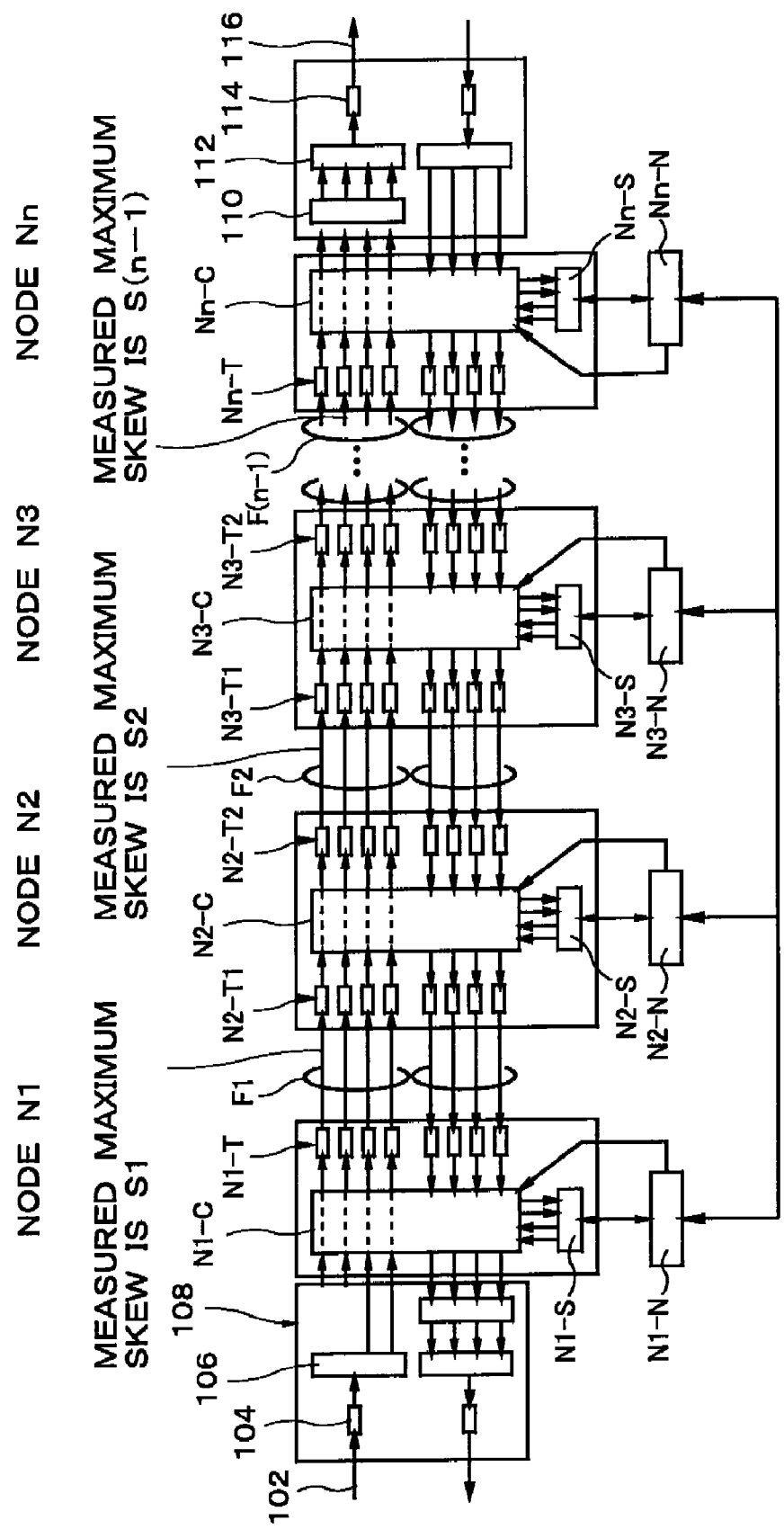
FIG. 7 is a block diagram showing a modified example of the embodiment of the present invention.

Furthermore, in the above description, the external network is used to control the node control devices (N1-N through Nn-N) as shown in FIG. 1, or the plurality of node control devices is directly connected to perform skew compensation as shown in FIG. 7. However, when there is a transmission channel that is not used in signal transmission among the plurality of low-speed transmission channels, skew compensation may be performed using a configuration in which a plurality of node control devices is connected via the unused transmission channel, and overall control is performed by one of the node control devices.

As described above, the present invention makes it possible to use a simple method to automatically measure the skew that occurs between adjacent nodes that are provided to a low-speed transmission channel in WDM transmission using an inverse MUX scheme, and also to automatically determine the nodes for which wavelength channel switching is to be performed. A simple method can be used to automatically measure the skew that occurs between adjacent nodes that are provided to a low-speed transmission channel, and the nodes for which wavelength channel switching is to be performed can be automatically determined in a WDM low-speed transmission channel by automating the determination of nodes for which wavelength channel switching is to be performed. Since skew can be compensated for in a WDM low-speed transmission channel by automating the determination of nodes for which wavelength channel switching is to be performed, a low-speed transmission channel can be lengthened without increasing the operation cost.

Figure 9:
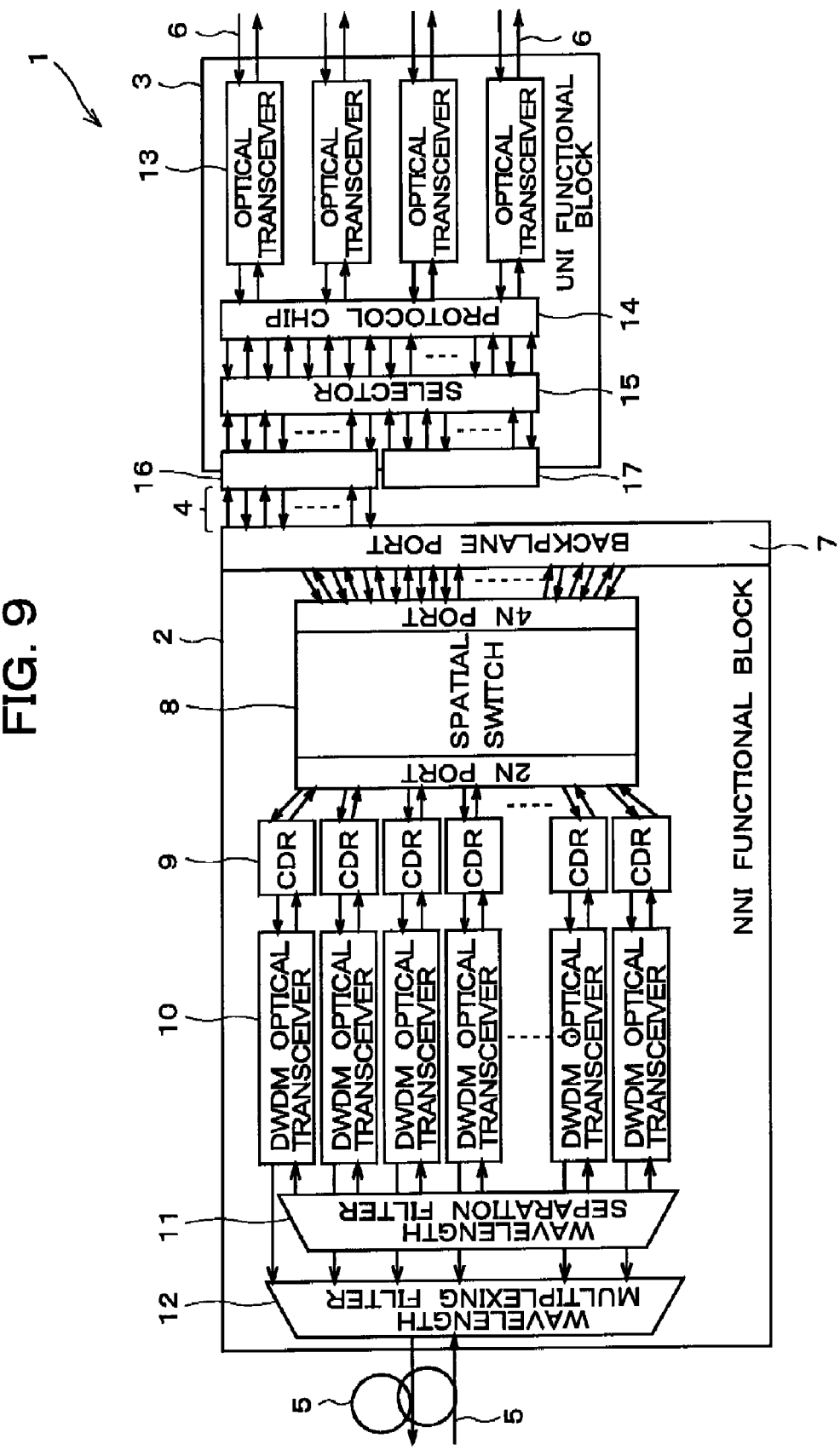
FIG. 9 is a block diagram showing the optical communication device according to Embodiment 2 of the present invention.
Figure 10:
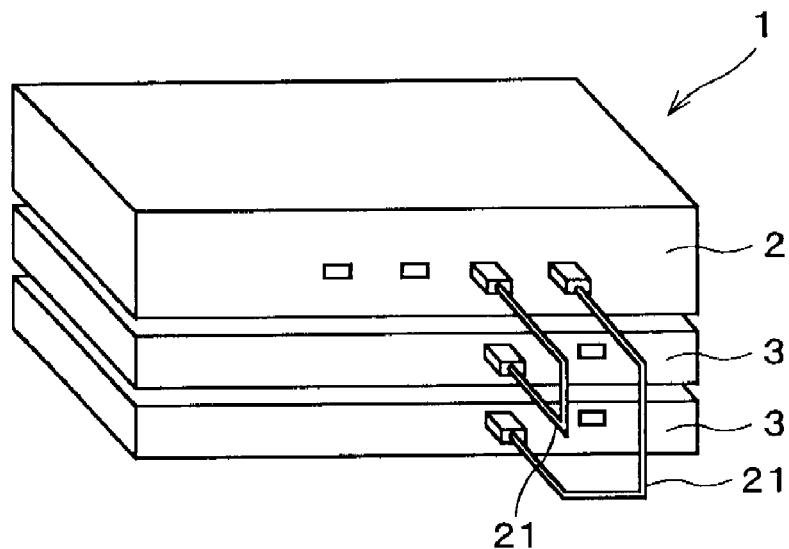
FIG. 10 is a perspective view showing the optical communication device.

An embodiment of the optical communication system of the present invention will next be described. Embodiment 2 of the present invention will first be described. FIG. 9 is a block diagram showing the optical communication device according to the present embodiment, and FIG. 10 is a perspective view showing the optical communication device. As shown in FIG. 9, the optical communication device 1 of the present embodiment is provided with an NNI functional block 2 for securing the switching function and the transmission of a line-side high-speed line, and a UNI functional block 3 for accommodating various lines on the client side. A single NNI functional block 2 and one or more UNI functional blocks 3 are provided to one optical communication device 1. The NNI functional block 2 and the UNI functional block 3 are connected to each other by a connection part 4. High-speed lines 5 that constitute a transmission channel are connected to the NNI functional block 2, and low-speed connections 6 that constitute client connections are connected to the UNI functional block 3. The high-speed lines 5 and the low-speed connections 6 are formed using optical fiber.

In the NNI functional block 2, a backplane port 7 for connecting with the UNI functional block 3 is provided, and a spatial switch 8 that is connected on one side to the backplane port 7 is provided. The spatial switch 8 is an electrical cross-point switch that operates at a multi rate of 5 Gb/s or less, and is capable of operating asynchronously and without protocol dependence. The backplane port 7 and the spatial switch 8 are connected to each other by an electric serial line having a speed of 5 Gb/s or less.

A plurality of CDR (Clock Data Recovery) chips 9 is connected in parallel with each other to the other side of the spatial switch 8. The CDR chips 9 perform retiming of electrical signals. DWDM optical transceiver modules 10 are connected to the CDR chips 9. The DWDM optical transceiver modules 10 perform the conversion between electrical signals and optical signals without changing the line speed. Specifically, when an optical signal having a speed of 3 Gb/s, for example, is received, the DWDM optical transceiver modules 10 transparently output a 3 Gb/s electrical signal. The DWDM optical transceiver modules 10 are DWDM-adapted optical transceiver modules that have multi rate capability of 5 Gb/s or less. The terminals on the electrical signal side of the DWDM optical transceiver modules 10 are connected to the CDR chips 9.

Furthermore, a wavelength separation filter 11 for performing wavelength separation of the optical signal inputted from the high-speed lines 5 and inputting to the DWDM optical transceiver modules 10, and a wavelength multiplexing filter 12 for performing wavelength multiplexing of the optical signal outputted from the DWDM optical transceiver modules 10 and outputting to the high-speed lines 5 are provided between the high-speed lines 5 and the terminals on the optical signal side of the DWDM optical transceiver modules 10.

In the NNI functional block 2, when the number of DWDM optical transceiver modules 10 is N (wherein N is a positive integer), the number of CDR chips 9 is also N, and the switching capability of the spatial switch 8 is (3N×3N) or greater. Specifically, there are 3N or more reception ports and 3N or more transmission ports. Among these, N reception ports and N transmission ports, i.e., a total of 2N ports, are connected to the CDR chips 9. Specifically, one reception port and one transmission port are connected to each CDR chip 9. 2N reception ports and 2N transmission ports, i.e., 4N ports, are connected to the backplane port 7. The spatial switch 8 thus ultimately requires 3N transmission ports and 3N reception ports, and the capability of (3N×3N) therefore enables a complete port-to-port connection as the spatial switch.

The spatial switch 8, the CDR chips 9, and the DWDM optical transceiver modules 10 are packaged on a single card (not shown) and connected by electrical transmission lines. The DWDM optical transceiver modules 10 are also detachable (pluggable) with respect to the card during operation of the optical communication device 1. The wavelength separation filter 11 and the wavelength multiplexing filter 12 may also be packaged on the card. The card is housed in a single chassis (not shown). In an actual device technique, 32 DWDM optical transceiver modules 10, (128×128) spatial switches 8, and four 16-channel wavelength separation/multiplexing filters, for example, are packaged on the same substrate, and this assembly is housed in a small-sized chassis. High transmission capacity and switching functionality can thereby be integrated in a small-sized chassis.

Optical transceivers 13 as components for input and output of signals on the client side are provided in the UNI functional block 3. The optical transceivers 13 perform conversion between electrical signals and optical signals, and the terminals thereof on the optical signal side are connected to the low-speed connections 6. The optical transceivers 13 may output electrical signals at the same speed as the optical signals, or may have an internal signal separation function. A protocol chip 14 connected to the terminals on the electrical signal side of the optical transceivers 13 is provided for performing separation, multiplexing, and framing of electrical signals that are inputted and outputted from the optical transceivers 13. The protocol chip 14 may be composed of a single IC, or a single functional block that is composed of a plurality of ICs.

A selector 15 for switching the signals outputted from the protocol chip 14 to a working backplane port 16 or a reserve backplane port 17 is provided to the UNI functional block 3. The optical transceivers 13, the protocol chip 14, the selector 15, the working backplane port 16, and the reserve backplane port 17 are packaged within a single chassis (not shown).

The structure of the connection part 4 will next be described. Parallel transmission that has a serial signal at a speed of 5 Gb/s or less as the smallest unit is used in the connection between the NNI functional block 2 and the UNI functional block 3. For example, the line capacity of a single NNI functional block 2, i.e., the capacity connected to the high-speed lines 5, is 80 Gb/s, and the backplane capacity, i.e., the capacity connected to the serial connection 4, is 160 Gb/s. At this time, the total number of 2.5 Gb/s serial connections used for transmission and reception is 128 in the 160 Gb/s backplane. Since transmission in a differential signal is commonly used to reduce noise when an electrical signal is transmitted, 256 connections must be made merely in signal cables. Forming connections between devices using electrical cable is therefore considered to be unrealistic in terms of capacity and the number of cables.

Therefore, the transmission of numerous parallel signals is performed using optical signals in the present embodiment. As shown in FIG. 10, one unit of the NNI functional block 2 and two units of the UNI functional block 3, for example, are provided in the optical communication device 1. The NNI functional block 2 is provided with an 80 Gb/s interface (not shown), and the interface is provided with a parallel optical transceiver module for converting the electrical signals that are inputted to and outputted from the backplane port 7 into optical signals. The UNI functional blocks 3 are provided with 40 Gb/s interfaces (not shown), and the interfaces are provided with parallel optical transceiver modules for converting the electrical signals that are inputted to and outputted from the backplane port 16 into optical signals. Furthermore, two fiber-optic cables 21 composed of 32 parallel fibers are provided to the optical communication device.

In this optical communication device, the 80 Gb/s interface provided to the NNI functional block 2, and the 40 Gb/s interface provided to the UNI functional block 3 are connected to each other by a single fiber-optical cable 21. At this time, 16 of the 32 parallel fibers constituting the fiber-optical cable 21 are used for transmission, and the remaining 16 are used for reception. Both blocks can thereby be connected by a single fiber-optic cable even when there is a large amount of communication between the NNI functional block 2 and the UNI functional block 3.

The operation of the optical communication device according to the present embodiment thus configured, i.e., the optical communication method of the present embodiment, will next be described. A case in which a client-side optical signal inputted to the UNI functional block 3 is outputted to the line side from the NNI functional block 2 will first be described. A client-side optical signal is inputted from the low-speed connections 6 on the client side to the optical transceivers 13 of the UNI functional block 3, and is converted to an electrical signal. The electrical signal outputted from the optical transceivers 13 is arranged into an interface format and inputted to the protocol chip 14. Separation and frame conversion of the signal are performed by the protocol chip 14, and the signal is converted to one or a plurality of serial signals at a speed of 5 Gb/s or less that are handled in the UNI functional block. At this time, the appropriate protocol processing is performed to enable restoration to the original signal format when the signal is outputted from the NNI functional block 2, i.e., the signal format when the signal is inputted to the UNI functional block. The serial signal at a speed of 5 Gb/s or less outputted from the protocol chip 14 is outputted from the UNI functional block 3 via the working backplane port 16 directly or after passing through the selector 15. The signal is then inputted to the NNI functional block 2 via the connection part 4.

In the NNI functional block 2, the electrical signal outputted from the UNI functional block 3 is inputted via the backplane port 7 to the spatial switch 8 without modification. The spatial switch 8 is set in advance so that the inputted signal is outputted to the appropriate DWDM channel. The inputted single signal or plurality of signals is switched according to the setting state and outputted to one or a plurality of CDR chips 9. The one or plurality of CDR chips 9 outputs the signals to one or a plurality of DWDM optical transceiver modules 10 after clearing the jitter that accumulates in the signals. The DWDM optical transceiver modules 10 convert the inputted electrical signal to an optical signal and output the optical signal to a wavelength multiplexing filter 12 as an optical signal having a speed of 5 Gb/s or less that corresponds to the DWDM of a prescribed channel. The wavelength multiplexing filter 12 merges the optical signal with an optical signal of another channel and outputs the merged optical signal to the high-speed lines 5.

A case in which a line-side optical signal inputted to the NNI functional block 2 is outputted to the client side from the UNI functional block 3 will next be described. In this case, the signal basically follows the opposite path from the case of transmission from the client side to the line side. Specifically, an optical signal inputted from the high-speed lines 5 on the client side to the NNI functional block 2 is first inputted to the wavelength separation filter 11 and separated into wavelengths to form one or a plurality of serial signals having a speed of 5 Gb/s or less that is inputted to the DWDM optical transceiver modules 10, and the DWDM optical transceiver modules 10 convert the inputted optical signal to an electrical signal and output the electrical signal to the CDR chips 9. The CDR chips 9 perform re-timing of the inputted electrical signal and output the signal to the spatial switch 8. A prescribed switching is performed in advance in the spatial switch 8, and the electrical signal is outputted from the prescribed transmission port of the spatial switch 8 and outputted from the NNI functional block 2 via the backplane port 7.

The electrical signal outputted from the NNI functional block 2 is inputted to the working backplane port 16 of the UNI functional block 3 via the connection part 4, and inputted to the protocol chip 14 directly or via the selector 15. The protocol chip 14 multiplexes the electrical signal and outputs the signal to the optical transceivers 13. The optical transceivers 13 convert the inputted electrical signal to an optical signal and output the optical signal to the low-speed connections 6 on the client side.

When the signals received by the NNI functional block 2 are transmitted to another node without any of the signals being dropped to the UNI functional block 3, the spatial switch 8 is set so that the DWDM optical transceiver modules 10 on the input side are connected to the DWDM optical transceiver modules 10 on the output side. The signals inputted from the high-speed lines 5 on the line side to the NNI functional block 2 are thereby relayed to the other node after the signals are regenerated by the CDR chips 9 without passing through the UNI functional block 3.

The effects of the present embodiment will next be described. A first effect is that it is possible to reduce the size of a optical communication device that is provided with a large amount of transmission capability and switching capability. A first reason for this effect is that the signal handled by the spatial switch 8 and the DWDM optical transceiver modules 10 has a speed of 5 Gb/s or less. Since a spatial switch having a speed of 5 Gb/s or less has minimal power consumption per channel, not only can a large-scale switch be applied, but the structure of the circuitry around the switch can also be simplified. A DWDM optical transceiver module having a speed of 5 Gb/s or less enables fiber-optic transmission over a distance of 100 km or more using a simple scheme for direct modulation of a semiconductor laser, and long-distance DWDM transmission can therefore be performed by a small, inexpensive device.

A second reason is that the protocol chip 14 is provided within the UNI functional block 3, for multiplexing or separating client-side signals of various line speeds into serial signals having a speed of 5 Gb/s or less and performing framing and other protocol processing of transmission signals. The function of the NNI functional block 2 is thereby limited only to spatial switching and transmission of serial signals having a speed of 5 Gb/s or less. The optical communication device as a whole is provided with the optimum functional arrangement by packaging the spatial switch 8 and numerous DWDM optical transceiver modules 10 on a single card and connecting the spatial switch 8 and the DWDM optical transceiver modules 10 to each other using electrical transmission channels. As a result, the transmission capability and the switching capability can be enhanced without increasing the size and cost of the NNI functional block 2.

A third reason is that compensating for the skew in wavelength division lines through wavelength conversion in the NNI functional block 2 makes it possible to reduce the amount of buffer memory used for skew compensation in the UNI functional block 3, and to simplify the compensation circuit.

A second effect of the present embodiment is that a high degree of expandability can be achieved. The reason for this is that since the NNI functional block 2 is provided with the DWDM optical transceiver modules 10 having a speed of 5 Gb/s or less, and the spatial switch 8 for handling serial signals having a speed of 5 Gb/s or less, and the NNI functional block 2 is configured so as to concentrate on processing of high-speed serial signals as described above, the processing load related to protocol processing and other digital functions is light, and thus enables numerous optical transceivers and a large-scale spatial switch to be packaged on the same card.

Specifically, the complex functions of signal frame processing and signal multiplexing and separation, and such high-load functions as monitoring content for each line are not provided in the NNI functional block, and numerous optical transceiver modules and an asynchronous large-capacity switch can be mounted in the NNI functional block. The UNI functional block is optimized for each line type accommodated, and accommodates client-side lines. The accommodated client-side signals are multiplexed or separated, or are outputted without modification as serial signals having a speed of 5 Gb/s or less that are handled by the NNI functional block. Complex functions and high-load functions are thus concentrated towards the UNI functional block.

The use of pluggable DWDM optical transceiver modules 10 that can be attached and detached during device operation makes it possible to package only the minimum number of DWDM optical transceiver modules 10 needed when the device is initially introduced, and to increase the number of DWDM optical transceiver modules 10 as needed after the device is in operation.

Since a large-scale spatial switch is provided that has at least (3N×3N) switching capability for N optical transceivers, expansion ports corresponding to twice or more of the capacity of the NNI functional block can be maintained. In other words, expansion is possible using an external high-capacity switch and a redundant configuration, or expansion to connect with another NNI functional block or another switch is possible in a state in which the UNI functional block is connected so as to use 100% of the capacity of the NNI functional block.

A third effect of the present embodiment is that a highly flexible cross-connect system can be created. A reason for this is that complete port-to-port connectivity is achieved in a configuration in which cross-connect switching is performed using an electrical signal after a wavelength-dependent signal is converted to a wavelength-independent electrical signal. Another reason is that since there is no need to provide frame processing and other protocol-dependent functions in the path of the main signal in the NNI functional block, the signal can be handled with complete transparency.

Various specifications are currently prepared in SONET/SDH (Synchronous Optical NETwork/Synchronous Digital Hierarchy) to allow a variety of protocols to be accommodated, almost all protocols are placed on a SONET/SDH layer, and efficient transmission networks can be constructed. However, a network cannot necessarily be constructed by a simple mechanism, and unforeseen increases in lag can occur in such instances as when numerous protocols are stacked. There is therefore a significant need for the capability of direct accommodation in a protocol-free wavelength channel that is independent of protocol, and for a device that is capable of freely handling wavelength channels. As described above, the present embodiment is capable of accommodation in a SONET/SDH as needed, and of direct accommodation in a wavelength channel. The ability of all the UNI ports to connect to all the NNI wavelength channels enables a flexible configuration that has an extremely high degree of freedom.

Some parts of the following description overlap with the description given above, but below is a summary of the effects obtained when the signals handled in the NNI functional block are limited to 5 Gb/s or less.

1. Pluggable optical transceiver modules can be employed that have high transmission capability and small size, low cost, and low power consumption, and the system can therefore be reduced in size, cost, and power consumption.

2. The pluggable optical transceiver modules have the ability to convert between optical signals and electrical signals transparently without performing parallelization processing, and are protocol-independent modules that operate at a wide range of bit rates. A simple device architecture can therefore be obtained that handles electrical transmission and optical transmission in unified fashion.

3. Electrical transmission can easily be performed on a common substrate without parallelization of signals, and simplification of the device enables higher-density packaging.

4. Since a high-capacity spatial switch can be employed, expandability can be increased.

5. Since high-capacity parallel optical transceivers can be employed, a more flexible device can be created.

In the present embodiment, the CDR chips 9 are not necessarily needed when optical transceiver modules provided with re-timing functionality are used as the DWDM optical transceiver modules 10.

Figure 11:
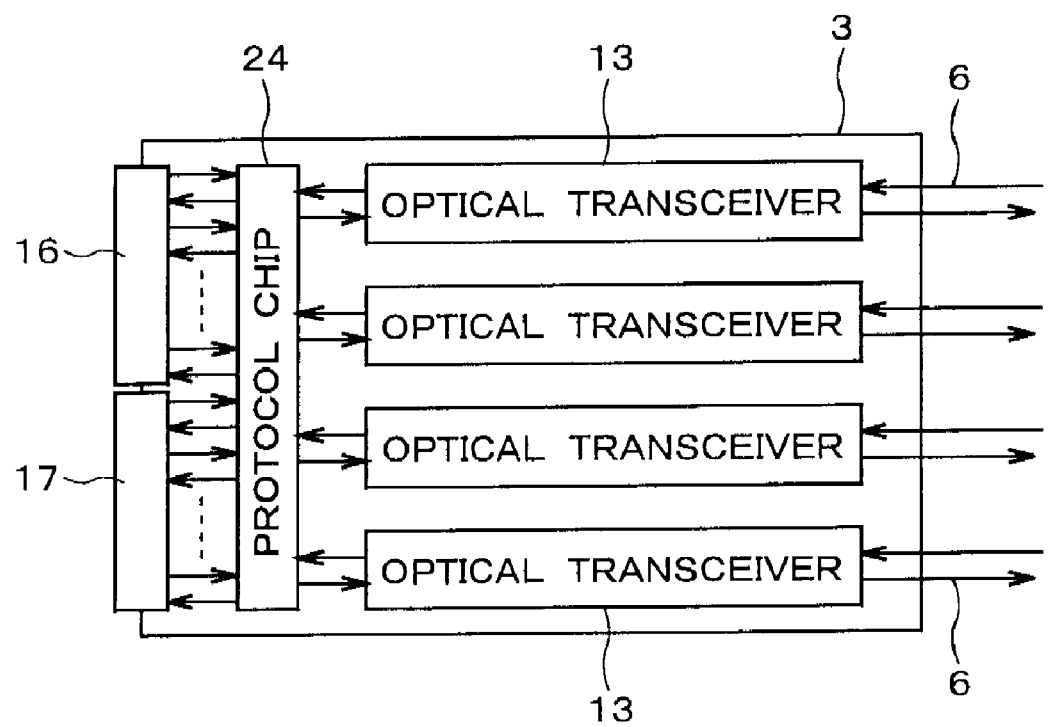
FIG. 11 is a block diagram showing the optical communication device according to a first modified example of Embodiment 2.

A first modified example of Embodiment 2 will next be described. FIG. 11 is a block diagram showing the optical communication device according to the present modified example. As shown in FIG. 11, the protocol chip 24 of the UNI functional block 3 has a selector function, and the selector is omitted in the present modified example. Therefore, the protocol chip 24 is directly connected to the working backplane port 16 and the reserve backplane port 17. Aspects of the present modified example other than those described above are the same as in Embodiment 1.

A second modified example of Embodiment 2 will next be described. The optimum configuration of the UNI functional block 3 varies according to the capacity and type of the accommodated lines, and particularly the type and quantity of the optical transceivers 13, and the function of the protocol chip 14 must be adjusted. A certain degree of adaptability can be provided in advance as a function of the protocol chip 14, but a chip that accommodates all services is technically difficult to develop, and is impractical due to increased cost.

Therefore, in the present modified example, several UNI functional blocks having different configurations are developed, and enhanced adaptability relating to client-side line accommodation is achieved by placing the UNI functional blocks in a lineup. Since the UNI functional blocks are housed in independent chassis units, there is a high degree of freedom in setting the chassis size and the capacity and other characteristics of the accommodated lines.

In the UNI functional block 3, even when an attempt is made to increase the multi rate accommodation capability of the optical transceiver modules and the protocol chip, since the number of lines that can be accommodated by a single optical transceiver is one, the accommodating efficiency of the device as a whole decreases when numerous low-speed lines are connected to a group of ports that are capable of accommodating high-speed lines. Therefore, the adaptability of the optical communication device can be enhanced without reducing the accommodating efficiency of the UNI functional blocks by forming a lineup in which the configurations of the UNI functional blocks are adjusted for each line speed level that includes line speeds of (1) 1 Gb/s or less, (2) from 1 Gb/s to about 3 Gb/s, (3) about 10 Gb/s, and (4) about 40 Gb/s.

Figure 12A:
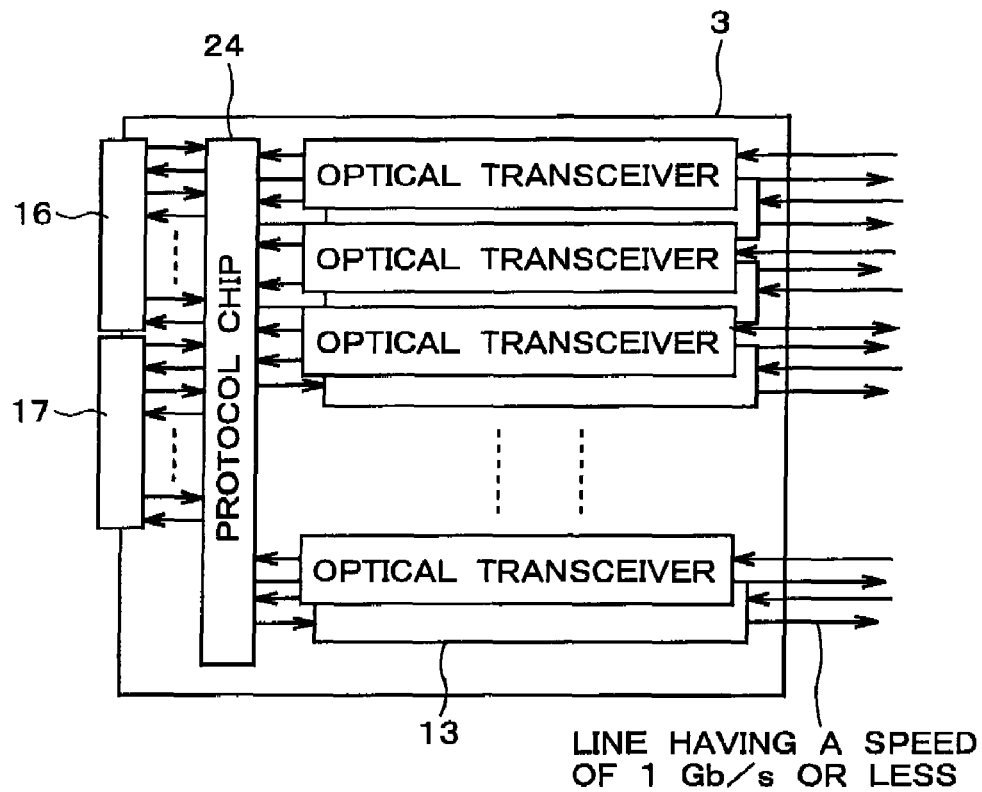
FIG. 12A is a block diagram showing a case in which a low-speed line having a speed of 1 Gb/s or less is accommodated in a UNI functional block in the second modified example of Embodiment 2.
Figure 12B:
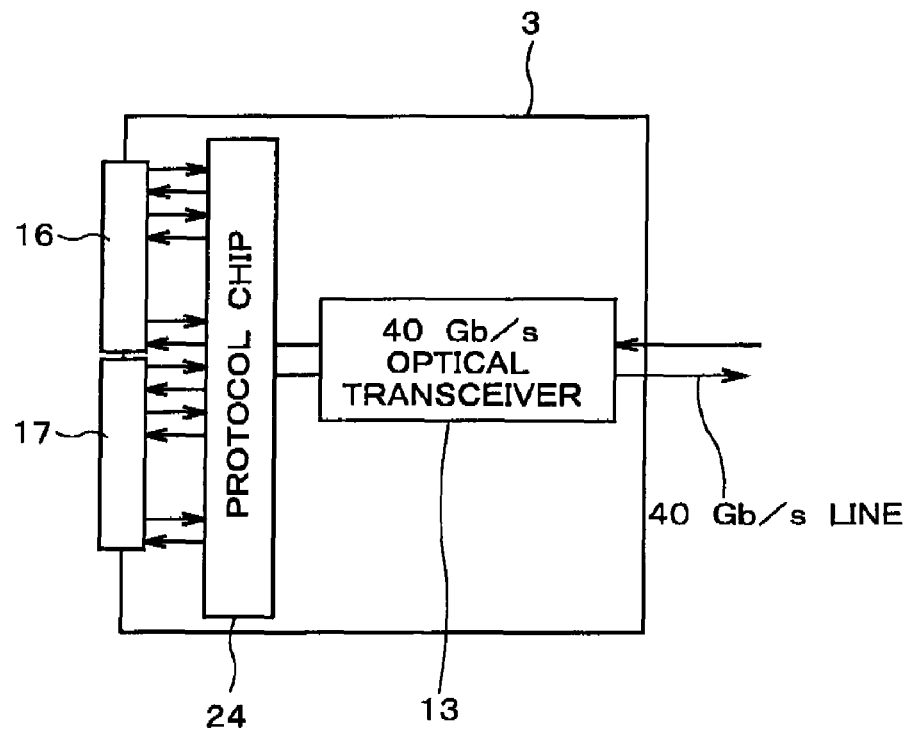
FIG. 12B is a block diagram showing a case in which a 40 Gb/s high-capacity line is accommodated.

FIG. 12A is a block diagram showing a case in which low-speed lines having a speed of 1 Gb/s or less are accommodated in the UNI functional block, and FIG. 12B is a block diagram showing a case in which a 40 Gb/s high-capacity line is accommodated. When low-speed lines having a speed of 1 Gb/s or less are accommodated in the UNI functional block as shown in FIG. 12A, the protocol chip 24 has a function for multiplexing the client-side lines. When a 40 Gb/s high-capacity line is accommodated in the UNI functional block as shown in FIG. 12B, the protocol chip 24 has a function for separating the client-side lines. The UNI functional block may accommodate a 10 Gb/s line and separate the line into signals having a speed of 5 Gb/s for output to the NNI functional block, or may accommodate a line having a speed of 5 Gb/s or less and transparently output this line to the NNI functional block without modification.

As described above, the required protocol chips also begin to vary with each line speed level, but the basic role and function thereof are the same. Protocol processing, signal multiplexing/separation, frame processing, and transceiver functioning for serial signals having a speed of 5 Gb/s or less are mounted in the NNI functional block regardless of the type of client lines accommodated. The NNI functional block side can thereby be processed using a simple large-scale switch, and high-capacity characteristics and small size can both be obtained. The functional load on the UNI functional block side increases, but high-capacity integration in an independent chassis makes it possible to anticipate a greater reduction in size and a greater increase in performance overall compared to forming a card for each small set of lines. In the conventional technique, a framer and other high-load circuits were needed in the NNI functional block as well, but since high-load circuits are concentrated in the UNI functional block in the present modified example, there are almost no redundant components in the whole optical communication device, and the size of a high-capacity device can be reduced at low cost.

Figure 13:
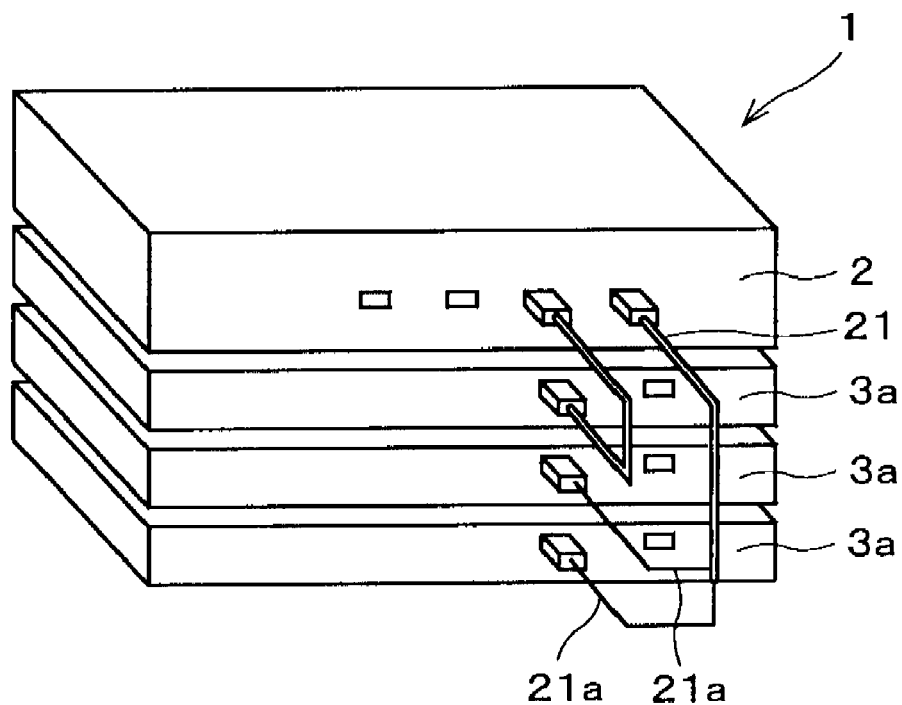
FIG. 13 is a perspective view showing the optical communication device according to a third modified example of Embodiment 2.

A third modified example of Embodiment 2 will next be described. FIG. 13 is a perspective view showing the optical communication device according to the present modified example. As shown in FIG. 13, the present modified example differs from Embodiment 1 in that two units of 20 Gb/s UNI functional blocks 3a are provided instead of the single 40 Gb/s UNI functional block 3. The UNI functional blocks 3 and the NNI functional block 2 are connected to each other by a fiber-optical cable 21 composed of 32 parallel fibers that is branched into two branched cables 21a of 16 fibers each.

Figure 14:
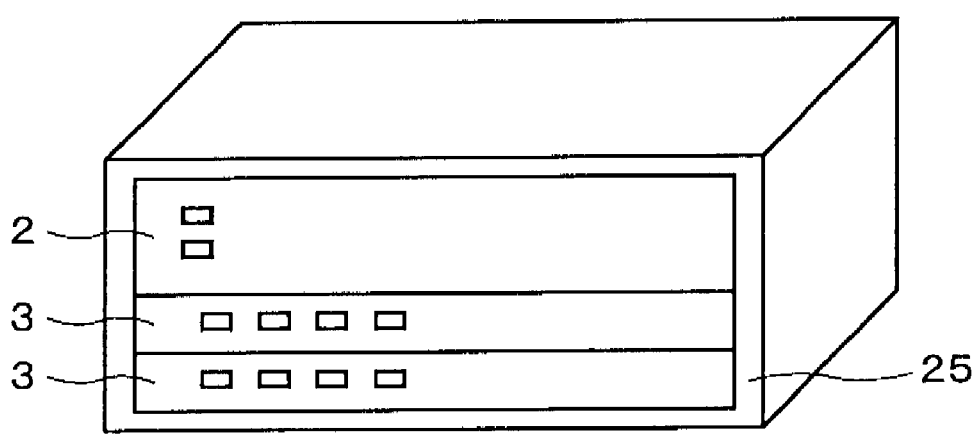
FIG. 14 is a perspective view showing the optical communication device according to a fourth modified example of Embodiment 2.
Figure 15:
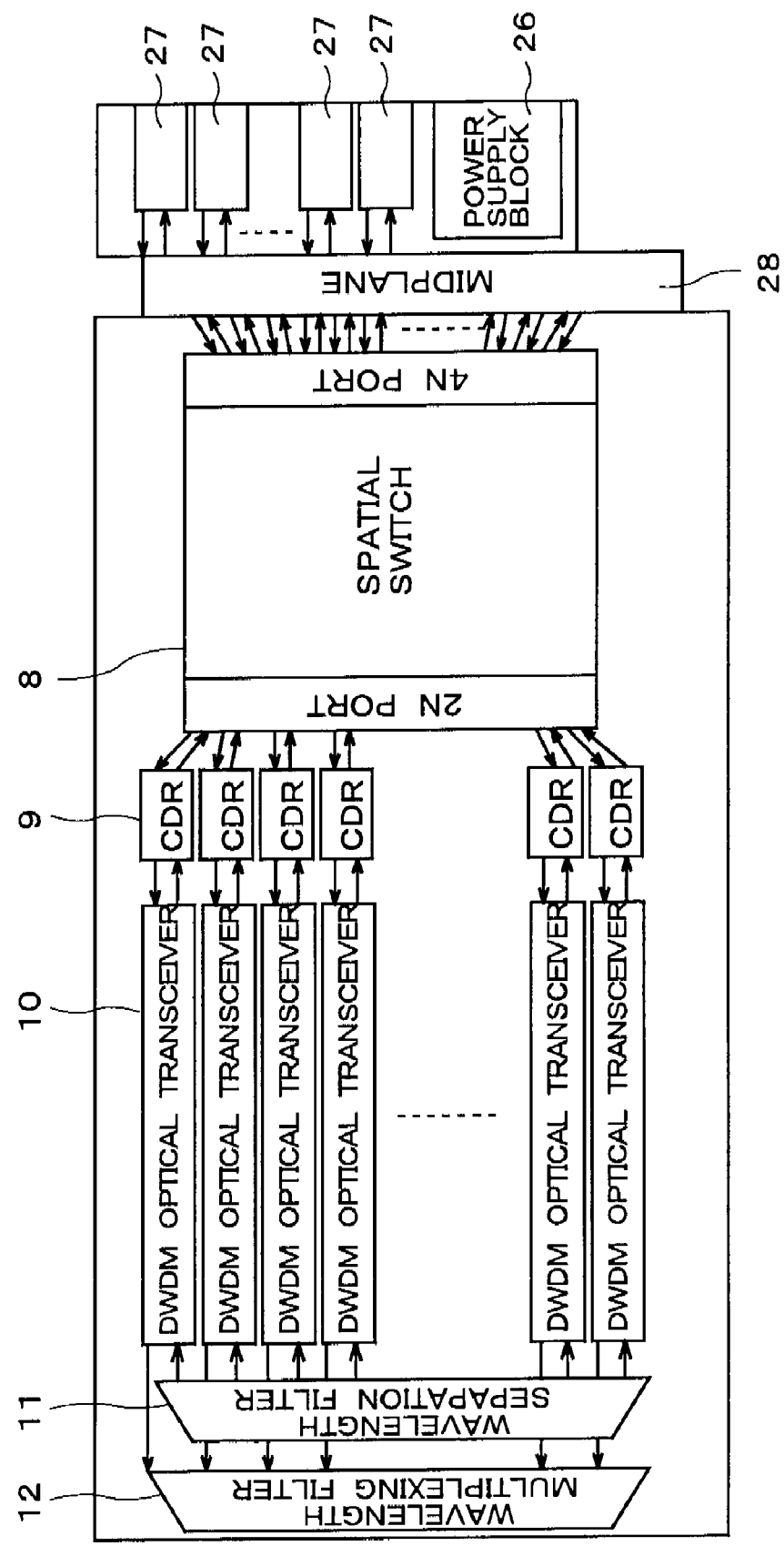
FIG. 15 is a block diagram showing the optical communication device.

A fourth modified example of Embodiment 2 will next be described. In the present modified example, when the application of the optical communication device is fixed to a certain degree, a chassis provided with a high-capacity electrical backplane is prepared, and the NNI functional block and the UNI functional blocks are installed in the chassis. FIG. 14 is a perspective view showing the optical communication device according to the present modified example, and FIG. 15 is a block diagram showing the optical communication device. As shown in FIG. 14, a box-shaped chassis 25 is provided in the optical communication device of the present embodiment, a NNI functional block 2 as single unit is housed in the top level of the chassis 25, and two units of UNI functional blocks 3 are housed in the middle and bottom levels. As shown in FIG. 15, a power supply block 26 and optical parallel transceivers 27 are provided, and the power supply block 26 and the optical parallel transceivers 27 are connected to the NNI functional block 2 via a midplane 28. The chassis-mounted units can thereby be accommodated merely by separating the portion below the midplane 28.

When the configuration of the optical communication device is more limited, the NNI functional block and the UNI functional blocks may be housed in the same chassis. The degree of freedom of the system configuration is thereby reduced, but it is possible to further reduce the size and cost by optimizing the device as a whole.

Figure 16:
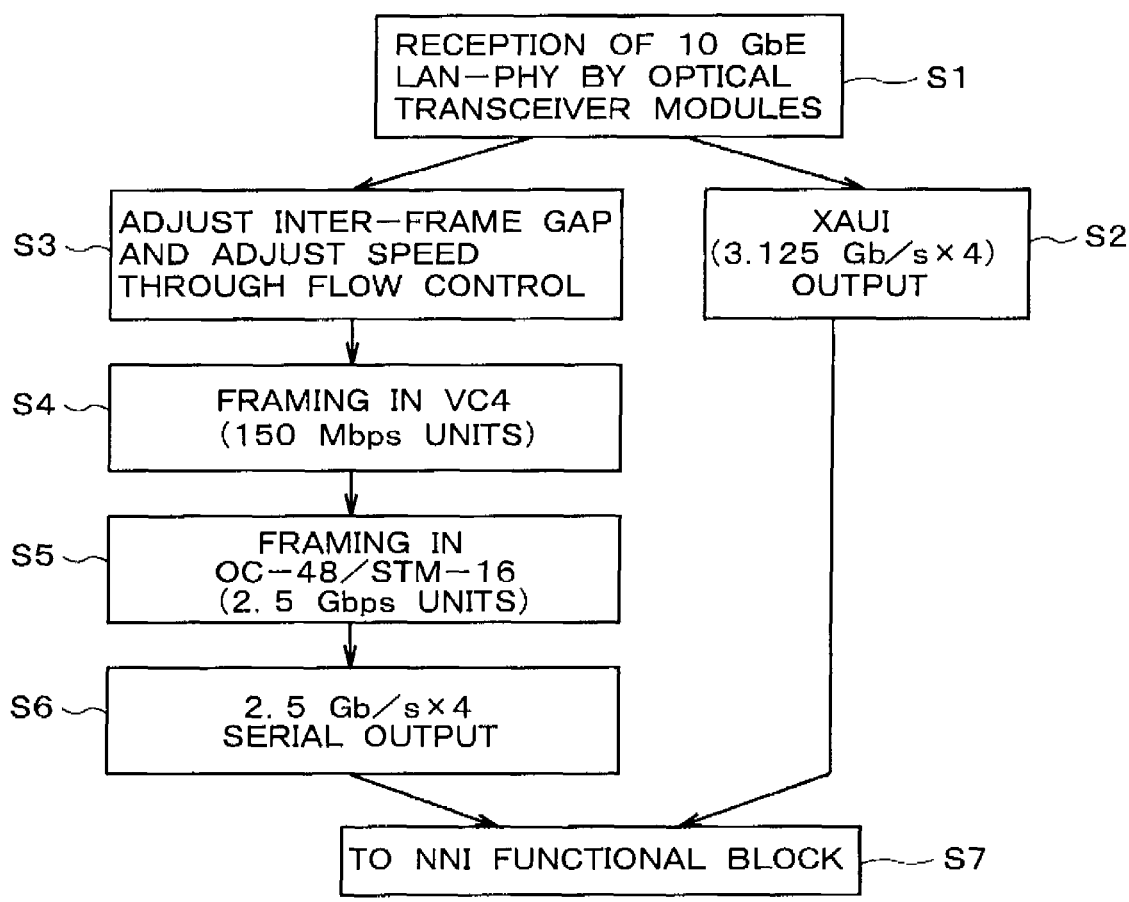
FIG. 16 is a flowchart showing the operation of the optical communication device according to Embodiment 3 of the present invention.

Embodiment 3 of the present invention will next be described. FIG. 16 is a flowchart showing the operation of the optical communication device according to the present embodiment. The present embodiment differs from Embodiment 1 in that the UNI functional block accommodates a 10 gigabit Ethernet (registered trademark) (10 GbE) line. The protocol chip of the UNI functional block in the present embodiment therefore differs from that of Embodiment 1.

The operation of the present embodiment will be described hereinafter. As shown in step S1 in FIG. 16, the 10 Gb/s optical transceiver modules of the UNI functional block first receive a 10.3 Gb/s optical signal that is in the 10 GbE LAN-PHY specification. The optical signal is converted to an electrical signal and inputted to the protocol chip. The protocol chip converts the inputted signal according to the scheme shown in step S2, or the scheme shown in steps S3 through S6 in FIG. 16.

Specifically, as shown in step S2, the protocol chip converts the inputted electrical signal to a XAUI (10 Gigabit Attachment Unit Interface) having a speed of 3.125 Gb/s per lane, which is the 10 GbE 4-lane serial specification. The converted signal is outputted without modification.

Alternatively, the protocol chip adjusts the inter-frame gap and performs flow control, and reduces the 10 GbE effective line speed, as shown in step S3. The signal is then framed and divided into frames in approximately 150 Mb/s units referred to as VC-4, as shown in step S4. Framing into four OC-48/STM-16 is then performed, as shown in step S5. A 2.5 Gb/s serial signal is then outputted from the protocol chip, as shown in step S6.

After the process shown in step S2, or the processes shown in steps S3 through S6, the process proceeds to step S7, and the signal outputted from the protocol chip is outputted to the NNI functional block. Regardless of the scheme used to convert the signal, since the specifications of the protocol chip are adapted to the NNI functional block, the signal outputted from the protocol chip can be transmitted without modification in an optical fiber through the NNI functional block. In the NNI block, 2.5 Gb/s signals and 3.125 Gb/s signals sometimes mix together, but the signals are switched and transmitted in exactly the same manner.

An example was described in the present embodiment in which the 10 GbE signal was converted to a 2.5 Gb/s OC-48/STM-16×4, or a 3.125 Gb/s×4 XAUI, and transmitted. When a high-speed signal is separated in this manner, and the separated signals are each allocated to a WDM wavelength and transmitted in an optical fiber, skew occurs between wavelength channels due to the effects of wavelength dispersion. Wavelength dispersion is a phenomenon in which the propagation speed varies according to the wavelength. Since large frames in 125 microsecond units can be referenced for OC-48/STM-16, although the scale of the compensation circuit increases, the effects of wavelength dispersion are almost never sufficient to make de-skew impossible. De-skew can also be performed according to standard specifications for a XAUI, but the maximum skew value is 13 nanoseconds, and care must therefore be taken. However, using four wavelengths that are adjacent at an interval of 100 GHz as the wavelengths for allocating the lanes of the XAUI enables problem-free transmission over a distance of approximately 200 km.

Figure 17:
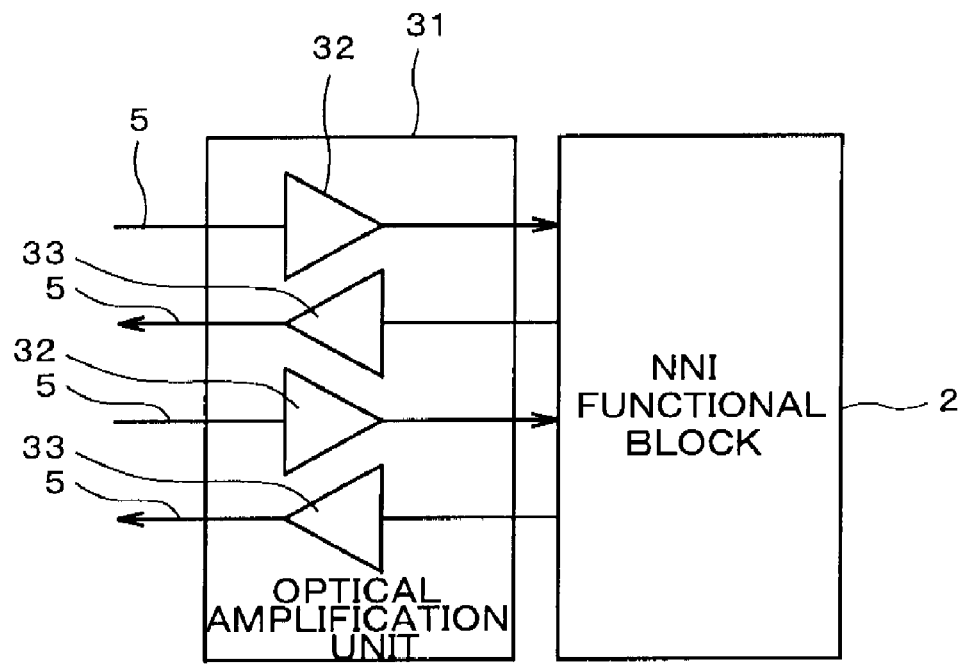
FIG. 17 is a block diagram showing the optical communication device according to Embodiment 4 of the present invention.

Embodiment 4 of the present invention will next be described. FIG. 17 is a block diagram showing the optical communication device according to the present embodiment. As shown in FIG. 17, the optical communication device of the present embodiment differs from that of Embodiment 1 in that an optical amplification unit 31 is provided. Two preamplifiers 32 and two booster amplifiers 33 are provided in the optical amplification unit 31. The preamplifiers 32 are interposed in the high-speed lines 5 that are the input lines of the NNI functional block 2, and the preamplifiers 32 amplify the optical signals that are inputted to the NNI functional block 2. The booster amplifiers 33 are interposed in the high-speed lines 5 that are the output lines of the NNI functional block 2, and the booster amplifiers 33 amplify the optical signals that are outputted from the NNI functional block 2. According to the present embodiment, the transmission distance can be increased by provide the optical amplification unit 31 to amplify optical signals. Structural aspects, operations, and effects of the present embodiment other than those described above are the same as in Embodiment 1. The optical amplification unit 31 may be freely configured according to the necessary transmission distance and loss budget. For example, a preamplifier only may be packaged, or a combination of a booster amplifier and a preamplifier may be packaged, as in the present embodiment.

Figure 18:
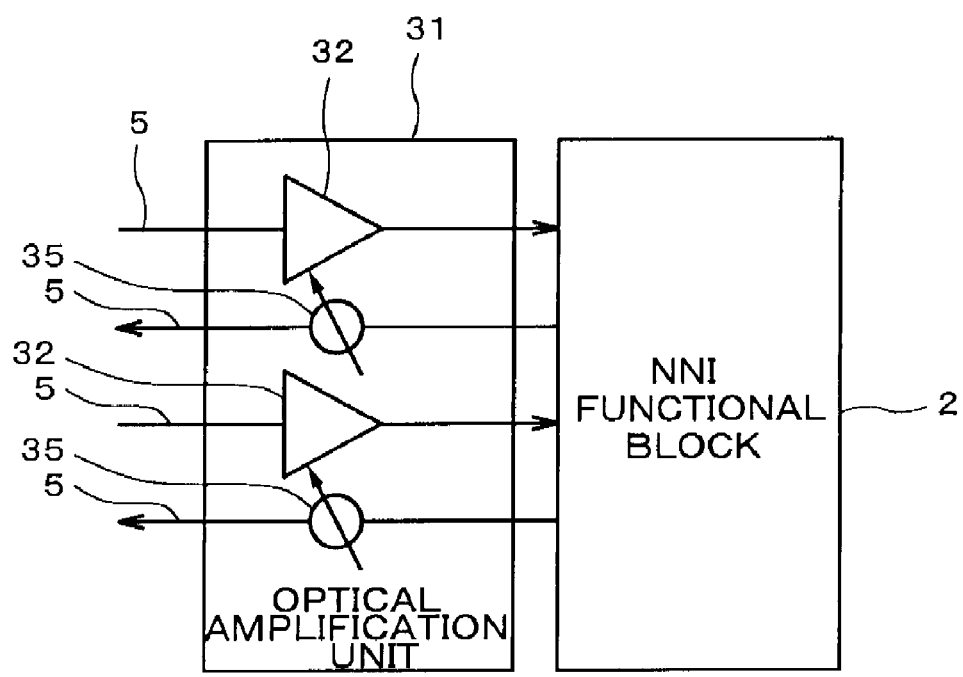
FIG. 18 is a block diagram showing the optical communication device according to a first modified example of Embodiment 4.

A first modified example of Embodiment 4 will next be described. FIG. 18 is a block diagram showing the optical communication device according to the present modified example. The optical communication device of the present modified example differs from the optical communication device of Embodiment 3 shown in FIG. 17 in that a variable attenuator 35 is provided instead of the booster amplifier in the optical amplification unit 34. The variable attenuator 35 reduces the power of the optical signal that is outputted from the NNI functional block 2. According to the present modified example, the output power of the transmitted light is easily reduced to the optimum output power when there are significant wavelength-degrading effects due to nonlinear effects. Wavelength degradation of the optical signal can thereby be suppressed. A fixed attenuator may also be provided instead of the variable attenuator. Structural aspects, operations, and effects of the present modified example other than those described above are the same as in Embodiment 3.

Figure 19:
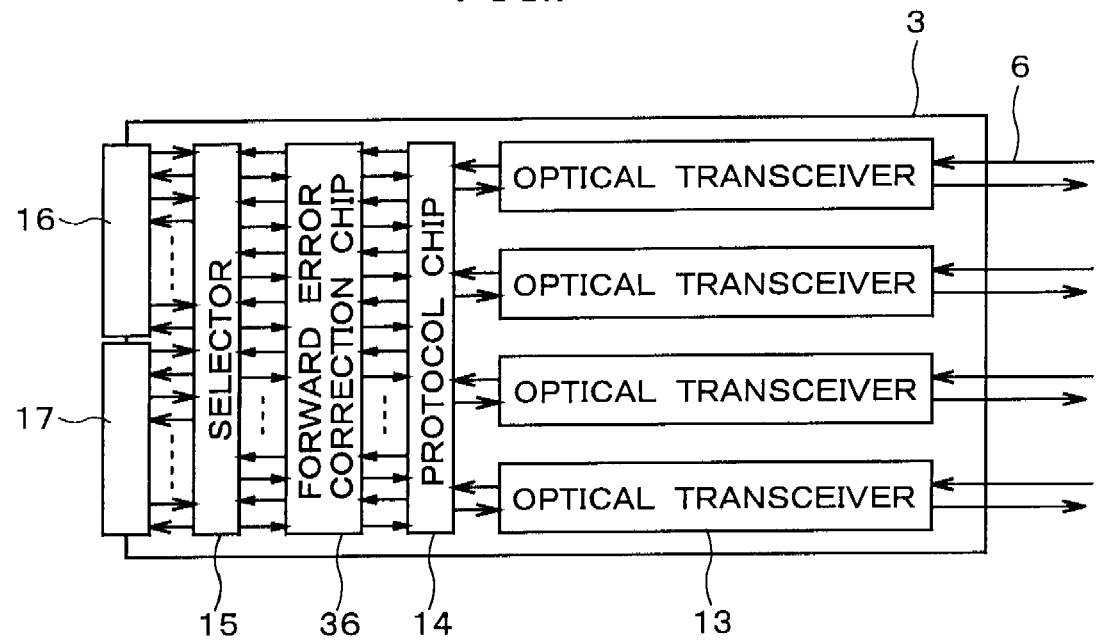
FIG. 19 is a block diagram showing the UNI functional block of the optical communication device according to Embodiment 5 of the present invention.

Embodiment 5 of the present invention will next be described. FIG. 19 is a block diagram showing the UNI functional block of the optical communication device according to the present embodiment. As shown in FIG. 19, the present embodiment differs from Embodiment 2 in that a forward error correction chip 36 is provided between the protocol chip 14 and the selector 15 of the UNI functional block 3. The forward error correction chip 36 performs encoding and error correction of the serial signal having a speed of 5 Gb/s or less that is outputted by the protocol chip 14, and outputs the corrected signal to the selector 15. Structural aspects, operations, and effects of the present embodiment other than those described above are the same as in Embodiment 1. It is also possible to integrate an error correction function into the protocol chip instead of providing the forward error correction chip 36.

Figure 20:
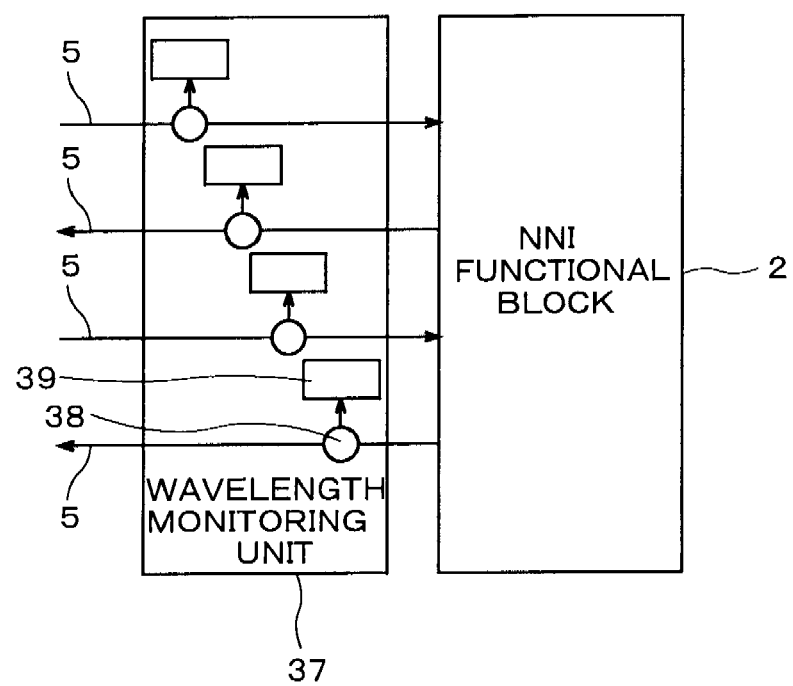
FIG. 20 is a block diagram showing the optical communication device according to Embodiment 6 of the present invention.

Embodiment 6 of the present invention will next be described. FIG. 20 is a block diagram showing the optical communication device according to the present embodiment. As shown in FIG. 20, the optical communication device of the present embodiment differs from that of Embodiment 1 in that a wavelength monitoring unit 37 is provided. In the wavelength monitoring unit 37, tap couplers 38 for branching a signal having a strength of about 10% from the DWDM optical signal transmitted through the high-speed lines 5 are provided within the line-side high-speed lines 5, and spectral monitoring devices 39 are provided into which the optical signals branched by the tap couplers 38 are inputted. The spectral monitoring devices 39 monitor whether the wavelengths of the DWDM signals branched by the tap couplers 38 are within the prescribed wavelength range, and output an alarm signal to the NNI functional block 2 when a wavelength is outside the prescribed range.

In the present embodiment, the DWDM signals transmitted through the high-speed lines 5 are branched by the tap couplers 38, and DWDM signals that are approximately 10% of the signal strength prior to branching are conducted to the spectral monitoring devices 39. The approximately 90%-strength DWDM signals that remain are transmitted through the high-speed lines 5 without modification. The spectral monitoring devices 39 monitor whether the inputted DWDM signals in each wavelength are within the prescribed wavelength range. When a wavelength is outside the prescribed range, an alarm signal is outputted to the NNI functional block 2. This configuration makes it possible to monitor whether the wavelengths of two signals inputted to the NNI functional block 2 and two signals outputted from the NNI functional block 2 are each within the prescribed range.

When the DWDM signals used in the NNI are set to a narrow interval of 50 GHz or 25 GHz, the wavelength monitoring units are preferably used to monitor all wavelengths at once as in the present embodiment, and feedback is preferably applied to the wavelengths of the output signals of the optical transceiver modules. This configuration eliminates the need for expensive optical transceiver modules having high wavelength precision and makes it possible to reduce the cost of the optical communication device. Structural aspects, operations, and effects of the present embodiment other than those described above are the same as in Embodiment 2.

A configuration may also be adopted in which the NNI functional block is expanded so that the DWDM optical transceiver modules can perform wavelength control, and the monitoring results of the wavelength monitoring units are fed back to the DWDM optical transceiver modules. The DWDM optical transceiver modules can thereby control the wavelengths of the optical signals and ensure that the wavelengths are always within the prescribed range on the basis of the monitoring results of the wavelength monitoring units.

Figure 21:
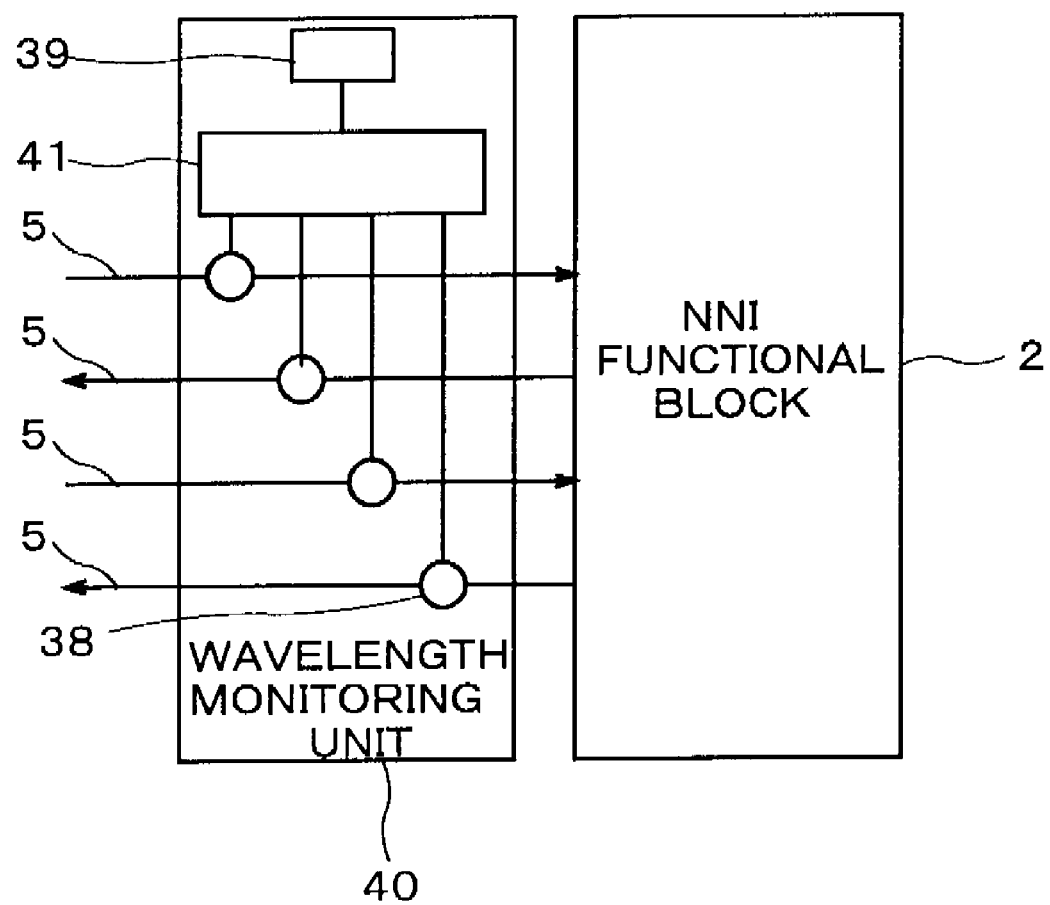
FIG. 21 is a block diagram showing the optical communication device according to a first modified example of Embodiment 6.

A first modified example of Embodiment 6 will next be described. FIG. 21 is a block diagram showing the optical communication device according to the present modified example. As shown in FIG. 21, a wavelength monitoring unit 40 is provided instead of the wavelength monitoring unit 37 (see FIG. 20) provided in Embodiment 5. In the wavelength monitoring unit 40, only one spectral monitoring device 39 is provided, and a (1×4) optical switch 41 is provided for connecting the spectral monitoring device 39 to any of four tap couplers 38.

In the present modified example, the spectral monitoring device 39 monitors the inputted optical signals while the (1×4) optical switch 41 switches the tap couplers 38 that are connected to the spectral monitoring device 39. The spectral monitoring device 39 can thereby monitor the signals flowing through the four high-speed lines 5 one at a time in time-shared fashion. Since the wavelength variation of the optical transceiver modules is not a short-term occurrence, the cost of the wavelength monitoring unit can be minimized by using a single spectral monitoring device 39 to monitor all of the input and output signals in time-shared fashion, as in the present modified example.

Figure 22:
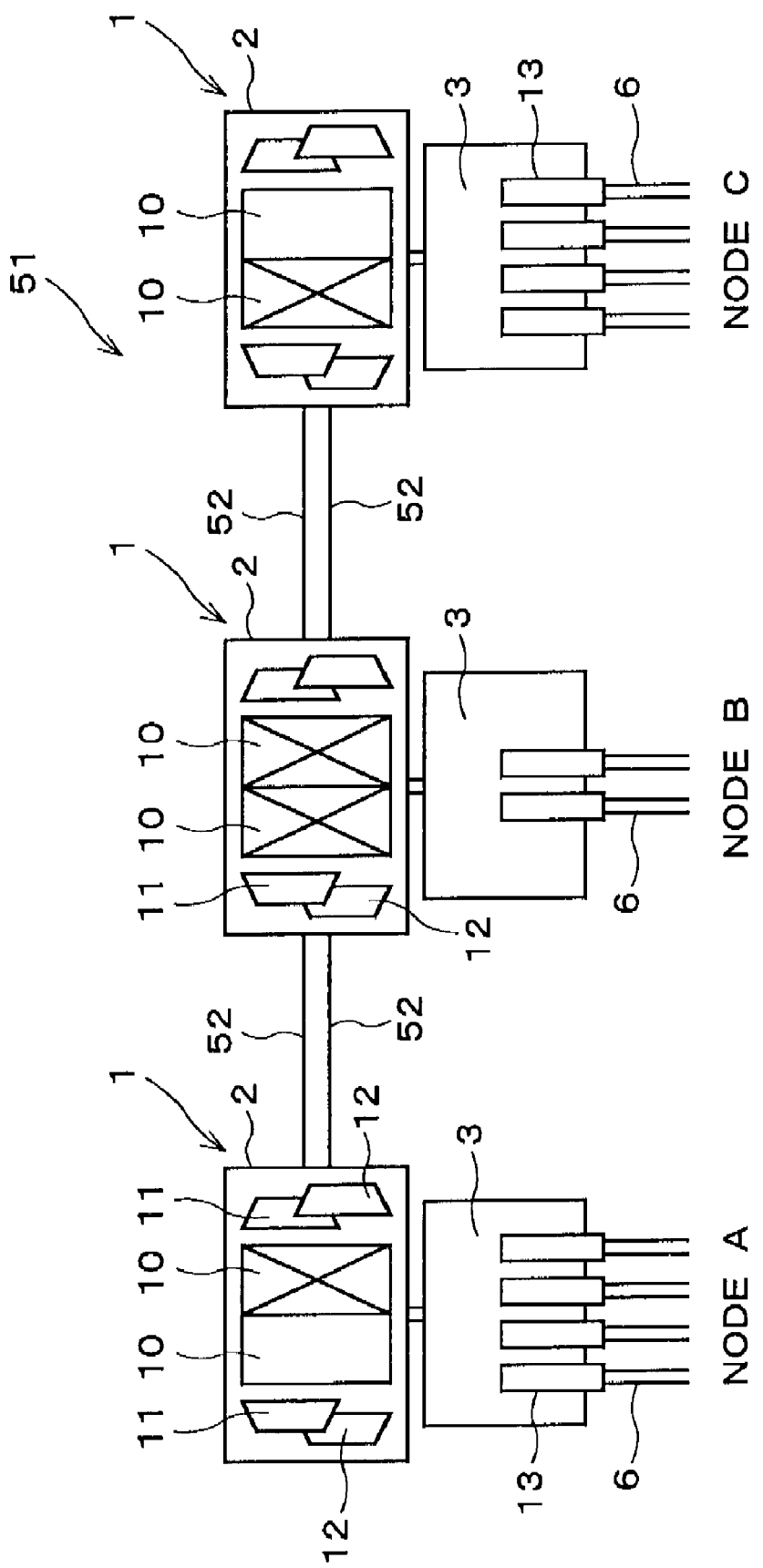
FIG. 22 is a block diagram showing the optical communication system according to Embodiment 7 of the present invention.

Embodiment 7 of the present invention will next be described. The present embodiment is an embodiment of an optical communication system in which the optical communication device of Embodiment 1 is applied in an actual network. FIG. 22 is a block diagram showing the optical communication system according to the present embodiment. As shown in FIG. 22, the optical communication system 51 of the present embodiment is a linear system in which three nodes A, B, and C are connected in series, and each node is composed of the optical communication device 1 according to Embodiment 2. Transmission channels composed of two optical fibers 52 are connected between the nodes. Specifically, both terminals of the communication channels are accommodated by an optical communication device 1.

A maximum of 32 DWDM optical transceiver modules 10 can be mounted in the NNI functional block 2 of each optical communication device 1, and there are sixteen DWDM optical transceiver modules 10 each for east transmission and west transmission. The names "east" and "west" used above are merely for convenience, and do not necessarily correspond to actual directions. For convenience, the right direction in the drawing is referred to as east, and the left direction in the drawing is referred to as west. In FIG. 22, blocks that contain an "x" among the blocks indicating the DWDM optical transceiver modules 10 are blocks in which sixteen DWDM optical transceiver modules 10 are packaged, and blocks that do not contain an "x" are blocks in which DWDM optical transceiver modules 10 are not packaged, and that have sixteen open spaces.

In the NNI functional block of the optical communication device 1 that constitutes node A, although a maximum of 32 optical transceiver modules can be accommodated, only sixteen optical transceiver modules are packaged on the east side (towards node B), and the sixteen spaces on the west side are unpackaged empty spaces. In the optical communication device 1 that constitutes node B, since sixteen optical transceiver modules each are required to connect to node A and node C, 32 optical transceiver modules are packaged. In the optical communication device 1 that constitutes node C, only sixteen optical transceiver modules are packaged on the west side (towards node B), and the sixteen spaces on the east side are unpackaged empty spaces. A single 10 Gb/s line is transmitted between the nodes using four wavelength signals of the optical transceiver modules, and the maximum bi-directional transmission capacity between the nodes is 40 Gb/s. Specifically, four 10 Gb/s lines 53 (see FIG. 23) are formed by two optical fibers 52. The communication speed between the nodes is 5 Gb/s or less.

A sixteen-channel wavelength multiplexing/separation filter for multiplexing and separation on the east side and the west side is provided to each NNI functional block 2. Consequently, a total of four wavelength multiplexing/separation filters are provided to each NNI functional block 2.

Furthermore, the UNI functional blocks 3 are configured so as to able to accommodate four 10 Gb/s lines, four 10 Gb/s optical transceiver modules are mounted in node A and node C, and two 10 Gb/s optical transceiver modules are mounted in node B.

Figure 23:
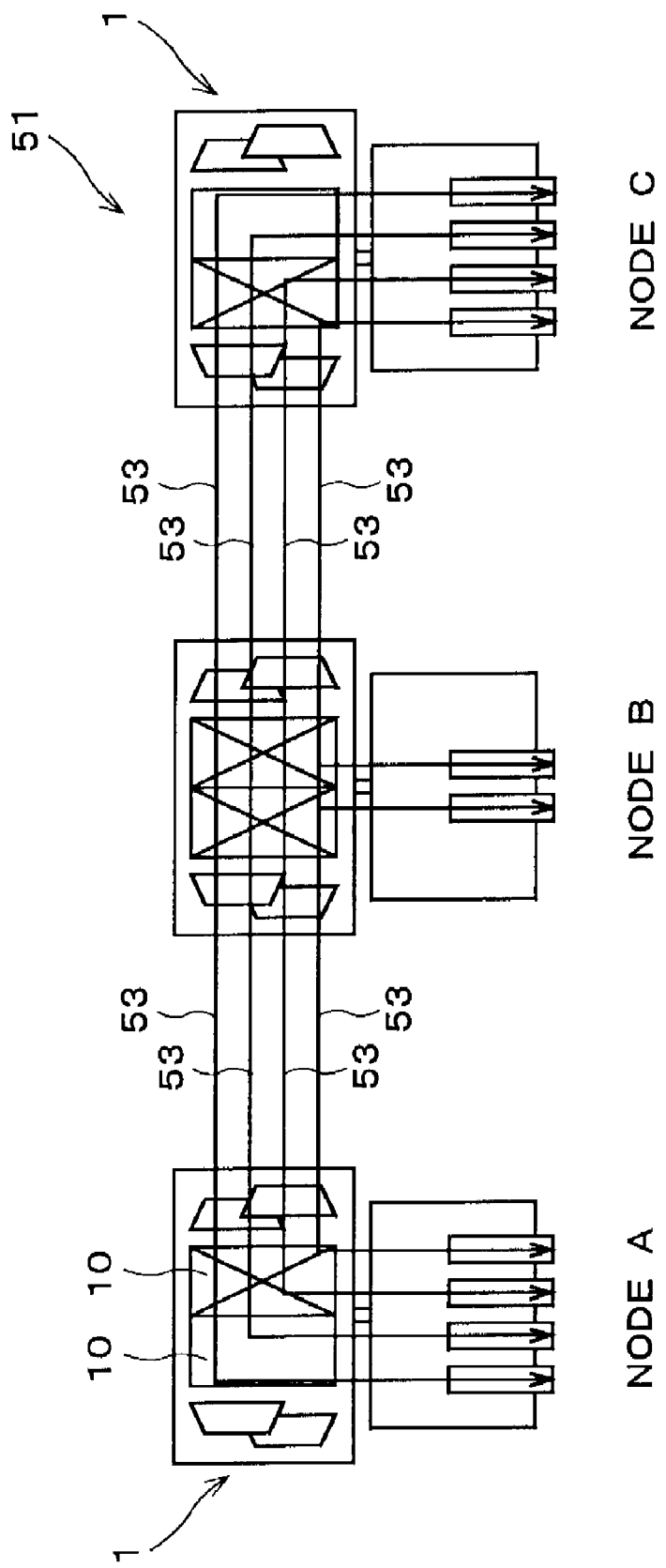
FIG. 23 is a path configuration diagram showing the first path configuration in the present embodiment.
Figure 24:
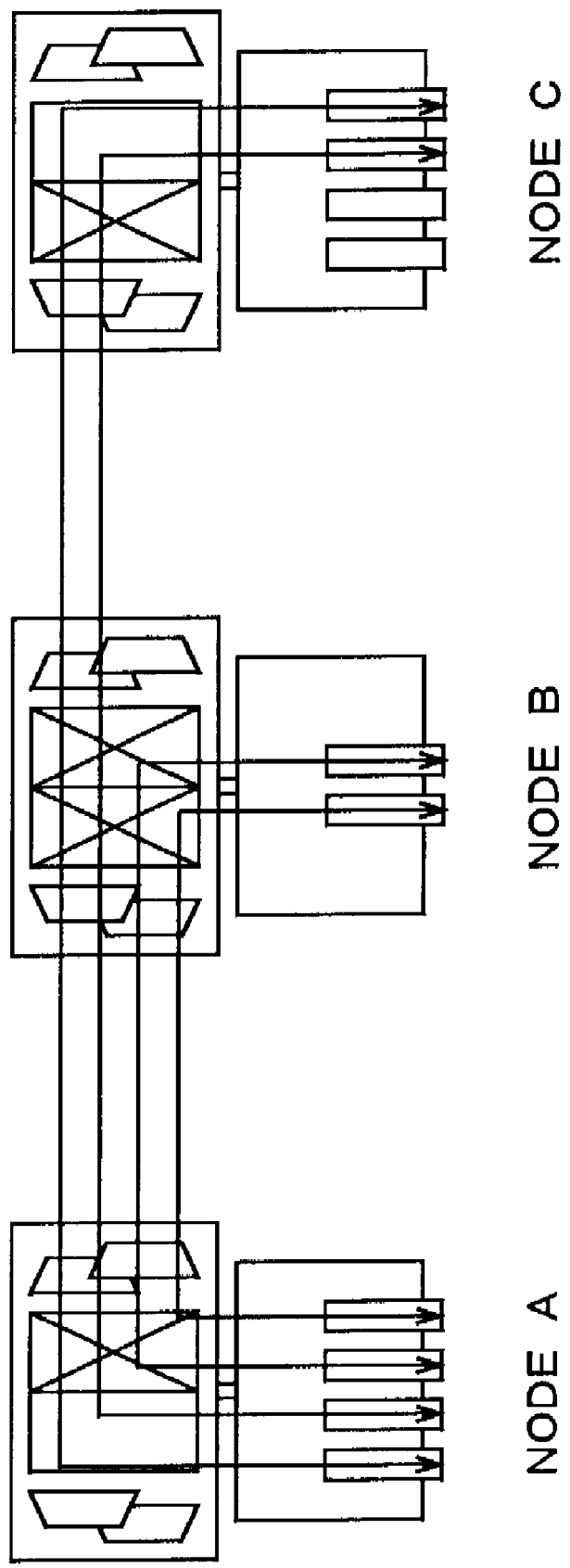
FIG. 24 is a path configuration diagram showing the second path configuration.
Figure 25:
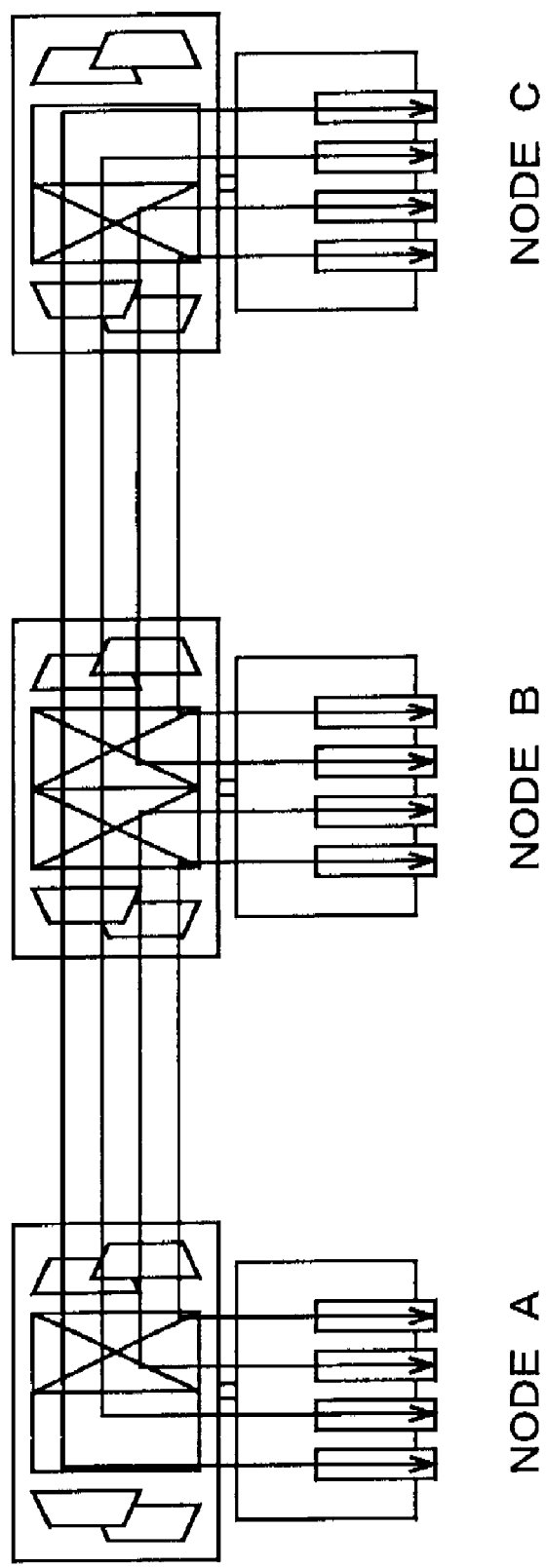
FIG. 25 is a path configuration diagram showing the third path configuration.
Figure 26:
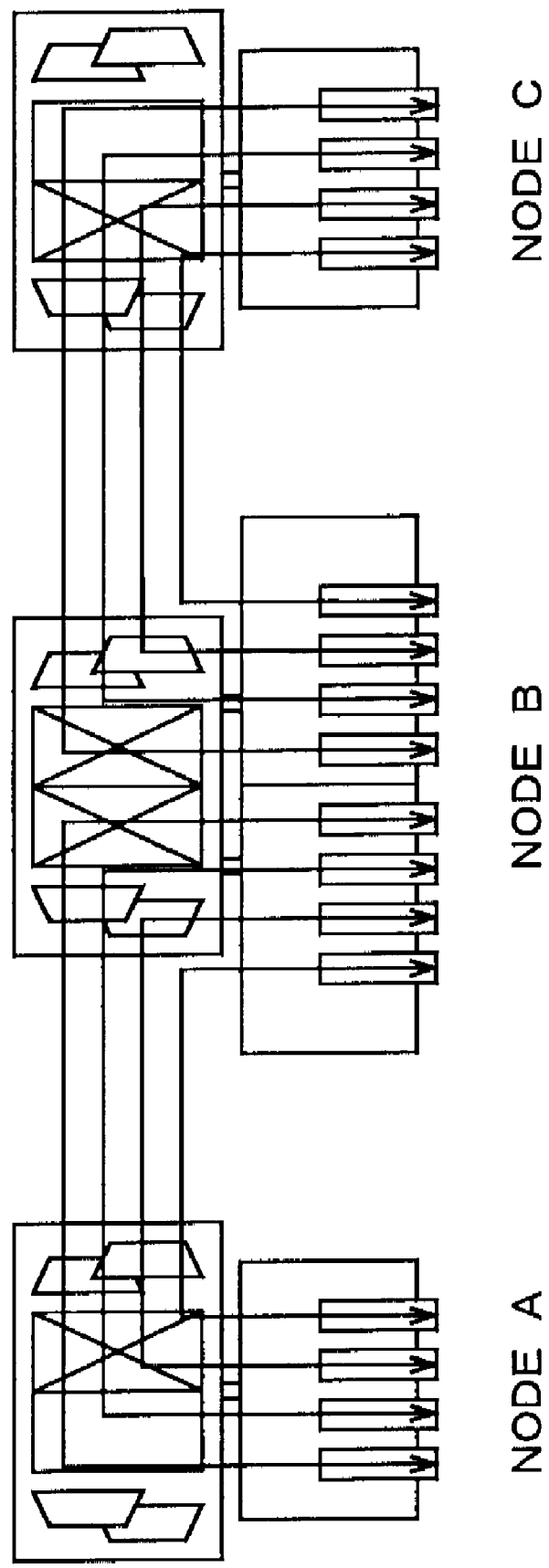
FIG. 26 is a path configuration diagram showing the fourth path configuration.
Figure 27:
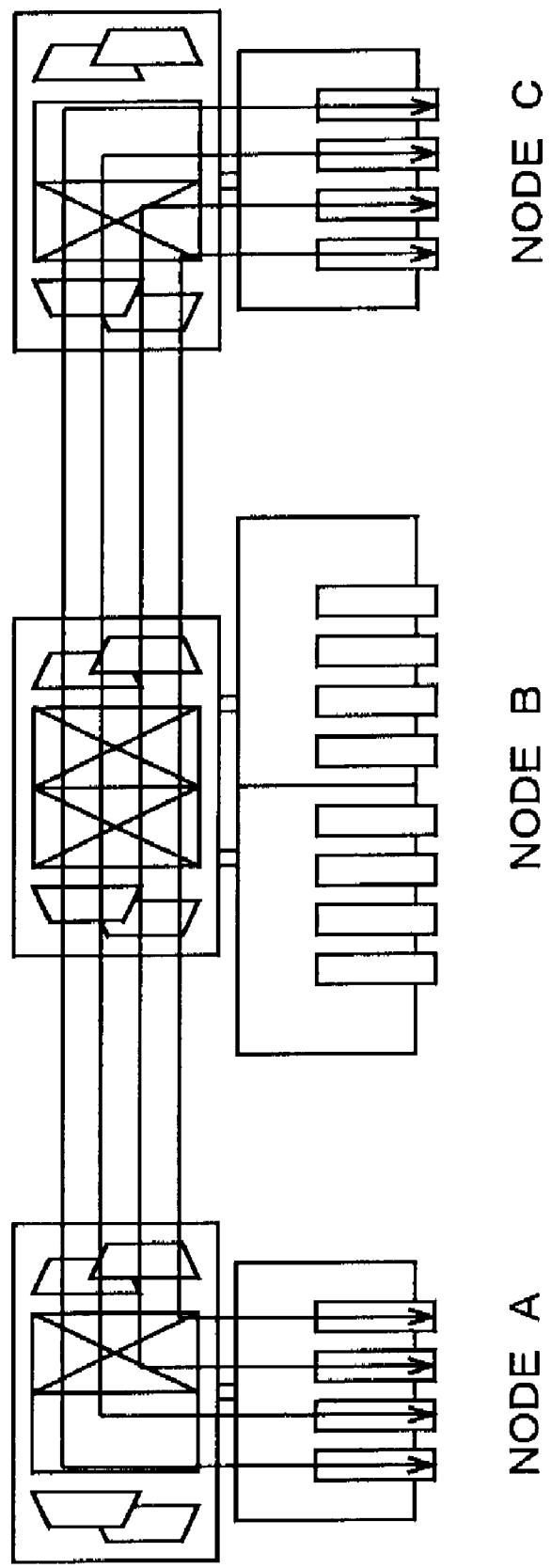
FIG. 27 is a path configuration diagram showing the fifth path configuration.
Figure 28:
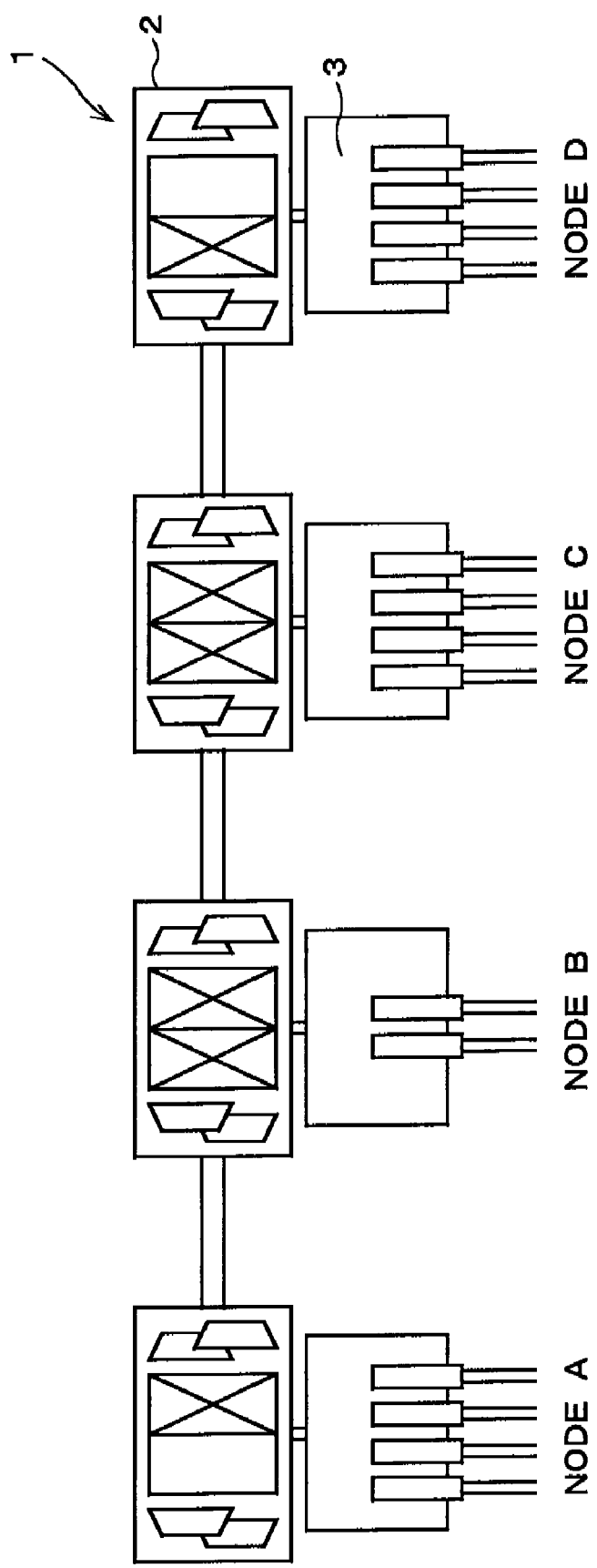
FIG. 28 is a path configuration diagram showing the sixth path configuration.
Figure 29:
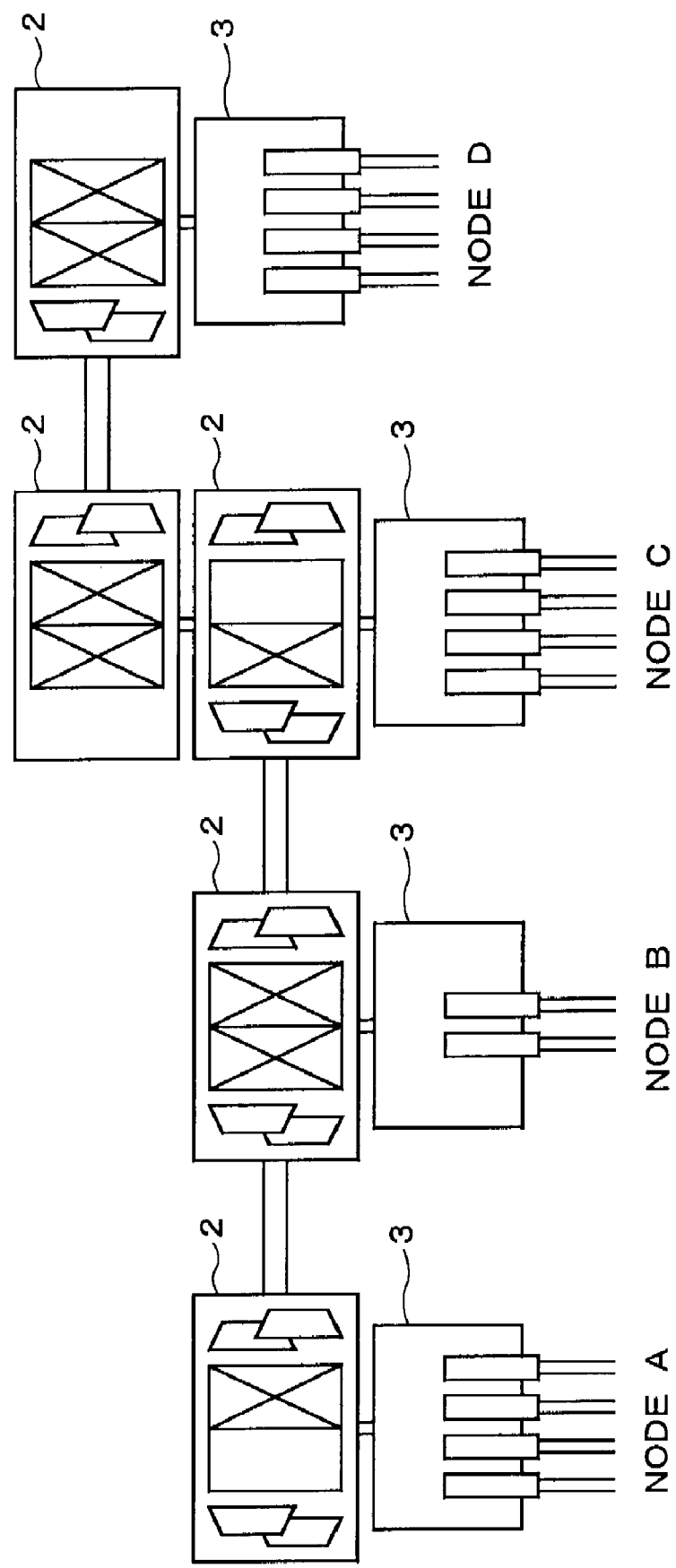
FIG. 29 is a path configuration diagram showing the seventh path configuration.

The operation of the optical communication system of the present embodiment, i.e., the optical communication method of the present embodiment, will next be described. FIG. 23 is a path configuration diagram showing the first path configuration in the present embodiment; FIG. 24 is a path configuration diagram showing the second path configuration; FIG. 25 is a path configuration diagram showing the third path configuration; FIG. 26 is a path configuration diagram showing the fourth path configuration; FIG. 27 is a path configuration diagram showing the fifth path configuration; FIG. 28 is a path configuration diagram showing the sixth path configuration; and FIG. 29 is a path configuration diagram showing the seventh path configuration.

The first path configuration will first be described. As shown in FIG. 23, four 10 Gb/s lines 53 are formed by two optical fibers 52 (see FIG. 22) between each node. Among the four 10 Gb/s lines 53, three of the lines directly connect node A with node B, and the remaining line connects node A with node B, and node B with node C.

In the present embodiment, the topology may be freely varied according to the traffic conditions that are to be accommodated. For example, the second path configuration shown in FIG. 24 may be employed. Specifically, one of the 10 Gb/s lines 53 between node A and node C in the first path configuration shown in FIG. 23 is removed, one of the 10 Gb/s lines 53 between node B and node C is removed, and one more 10 Gb/s line 53 is added between node A and node B. The line capacity between node A and node B can thereby be doubled. All switching between the first path configuration shown in FIG. 23 and the second path configuration shown in FIG. 24 is possible only by remote operation. There is no need for patch cord replacement, DWDM line card substitution, and other operations that require entry.

When there is to be an increase in the number of lines between node A and node B, a switch is made to the third path configuration shown in FIG. 25. Specifically, the number of 10 Gb/s optical transceiver modules in the UNI functional block 3 is increased by two in the optical communication device 1 that constitutes node B. Two more 10 Gb/s lines 53 can thereby be provided between node B and node C.

Furthermore, the fourth path configuration shown in FIG. 26 may be formed, in which another UNI functional block is provided to node B so that the total number of 10 Gb/s optical transceiver modules in node B is eight. In the fourth path configuration, four 10 Gb/s lines 53 are provided between node A and node B, and four 10 Gb/s lines 53 are provided between node B and node C. A 10 Gb/s line 53 that directly connects node A with node C is not provided, and all traffic is passed through the UNI functional block of node B.

In the present embodiment, since a connection can be made between any client ports of any node, any port can be freely and instantly switched towards the west or the east. In the fourth path configuration shown in FIG. 26, in such cases as when a failure occurs in the optical communication device that constitutes the middle node B, a switch can be made to the fifth path configuration shown in FIG. 27, and it is possible to instantly change to a point-to-point system configuration in which node B is bypassed to directly connect node A with node C.

When a new node D is added, and additional lines are to be added from node C as in the sixth path configuration shown in FIG. 28, for example, it is possible to freely add connections to the working node C. For an added capacity of up to 40 Gb/s, sixteen optical transceiver modules may be added to the east side (towards node D) of node C, optical transceivers may be fully populated as in node B, and new lines may be connected to the input/output ports of the wavelength separation/multiplexing filter that had been in a standby state.

When a capacity of 80 Gb/s is to be added between node C and node D, NNI functional blocks 2 that are fully populated with 32 optical transceiver modules are added to both node C and node D, as in the seventh path configuration shown in FIG. 29. In this case, since 80 Gb/s lines are used in the same direction at once, a 32-channel filter instead of a 16-channel filter is used in the wavelength multiplexing/separation filter. The total number of wavelength multiplexing/separation filters, wherein one is used for multiplexing, and one is used for separation. The newly provided NNI functional block and the existing NNI functional block can be connected via a high-capacity backplane, and network lines extending to the west and the east can therefore be directly connected via this node.

Alternatively, when a transmission capacity of 80 Gb/s is required between nodes, 64 types of wavelength signals may be used to perform single-conductor bi-directional transmission in a single optical fiber between NNI functional blocks 2 that face each other over the transmission channels. In this case, each NNI functional block has one 64-channel wavelength multiplexing/separation filter that is used for single-conductor bi-directional transmission. In the same manner, when a transmission capacity of 40 Gb/s is required between nodes, 32 types of wavelength signals may be used to perform single-conductor bi-directional transmission in a single optical fiber between NNI functional blocks 2 that face each other over the transmission channels. Since there are sixteen types of wavelengths used in one NNI functional block, when 32 DWDM optical transceiver modules can be mounted, east and west traffic is transmitted bi-directionally in a single optical fiber, and the node that performs this transmission can be formed by a single NNI functional block. In this case, two 32-channel wavelength multiplexing/separation filters are mounted in one NNI functional block.

As described above, the optical communication system of the present embodiment has excellent expandability. This high expandability can be utilized to easily apply the optical communication system to various topologies such as ring-shaped systems and mesh-shaped systems, for example, as well as the abovementioned configuration.

Although a maximum of 32 optical transceivers can be accommodated, only sixteen are mounted in the optical communication devices 1 that constitute node A and node C. Since the functions of the NNI functional blocks 2 are simplified, the shared cost is kept low, and most of the cost is accounted for by the optical transceiver module components. The advantage of reduced starting cost is gained in the present embodiment, because the optical transceiver modules are endowed with a pluggable module structure to make it possible to package only the necessary minimum number of optical transceiver modules. The shared cost of the switches and the like packaged for the sixteen optical transceiver modules that are not packaged is also naturally kept low, and it is therefore possible to provide a low-cost system that starts with a small-capacity configuration. The cost per wavelength signal of the wavelength multiplexing/separation filter, which is the most expensive component in terms of shared cost, is also small, and ranges from one-fifth to one-tenth the cost of the optical transceiver modules.

For the wavelength multiplexing/separation filter, since the modules are divided for every sixteen channels, there is not necessarily a need to mount four wavelength multiplexing/separation filters for node A and node C, and only two may be mounted from the initial stage insofar as there is no possibility of subsequent expansion.

Figure 30:
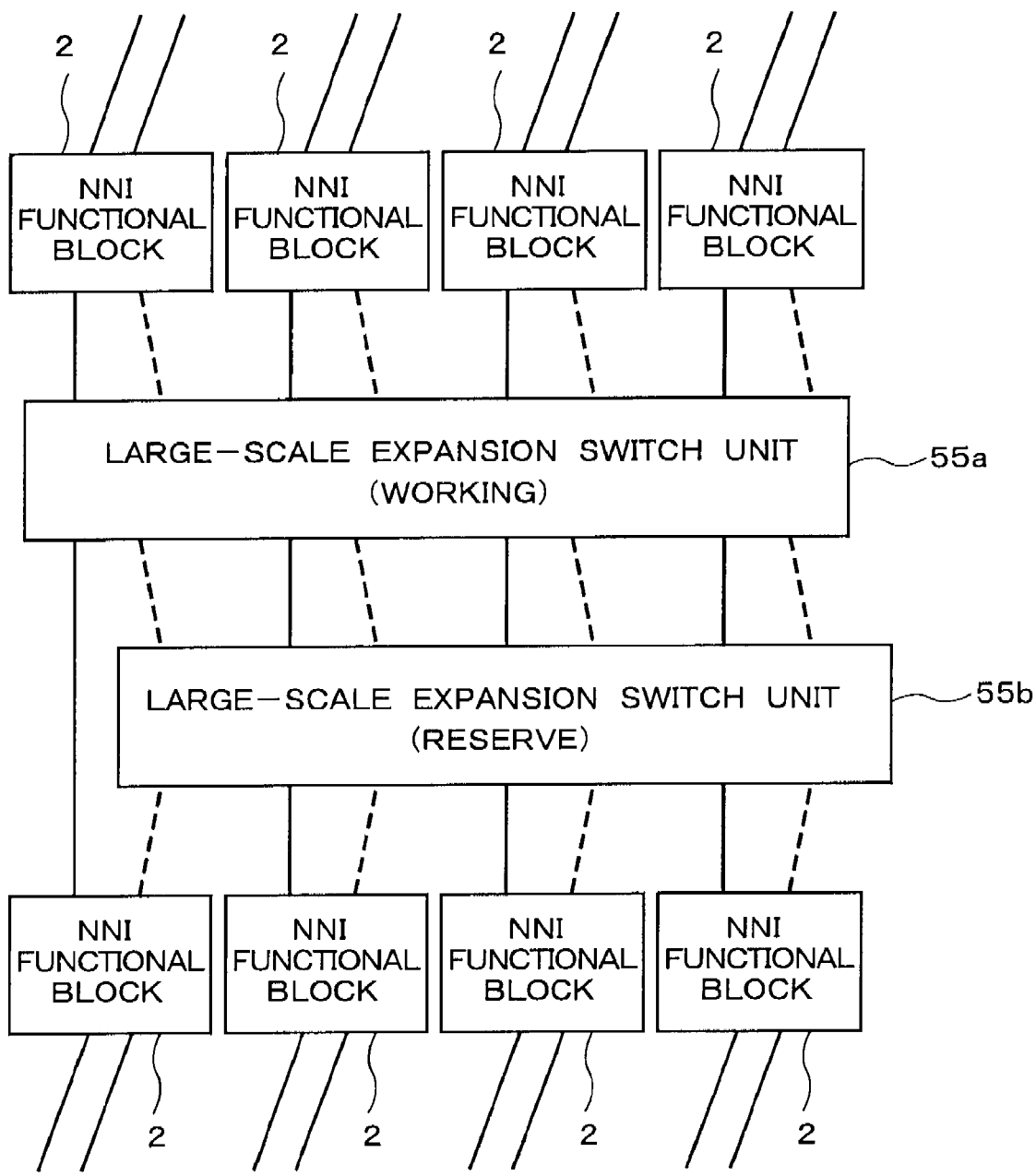
FIG. 30 is a block diagram showing the optical communication system according to a first modified example of Embodiment 7.

A first modified example of Embodiment 7 will next be described. The present modified example is an example of a case in which an even larger-scale cross connection is formed. FIG. 30 is a block diagram showing the optical communication system according to the present modified example. As shown in FIG. 30, two systems of large-scale expansion switch units 55a and 55b are provided in the optical communication system. The large-scale expansion switch unit 55a is a working-system unit, and the large-scale expansion switch unit 55b is a reserve-system unit. In this optical communication system, eight NNI functional blocks are provided, four the NNI functional blocks are connected to one side of the large-scale expansion switch units 55a and 55b, and the other four NNI functional blocks are connected to the other side of the large-scale expansion switch units 55a and 55b.

The optical communication system shown in FIG. 30 is a large-scale connection, but the signals that flow in the switch units have exactly the same specifications as the serial signals at 5 Gb/s or less that flow in the NNI units, the signals correspond to a multi rate, and the signals can be switched in protocol-free fashion. Optical communication is normally performed via the working large-scale expansion switch unit 55a, but the large-scale expansion switch unit 55b is switched to when a problem occurs in the working large-scale expansion switch unit 55a. The switch between the working large-scale expansion switch unit 55a and the reserve large-scale expansion switch unit 55b is performed by spatial switches inside the NNI functional blocks.

Figure 31:
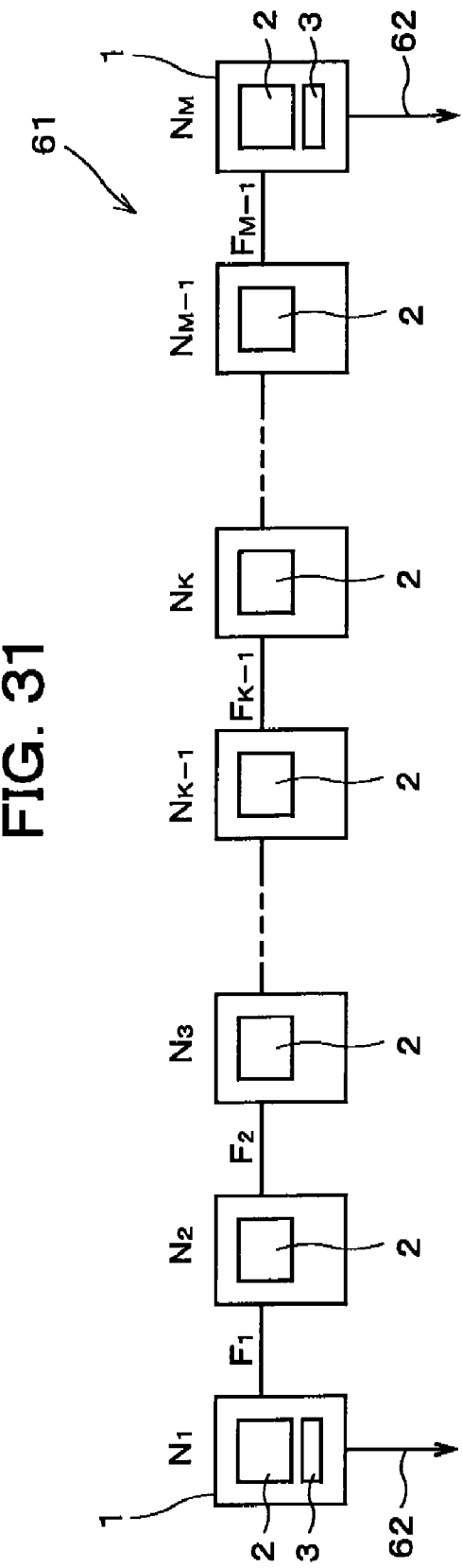
FIG. 31 is a block diagram showing the optical communication system according to Embodiment 8.

Embodiment 8 of the present invention will next be described. The present embodiment is an embodiment of an optical communication system in which the optical communication device of Embodiment 1 is used to perform long-distance transmission in high-capacity lines having a speed of 10 Gb/s or higher. FIG. 31 is a block diagram showing the optical communication system according to the present embodiment, and FIG. 32 is a block diagram showing an example of the channel connection method in the optical communication system.

As shown in FIG. 31, M (wherein M is a positive integer) nodes N1 through NM are provided in series in the optical communication system 61 of the present embodiment. Each node is composed of an optical communication device, an NNI functional block 2 is provided in each optical communication device, and at least the optical communication devices 1 of nodes N1 and NM are provided with a UNI functional block 3 in addition to the NNI functional block 2. Node Nk−1 and node Nk (wherein k is a positive integer from 2 to M) are connected to each other by a transmission channel Fk−1. Furthermore, high-capacity lines 62 having a speed of 10 Gb/s or higher are accommodated in the optical communication devices 1 that constitute the terminal nodes N1 and NM.

Figure 32:
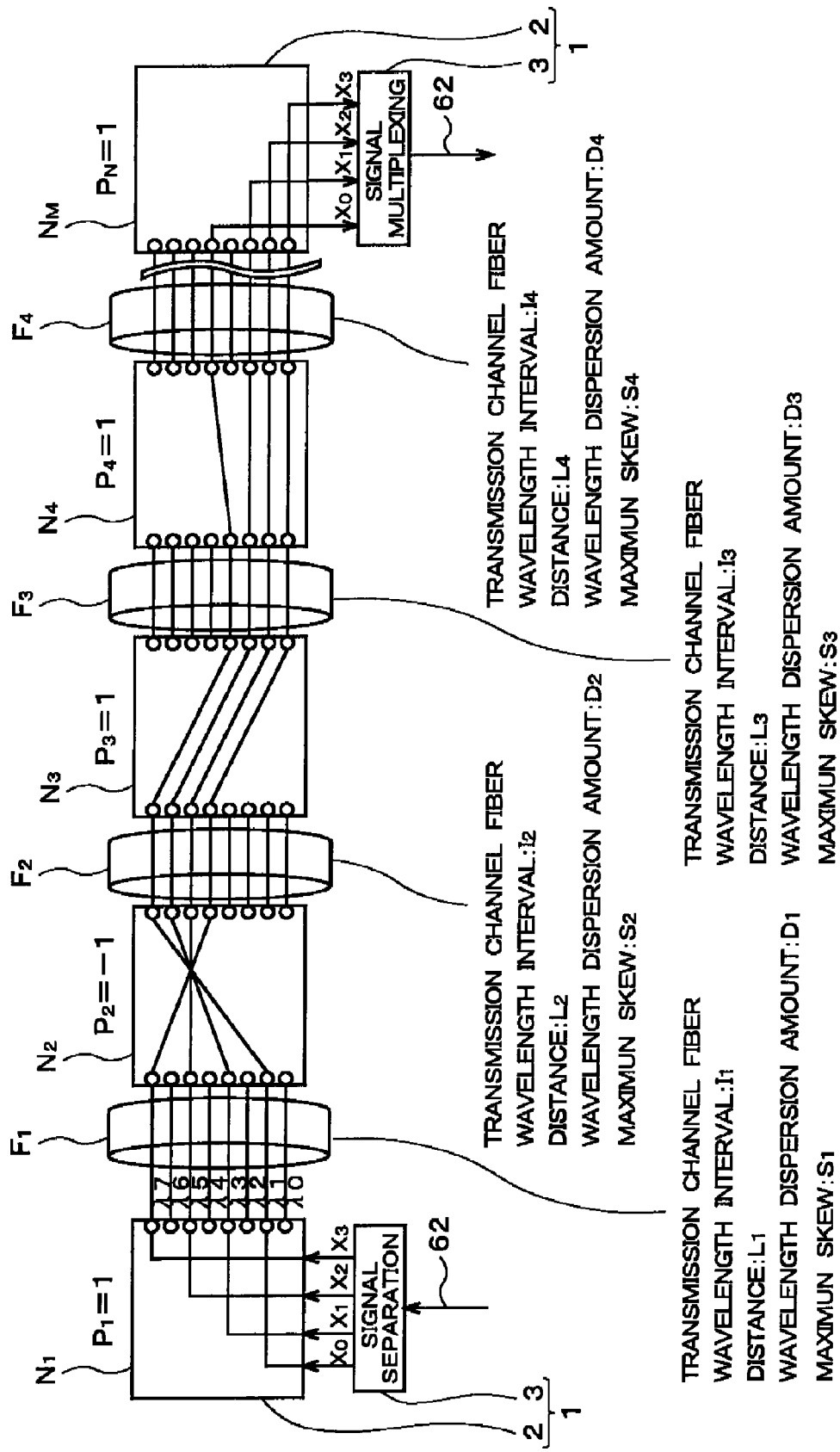
FIG. 32 is a block diagram showing an example of the channel connection method in the optical communication system.
Figure 33:
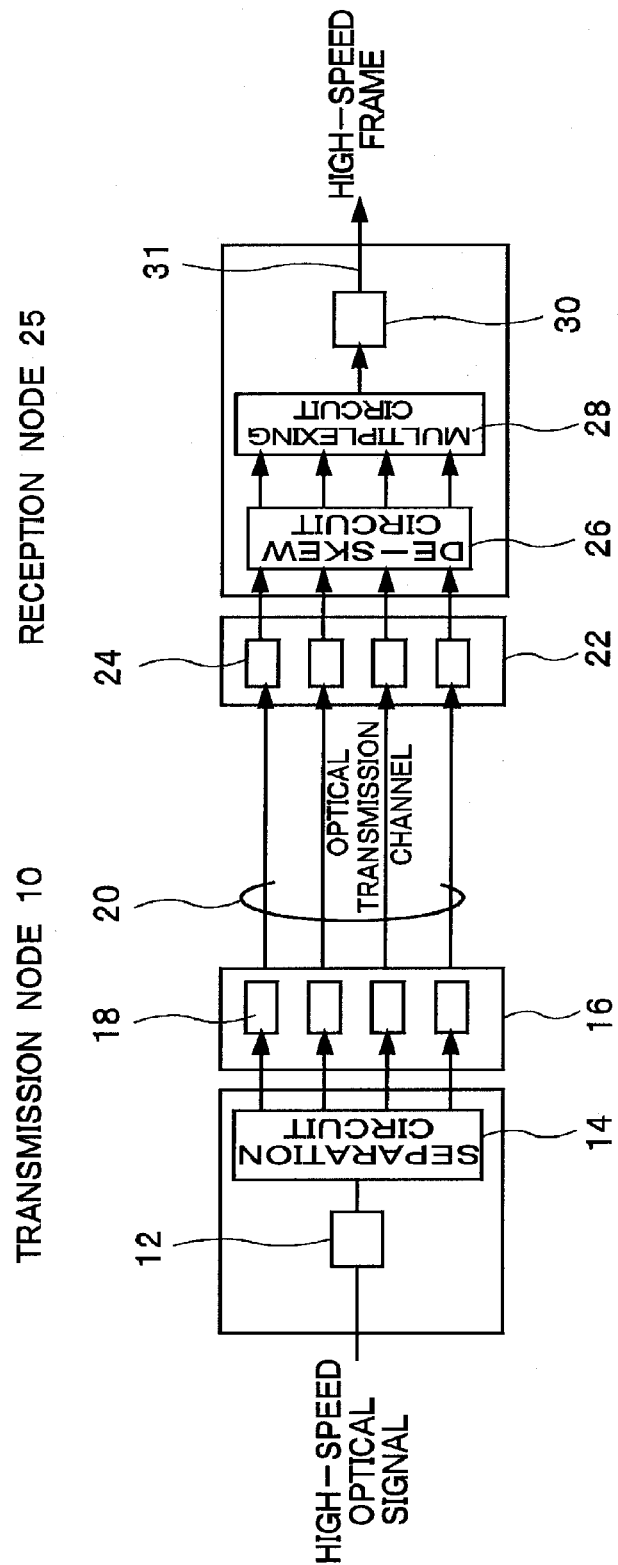
FIG. 33 is a block diagram showing the first conventional example.
Figure 34:
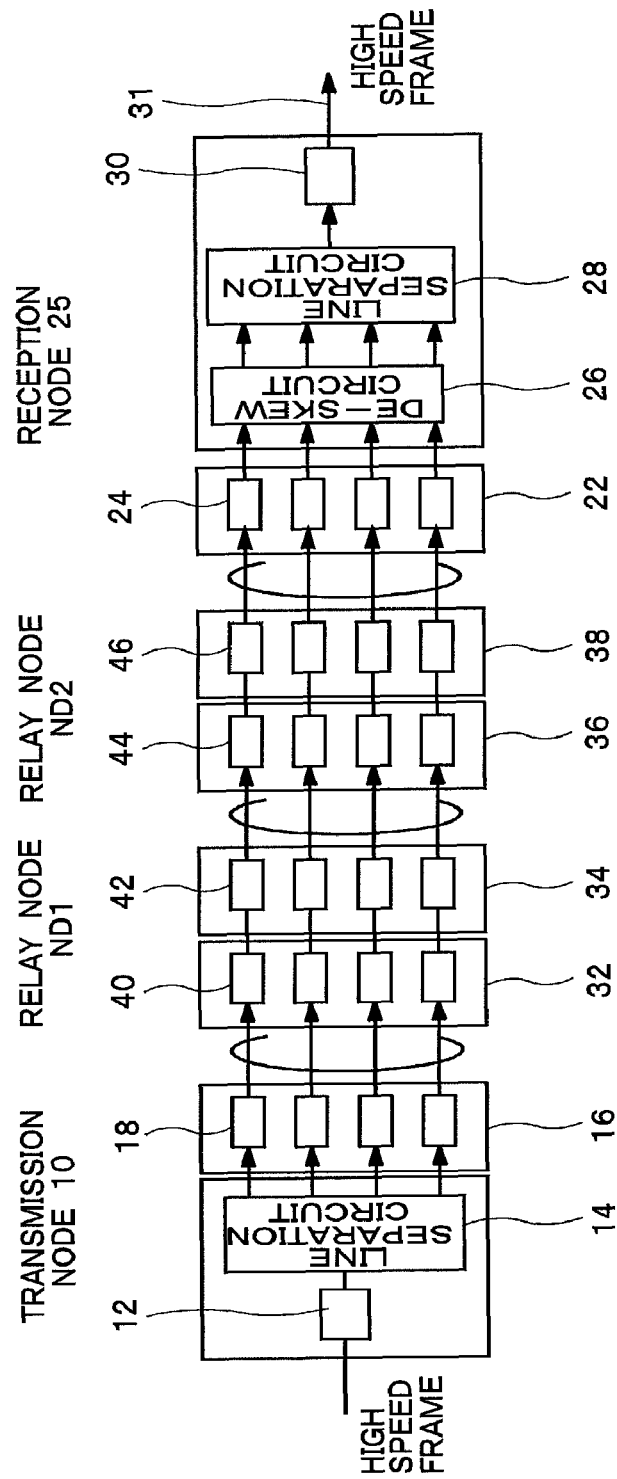
FIG. 34 is a block diagram showing the conventional technique based on the first conventional example shown in FIG. 9.
Figure 35:
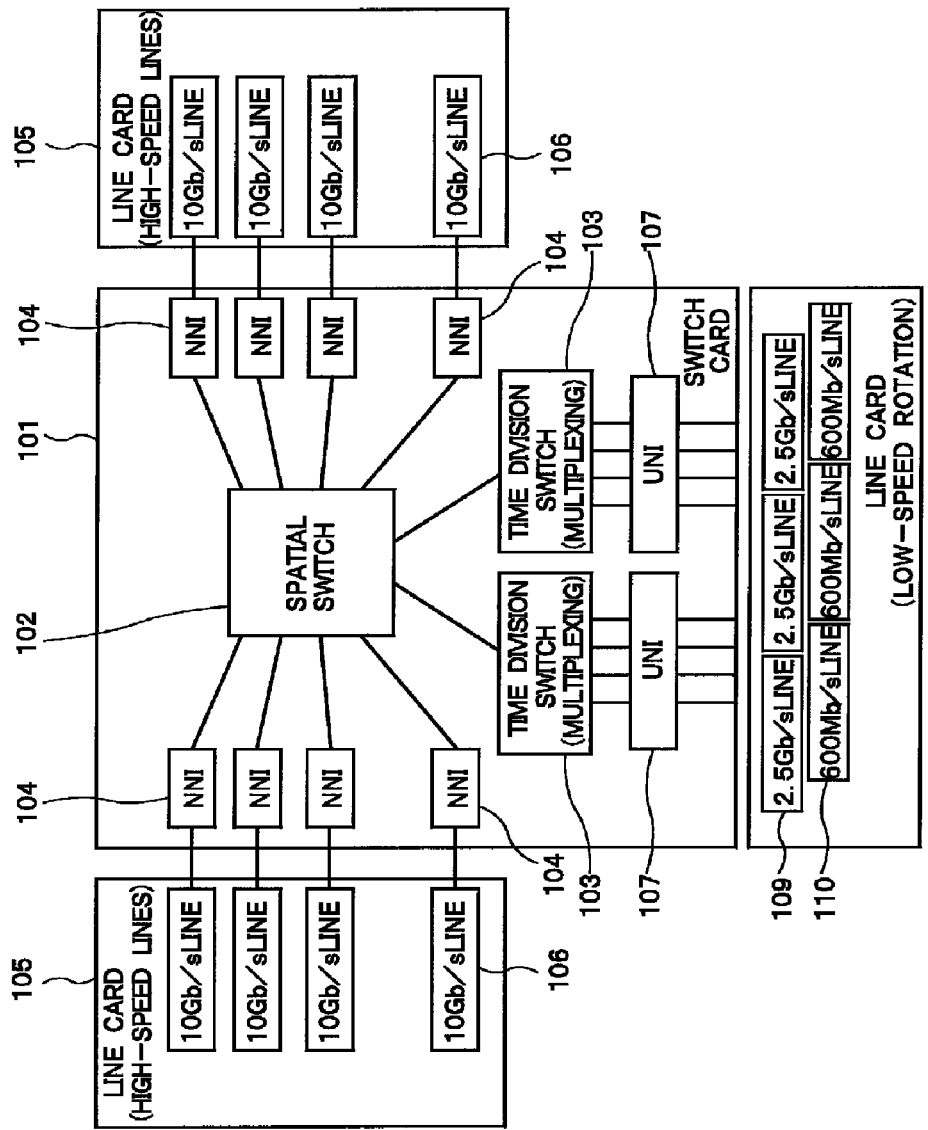
FIG. 35 is a block diagram showing the conventional optical communication device disclosed in Patent Document 1.
Figure 36:
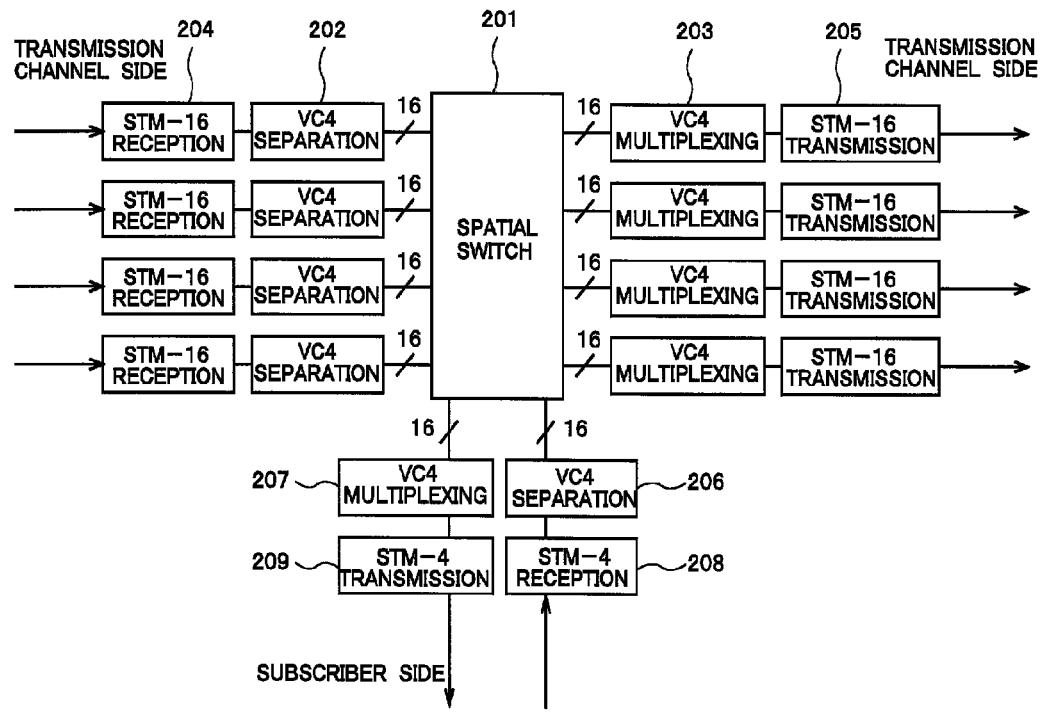
FIG. 36 is a block diagram showing the spatial switch and the area around the spatial switch of the conventional optical communication device disclosed in Patent Document 2.

As shown in FIG. 32, in the terminal nodes N1 and NM, the NNI functional block 2 and the UNI functional block 3 of the optical communication device 1 are connected to each other by four lanes X1 through X4, and four serial signals are transmitted via the lanes X1 through X4. In node N1, the UNI functional block 3 separates a multiplexed signal inputted via the high-capacity line 62 into four serial signals and outputs the serial signals to the lanes X1 through X4. In node NM, the UNI functional block 3 multiplexes the four serial signals inputted via the lanes X1 through X4 and outputs the multiplexed signal to the high-capacity line 62.

The wavelength channels of the DWDM signals transmitted between the nodes are designated as $\lambda 0$ through $\lambda 7$. The wavelengths of the wavelength channels $\lambda 0$ through $\lambda 7$ increase in sequence so that wavelength channel $\lambda 0$ has the shortest wavelength, and wavelength channel $\lambda 7$ has the longest wavelength. The spatial switch of node N1 allocates the serial signals inputted via the lanes X0 through X3 to any of the channels $\lambda 0$ through $\lambda 7$. To simplify the configuration at this time, the channel number (0 to 7) to which the signal of each lane is allocated increases or decreases in monotone fashion as the lane number (0 to 3) increases, and the allocated wavelength channels may have scattered values.

In the same manner, in intermediate nodes N2 through NM−1, the wavelength channels of the transmission channels on the input side are allocated to wavelength channels of the transmission channels on the output side. At this time, the channels are allocated so that the channel numbers on the output side increase or decrease in monotone fashion as the channel numbers on the input side increase. The allocated wavelength channels may also have scattered values.

The operation of the optical communication system of the present embodiment, i.e., the optical communication method of the present embodiment, will next be described. As shown in FIG. 32, when an optical signal is inputted to the optical communication device 1 of node N1 via the high-capacity line 62 connected to node N1, the optical signal is separated in the UNI functional block 3 into four serial signals having a speed of 5 Gb/s or less. The four serial signals are inputted to the NNI functional block 2 through the four lanes X0 through X3. The spatial switch of the NNI functional block 2 connects lane X0 to channel $\lambda 1$ of transmission channel F1, lane X1 to channel $\lambda 3$ of transmission channel F1, lane X2 to channel $\lambda 5$ of transmission channel F1, and lane X3 to channel $\lambda 7$ of transmission channel F1. Transmission channel F1 transmits the signal to node N2.

The spatial switch of node N2 connects channel $\lambda 1$ of transmission channel F1 to channel $\lambda 7$ of transmission channel F2, channel $\lambda 3$ of transmission channel F1 to channel $\lambda 6$ of transmission channel F2, channel $\lambda 5$ of transmission channel F1 to channel $\lambda 5$ of transmission channel F2, and channel $\lambda 7$ of transmission channel F1 to channel $\lambda 4$ of transmission channel F2. Transmission channel F2 transmits the signal to node N3.

The spatial switch of node N3 connects channel $\lambda 7$ of transmission channel F2 to channel $\lambda 3$ of transmission channel F3, channel $\lambda 6$ of transmission channel F2 to channel $\lambda 2$ of transmission channel F3, channel $\lambda 5$ of transmission channel F2 to channel $\lambda 1$ of transmission channel F3, and channel $\lambda 4$ of transmission channel F2 to channel $\lambda 0$ of transmission channel F3. Transmission channel F3 transmits the signal to node N4.

The spatial switch of node N4 connects channel $\lambda 3$ of transmission channel F3 to channel $\lambda 4$ of transmission channel F4, channel $\lambda 2$ of transmission channel F3 to channel $\lambda 2$ of transmission channel F4, channel $\lambda 1$ of transmission channel F3 to channel $\lambda 1$ of transmission channel F4, and channel $\lambda 0$ of transmission channel F3 to channel $\lambda 0$ of transmission channel F4. Transmission channel F4 transmits the signal to node N5. Switching and transmission continue in the same manner thereafter.

When a signal is inputted to the terminal node NM by the same channel configuration as transmission channel F4, the spatial switch of node NM connects the channels of the transmission channel FM−1 to the lanes X0 through X3 of node NM. At this time, the signals transmitted through the lanes of node N1 are inputted to lanes of node NM that have the same lane numbers as the lanes of node N1. Specifically, the spatial switch of node NM connects channel $\lambda 4$ of transmission channel FM−1 to lane X0 of node NM, channel $\lambda 2$ of transmission channel FM−1 to lane X1, channel $\lambda 1$ of transmission channel FM−1 to lane X2, and channel $\lambda 0$ of transmission channel FM−1 to lane X3.

The effects of the present embodiment will next be described. The optical communication device of Embodiment 2 divides transmission into a plurality of signals having a speed of 5 Gb/s or less for 10 Gb/s and 40 Gb/s high-capacity lines. As previously described, skew occurs due to the effects of wavelength dispersion when a high-speed signal is separated into signals that are allocated to WDM wavelengths and transmitted in an optical fiber. The skew increases in proportion to the transmission distance when the amount of wavelength dispersion per unit of length in the optical fiber is constant. The need therefore arises to compensate for the large skew at the terminal nodes on both ends when long-distance transmission is performed without terminating the lines. Consequently, a large-scale buffer memory or a large-scale delay compensation circuit must be provided in the terminal node of long-distance transmission. When the specifications only allow a small amount of skew, as in 10 GbE XAUI, long-distance transmission is impossible without line termination unless an optical function is introduced that compensates for wavelength dispersion in the transmission channels.

In contrast, in the optical communication system of the present embodiment, wavelength conversion is performed for switching between long-wavelength channels and short-wavelength channels of the transmission channels in appropriate nodes. The wavelength dispersion characteristics of transmission channels between a plurality of nodes are thereby cancelled out, and the amount of skew in the terminal nodes can be reduced. This wavelength conversion is performed by switching the sequence from long wavelengths to short wavelengths of the divided and allocated DWDM channels, as described above, and is therefore defined in particular as wavelength ascension order conversion. Examples of methods for reducing skew through wavelength ascension order conversion include a first method for adjusting the amount of skew in the terminal node so as to be equal to or less than a specified value (Smax) using a single wavelength ascension order conversion, and a second method for adjusting the amount of skew in the terminal node so as to be equal to or less than a specified value (Smax) using one or more wavelength ascension order conversions.

The skew reduction method will be described in detail hereinafter. The maximum wavelength difference (e.g., the wavelength difference between channel λ7 and channel λ1 in node N1 shown in FIG. 24) for the wavelength channels allocated in node Nk is designated as Ik, the fiber distance of the transmission channel Fk between node Nk and node Nk+1 is designated as Lk, and the dispersion amount is designated as Dk. The maximum skew amount Sk that occurs during transmission of a signal from node Nk to node Nk+1 is thus indicated simply as the product (Ik×Lk×Dk) of the wavelength difference Ik, the fiber distance Lk, and the dispersion amount Dk. However, the wavelength difference Ik and the distance Lk are parameters that have positive values. The dispersion amount Dk may have a negative value according to the type of fiber. The maximum skew amount Sk may therefore also have a negative value.

A wavelength ascension order conversion node parameter Pk is also defined in order to define the node in which the wavelength ascension order is converted, and the value of the skew that varies due to the conversion. The parameter Pk has a value of −1 when the wavelength ascension order is converted in node Nk, and the parameter Pk has a value of +1 when the wavelength ascension order is not converted. Specifically, even when the wavelength channel of transmission is changed as in nodes N3 and N4 in FIG. 24, Pk=1 when the ascension order of the wavelengths is not switched. When the ascension order of the wavelengths is switched as in node N2, Pk=−1. In the line-accommodating nodes N1 and NM, Pk=1 indicates that there is no wavelength ascension order conversion when the signal of lane number X0 is connected with the shortest-wavelength channel in the divided line, and Pk=−1 indicates that there is a wavelength ascension order conversion. For example, in FIG. 24, P1=1 and PM=−1. Using these parameters, the skew amount Rk that remains after the signal is transmitted from node N1 to node Nk can be indicated by Equation 2 below.

$$R_k = \sum_{l=1}^{k} \left\{ S_{l-1} \left( \prod_{j=1}^{l-1} P_j \right) \right\}$$ [Equation 2]

The first method described above, i.e., the method for reducing the amount of skew in the terminal node so that the amount of skew is equal to or less than the prescribed value Smax, is a method for selecting one node Nk to perform wavelength ascension order conversion so that the absolute value of the residual skew RM in the terminal node NM is smaller than the specified value Smax. At this time, when there is a plurality of nodes Nk that satisfies the conditions, and optimization is performed, a single node Nk is selected so that the skew amount Rk is minimized.

The second method described above, i.e., the method for reducing the skew by one or more wavelength ascension order conversions so that the skew in each node is equal to or less than the specified value Smax, is a method for setting the parameter Pk so that the absolute values of all the skew amounts Rk are smaller than the specified value Smax. Specifically, the parameter P1 is arbitrarily set to (+1) or (−1), and for a case in which P2=1, when the absolute value of the skew R3 is calculated, and the absolute value of the skew R3 does not exceed the specified value Smax, P2 is set to 1. The parameter P2 is set to −1 when the absolute value of the skew R3 appears to exceed the specified value Smax. In the same manner, the values set for the parameters P1 and P2 are used to calculate the skew R4 and determine the value of the parameter P3. The values of parameters subsequent to P2 are thus determined in sequence. In the second method, when a path is set that extends from node NM to node N1, the calculations are performed again from the direction of node NM, and the nodes in which the wavelength ascension order is converted are set independently of the path from node N1 to node NM.

Most of the skew that occurs due to wavelength dispersion can thus be cancelled out by performing wavelength ascension order conversion for switching the transmitting wavelength channels between the long-wavelength side and the short-wavelength side in the spatial switch that is in the NNI functional block of the appropriate node. The transmission distance of XAUI, for example, can thereby be increased without mid-transmission termination. This method can also be applied when OC-192/STM-64 or OC-768/STM-256 is divided into OC-48/STM-16 for transmission, for example, and is effective for reducing the buffer memory needed at the reception terminal, and for reducing the load of de-skew processing and pointer processing.

Examples were described in which the terminal nodes were composed of the optical communication device according to Embodiment 1 in the optical communication systems of Embodiments 7 and 8, but the terminal nodes may also be composed of the optical communication device according to any of Embodiments 2 through 5. The optical communication device according to any of Embodiments 2 through 6 may also be used not only in the terminal nodes, but also in the intermediate nodes, and in at least the node to which the client-side optical lines are connected.

INDUSTRIAL APPLICABILITY

The present invention is useful as an optical communication method and an optical communication system for performing inverse MUX transmission that utilizes wavelength division multiplexing.

The invention claimed is:

1. An optical communication method in which a plurality of nodes each having a cross-connect switch and a WDM (wavelength division multiplexing) transmission function is provided to an inverse MUX transmission channel, a plurality of wavelength channels is present between adjacent nodes, and a skew that occurs in said inverse MUX transmission channel is kept below a prescribed value; said optical communication method characterized in that (a) a skew between wavelength channels provided between adjacent nodes is measured;
(b) a node in which switching is performed between wavelength channels is determined based on the amount of measured skew; and
(c) a cross-connect switch of the node determined in step (b) is set for wavelength channel switching.

2. The optical communication method according to claim 1, characterized in that:

measurement of the skew between wavelength channels provided between adjacent nodes in said step (a) is performed by a skew measurement device provided to each node;
the cross-connect switch of a first node of said adjacent nodes is set so that two test signals generated from a corresponding first skew measurement device are transmitted in two wavelength channels;
the cross-connect switch of a second node of said adjacent nodes is set so that the two test signals transmitted from said first node via said two wavelength channels are inputted to a corresponding second skew measurement device; and
the skew between the wavelength channels of said adjacent nodes is measured in said second skew measurement device.

3. The optical communication method according to claim 1, characterized in that:

measurement of the skew between adjacent nodes in said step (a) is performed by a skew measurement device provided to each node;
the cross-connect switch of a first node of said adjacent nodes is set so that a single test signal generated from a corresponding first skew measurement device is branched and transmitted in two wavelength channels;
the cross-connect switch of a second node of said adjacent nodes is set so that the two test signals transmitted from said first node via said two wavelength channels are inputted to a corresponding second skew measurement device; and
the skew between the wavelength channels of said adjacent nodes is measured in said second skew measurement device.

4. The optical communication method according to any of claims 1 through 3, characterized in that:

setting of the cross-connect switch of the node for performing wavelength switching in said step (c) includes a step for transmission testing between terminal nodes; and
said transmission testing has a step for performing skew measurement under direction of the skew measurement device provided to each node through multicasting of the cross-connect switch of each node for two wavelength channels among the wavelength channels in which inverse MUX transmission is performed.

5. The optical communication method according to claim 1, characterized in that the step for determining a relay node for performing wavelength switching in said step (b) includes a step for specifying an optimum node for line termination when skew conditions specified in advance cannot be satisfied even by wavelength switching.

6. The optical communication method according to claim 1, characterized in comprising a step in which the skew measured in said step (a) is transmitted to a network control device via an external network.

7. An optical communication device provided to an inverse MUX transmission channel, comprising a plurality of nodes that each has a cross-connect switch and a WDM (wavelength division multiplexing) transmission function, and a skew measurement device provided to each of said plurality of nodes; said optical communication device characterized in that a test signal for skew measurement is generated from one skew measurement device provided to adjacent nodes;
said cross-connect switch is set so that a test signal is transmitted in a wavelength channel between said adjacent nodes;
said test signal is received by the other skew measurement device provided to said adjacent nodes; and
the skew between the adjacent nodes is measured.

8. The optical communication device according to claim 7, wherein said skew measurement device comprises:

a transmission unit having a test signal generation unit;
a test signal detection unit for receiving said test signal and detecting the test signal; and
a skew measurement unit for measuring a skew from the detected test signal.

9. The optical communication device according to claim 7 or 8, characterized in that said cross-connect switch is an electrical spatial switch.

10. An optical communication system comprising a plurality of nodes, transmission-channel-side optical lines for transmitting optical signals between the nodes, client-side optical lines connected to at least one of said nodes, and the optical communication device according to claim 7 to which said transmission-channel-side optical lines and said client-side optical lines are connected that performs cross connection of both types of said optical lines, wherein said optical communication device has a first functional block to which said transmission-channel-side optical lines are connected, and a second functional block to which said client-side optical lines are connected;
said first functional block has a first optical transceiver module connected to said transmission-channel-side optical lines that performs conversion between optical signals and electrical signals, and an electrical spatial switch that is connected to the first optical transceiver module and said second functional block; and
said first optical transceiver module and said spatial switch operate at a multi rate of 5 Gb/s or less; wherein
an optical signal is separated into a plurality of separated signals and allocated to a plurality of wavelength channels for transmission in said transmission-channel-side optical lines, the sequence of wavelengths of the wavelength channels allocated to the separated signals of the inputted optical signal is switched and outputted in reverse in at least one of said nodes, and switching of said wavelength channels is performed in one or a plurality of nodes so that the amount of skew between the allocated wavelength channels is equal to or less than a prescribed amount in the plurality of nodes that includes a node that terminates a line.

11. An optical communication system comprising a plurality of nodes, transmission-channel-side optical lines for transmitting optical signals between the nodes, client-side optical lines connected to at least one of said nodes, and the optical communication device according to claim 7 to which said transmission-channel-side optical lines and said client-side optical lines are connected that performs cross connection of both types of said optical lines, wherein said optical communication device has a first functional block to which said transmission-channel-side optical lines are connected, and a second functional block to which client-side optical lines are connected;

said first functional block has a first optical transceiver module connected to said transmission-channel-side optical lines that performs conversion between optical signals and electrical signals, and an electrical spatial switch that is connected to the first optical transceiver module and said second functional block; and said first optical transceiver module and said spatial switch operate at a multi rate of 5 Gb/s or less; wherein an optical signal is separated into a plurality of separated signals and allocated to a plurality of wavelength channels for transmission in said transmission-channel-side optical lines, the sequence of wavelengths of the wavelength channels allocated to the separated signals of the inputted optical signal is switched and outputted in reverse in at least one of said nodes, and switching of said wavelength channels is performed in one node so that the amount of skew between the allocated wavelength channels is equal to or less than a prescribed amount in a node that terminates a line.

12. The optical communication system according to claim 10 or 11, characterized in that said first optical transceiver module is pluggable.

13. The optical communication system according to claim 10 or 11, characterized in that the number of reception ports of said spatial switch is 3N or higher, and the number of transmission ports of said spatial switch is 3N or higher when the number of said first optical transceiver modules is N (wherein N is a positive integer).

14. The optical communication device according to claim 13, characterized in that said first functional block has a backplane port to which said second functional block is connected; and the backplane port is connected by an electrical serial line having a speed of 5 Gb/s or less to the 2N or more said reception ports and the 2N or more said transmission ports of said spatial switch.

15. The optical communication system according to claim 10 or 11, characterized in that said second functional block has a second optical transceiver module for performing conversion between optical signals and electrical signals that are connected to said client-side optical lines; and a protocol chip for performing frame processing of an electrical signal outputted from the second optical transceiver module and outputting the electrical signal as a serial signal at 5 Gb/s or less to said spatial switch.

16. The optical communication system according to claim 10 or 11, characterized in that said first functional block has:

a multiplexing filter connected between said transmission-channel-side optical lines and said first optical transceiver module, for multiplexing N serial signals into a single multiplexed signal; and a separating filter connected between said transmission-channel-side optical lines and said first optical transceiver module, for separating the single multiplexed signal into N serial signals; wherein the number of said first optical transceiver modules is N (wherein N is a positive integer).

17. The optical communication system according to claim 10 or 11, characterized in that said first functional block has:

two multiplexing filters connected between said transmission-channel-side optical lines and said first optical transceiver module, for multiplexing N/2 serial signals into a single multiplexed signal; and two separating filters connected between said transmission-channel-side optical lines and said first optical transceiver module, for separating the single multiplexed signal into N/2 serial signals; wherein the number of said first optical transceiver modules is N (wherein N is a positive integer).

18. The optical communication system according to claim 10 or 11, characterized in that said first functional block has a filter for wavelength multi/demultiplexing for accommodating 2N wavelength channels that is used in single-conductor bidirectional transmission when the number of said first optical transceiver modules is N (wherein N is a positive integer).

19. The optical communication system according to claim 10 or 11, characterized in that said spatial switch is a cross point switch.

20. The optical communication system according to claim 10 or 11, characterized in that said first functional block has a CRD chip connected between said first optical transceiver module and said spatial switch, for performing retiming of an electrical signal.

21. The optical communication system according to claim 10 or 11, characterized in that said second functional block accommodates lines having a speed of 1 Gb/s or less, multiplexes into a signal having a speed of 5 Gb/s or less, and outputs to said first functional block.

22. The optical communication system according to claim 10 or 11, characterized in that said second functional block accommodates lines having a speed of 5 Gb/s or less and transparently outputs to said first functional block without modification.

23. The optical communication system according to claim 10 or 11, characterized in that said second functional block accommodates lines having a speed of 10 Gb/s or less, multiplexes into a signal having a speed of 5 Gb/s or less, and outputs to said first functional block.

24. The optical communication system according to claim 10 or 11, characterized in that said second functional block accommodates lines having a speed of 40 Gb/s or less, multiplexes into a signal having a speed of 5 Gb/s or less, and outputs to said first functional block.

25. The optical communication system according to claim 10 or 11, characterized in that said second functional block accommodates lines of a 10 gigabit Ethernet, separates into a XAUI composed of four 3.125 Gb/s serial signals, and outputs to said first functional block.

26. The optical communication system according to claim 10 or 11, characterized in that said second functional block converts an accommodated line into a plurality of SONET/SDH OC-48/STM-16 frames.

27. The optical communication system according to claim 10 or 11, characterized in that said second functional block performs forward error correction of an inputted signal.

28. The optical communication system according to claim 10 or 11, characterized in comprising an optical fiber connected between said first functional block and said second functional block, wherein said first and second functional blocks each have a parallel optical transceiver module connected to said optical fiber, for converting between electrical signals and optical signals.

29. The optical communication system according to claim 10 or 11, characterized in comprising a chassis provided with an electrical back plane, in which said first functional block and said second functional block are mounted.

30. The optical communication system according to claim 10 or 11, characterized in comprising a single case for housing said first functional block and said second functional block.

31. The optical communication system according to claim 10 or 11, characterized in comprising an optical amplification unit connected between said first functional block and said transmission-channel-side optical lines, for amplifying and outputting an inputted optical signal.

32. The optical communication system according to claim 10 or 11, characterized in comprising:
   an optical amplification unit connected between said first functional block and said transmission-channel-side input lines, for amplifying an optical signal inputted from said input lines and outputting the signal to said first functional block; and
   a variable attenuator connected between said first functional block and said transmission-channel-side output lines, for reducing the power of an optical signal outputted from said first functional block and outputting the signal to said output lines.

33. The optical communication system according to claim 10 or 11, characterized in comprising a wavelength monitoring unit for monitoring the wavelengths of the wavelength channels that constitute an optical signal that is inputted and outputted in said first said functional block.

34. The optical communication system according to claim 33, characterized in that said wavelength monitoring unit has
   a plurality of tap couplers interposed in said transmission-channel-side optical lines, for branching a signal flowing in the optical lines;
   an optical switch for selecting a single signal among the signals branched by the plurality of tap couplers; and
   a spectral monitoring device for monitoring the selected signal.

35. The optical communication system according to claim 33, characterized in that
   said wavelength monitoring unit outputs a monitoring result to said first functional block; and
   said first functional block controls the optical wavelength of said first optical transceiver module on the basis of said monitoring result.

* * * * *